United States Patent
Vanderzwet et al.

(10) Patent No.: US 11,684,992 B2
(45) Date of Patent: Jun. 27, 2023

(54) RESISTANCE SPOT RIVET WELDING SYSTEMS AND METHODS OF USE THEREOF

(71) Applicants: ARCONIC INC., Pittsburgh, PA (US); CENTERLINE (WINDSOR) LIMITED, Windsor (CA)

(72) Inventors: Daniel Peter Vanderzwet, Omemee (CA); Simon Maurice Britton, Windsor (CA); Larry Frank Koscielski, LaSalle (CA); Eric Jean Michaud, Amherstburg (CA); David Mario Simone, Amherstburg (CA); Stuart Cameron Cosgrave, LaSalle (CA); Kyle Alexander Wasyliniuk, Essex (CA); Donald J. Spinella, Greensburg, PA (US); Gino N. Iasella, Pittsburgh, PA (US); Daniel Bergstrom, Sarver, PA (US); Robert B. Wilcox, McGregor, TX (US); Thomas R. Kingsbury, Waco, TX (US); Graham Scott Musgrove, Waco, TX (US)

(73) Assignees: HOWMET AEROSPACE INC., Pittsburgh, PA (US); CENTERLINE (WINDSOR) LIMITED, Windsor (CA)

( * ) Notice: Subject to any disclaimer, the term of this patent is extended or adjusted under 35 U.S.C. 154(b) by 491 days.

(21) Appl. No.: 16/768,157

(22) PCT Filed: Dec. 13, 2018

(86) PCT No.: PCT/US2018/065329
§ 371 (c)(1),
(2) Date: May 29, 2020

(87) PCT Pub. No.: WO2019/118659
PCT Pub. Date: Jun. 20, 2019

(65) Prior Publication Data
US 2020/0361020 A1    Nov. 19, 2020

Related U.S. Application Data

(60) Provisional application No. 62/598,715, filed on Dec. 14, 2017.

(51) Int. Cl.
*B23K 9/20* (2006.01)
*B23K 9/28* (2006.01)
(Continued)

(52) U.S. Cl.
CPC .................. *B23K 9/20* (2013.01); *B23K 9/28* (2013.01); *B23K 11/0053* (2013.01);
(Continued)

(58) Field of Classification Search
CPC ....... B23K 11/314; B23K 11/30; B23K 11/25; B23K 11/006; B23K 11/005; B23K 9/28; B23K 9/20; B23K 11/0066
See application file for complete search history.

(56) References Cited

U.S. PATENT DOCUMENTS 4,620,079 A * 10/1986 Allmann ................ B23K 9/206
219/98
4,789,768 A    12/1988 Tobita et al.
(Continued)

FOREIGN PATENT DOCUMENTS

EP    1495828 A1    1/2005
EP    2314407 A1    4/2011
(Continued)

OTHER PUBLICATIONS

Extended European Search Report for European Application No. 18888726.9 completed Aug. 26, 2021.
(Continued)

*Primary Examiner* — Brian W Jennison
(74) *Attorney, Agent, or Firm* — K&L Gates LLP

(57) ABSTRACT

Resistance spot rivet welding systems, subsystems, and methods of use thereof are provided.

19 Claims, 83 Drawing Sheets

(51) Int. Cl.
*B23K 11/00* (2006.01)
*B23K 11/25* (2006.01)
*B23K 11/30* (2006.01)
*B23K 11/31* (2006.01)

(52) U.S. Cl.
CPC .......... *B23K 11/0066* (2013.01); *B23K 11/25* (2013.01); *B23K 11/3009* (2013.01); *B23K 11/314* (2013.01)

(56) References Cited

U.S. PATENT DOCUMENTS

| | | | | |
|---|---|---|---|---|
| 9,021,688 | B2* | 5/2015 | Krejci | B23P 19/004 |
| | | | | 29/809 |
| 2013/0071209 | A1* | 3/2013 | Schug | B23P 19/005 |
| | | | | 414/222.01 |
| 2014/0025196 | A1 | 1/2014 | Hain et al. | |
| 2014/0079494 | A1* | 3/2014 | Hain | B65G 51/02 |
| | | | | 406/197 |
| 2015/0165544 | A1* | 6/2015 | Molina Mesa | B23K 11/315 |
| | | | | 219/86.33 |
| 2015/0184689 | A1* | 7/2015 | Godfrey | B21J 15/38 |
| | | | | 29/515 |
| 2015/0217395 | A1 | 8/2015 | Spinella et al. | |
| 2016/0262214 | A1 | 9/2016 | Kondo et al. | |
| 2017/0072454 | A1* | 3/2017 | Wilcox | B23P 19/006 |
| 2017/0316556 | A1 | 11/2017 | Spinella et al. | |

FOREIGN PATENT DOCUMENTS

| | | |
|---|---|---|
| JP | H8-108285 A | 4/1996 |
| JP | H10-225774 A | 8/1998 |
| KR | 10-2017-0057080 A | 5/2017 |
| WO | 2007031701 A1 | 3/2007 |
| WO | 2007074561 A1 | 7/2007 |

OTHER PUBLICATIONS

International Search Report and Written Opinion of the International Searching Authority for International Application No. PCT/US2018/065329 dated Apr. 9, 2019.

* cited by examiner

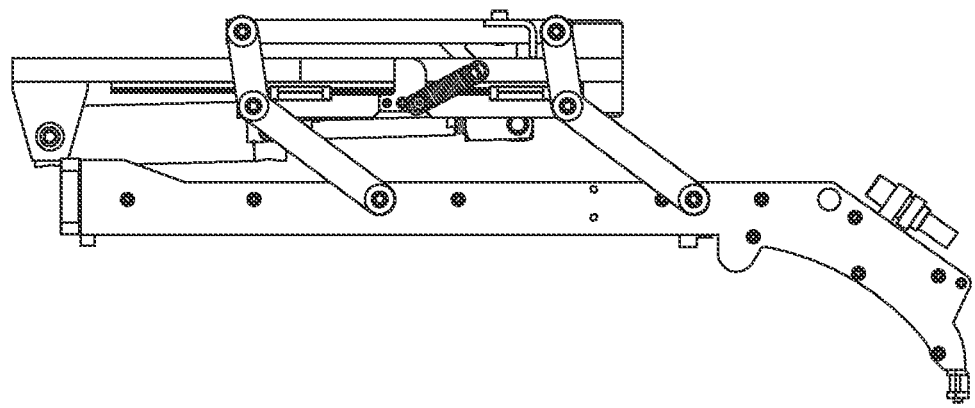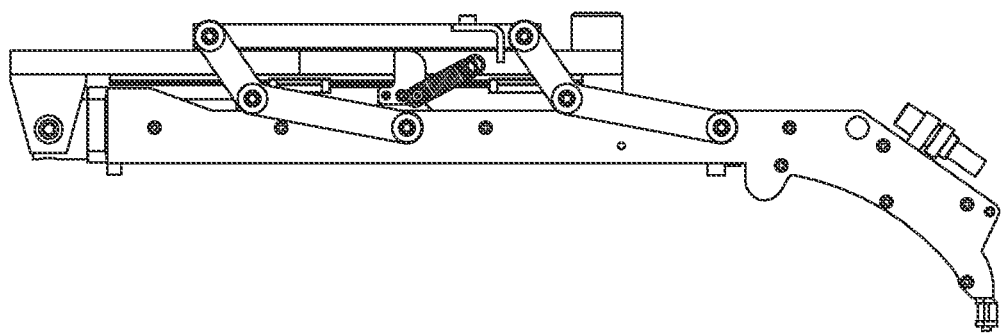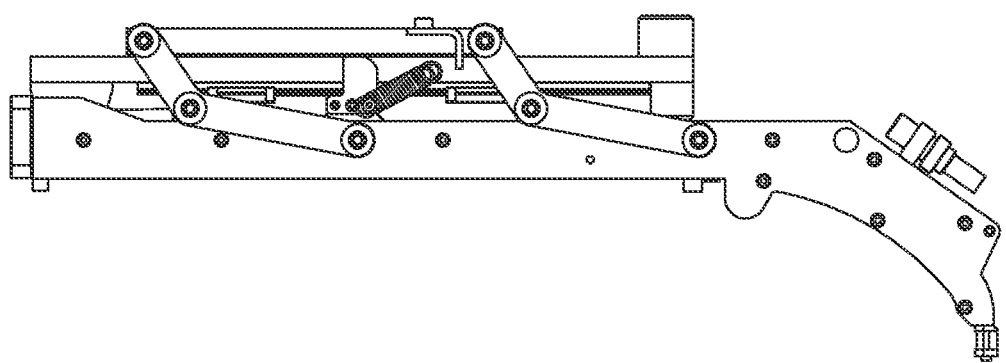
FIG. 12

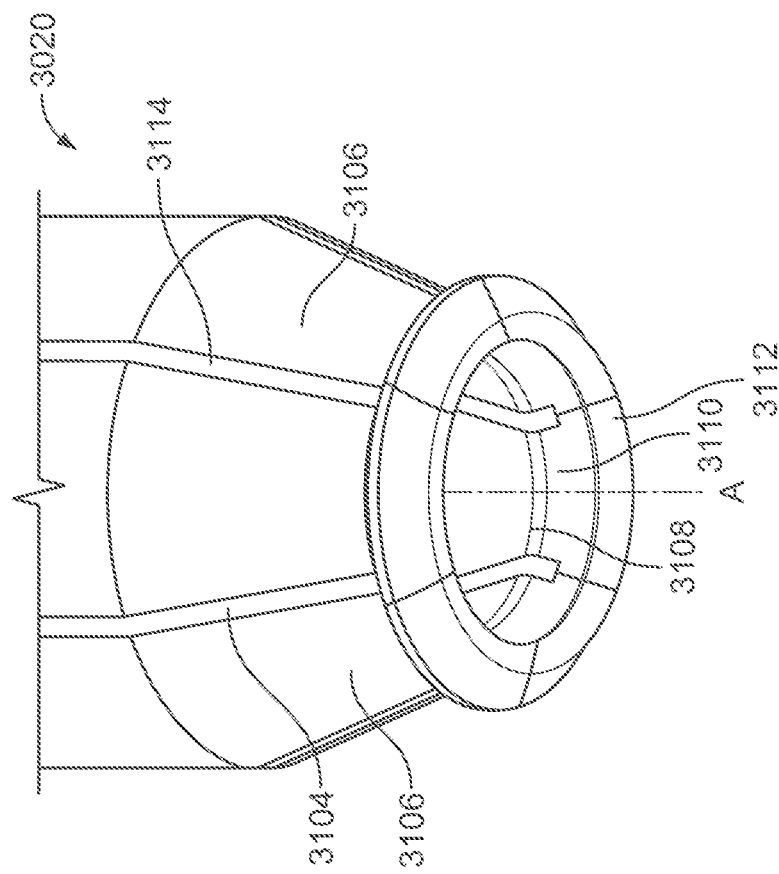
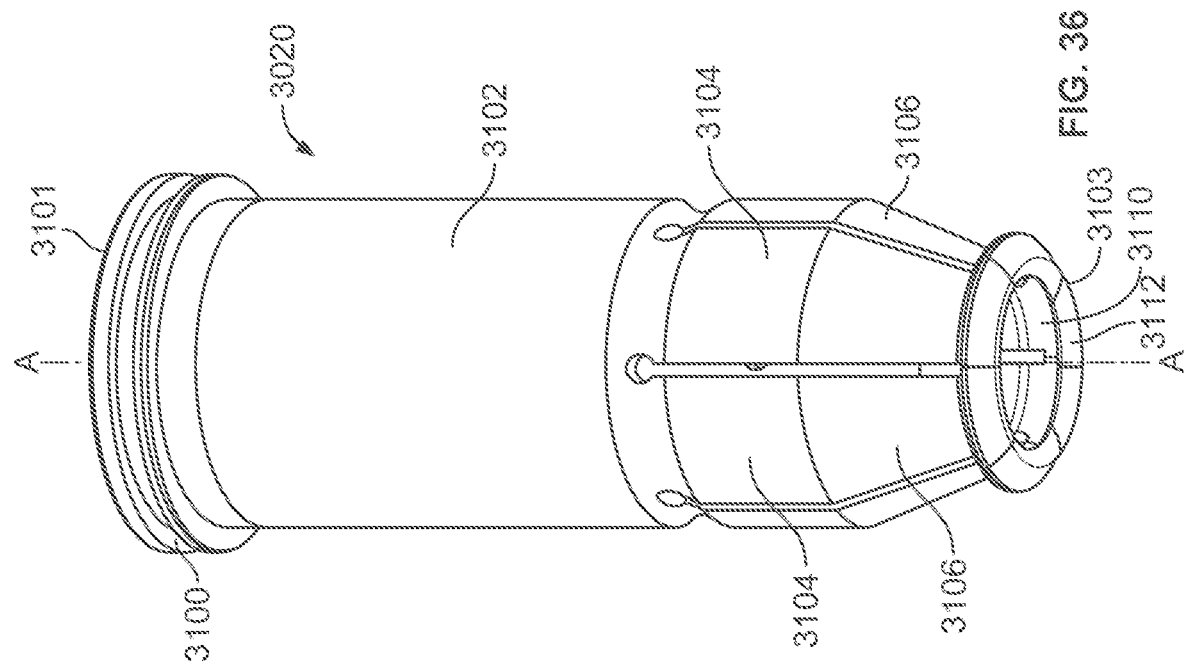
FIG. 37
FIG. 36

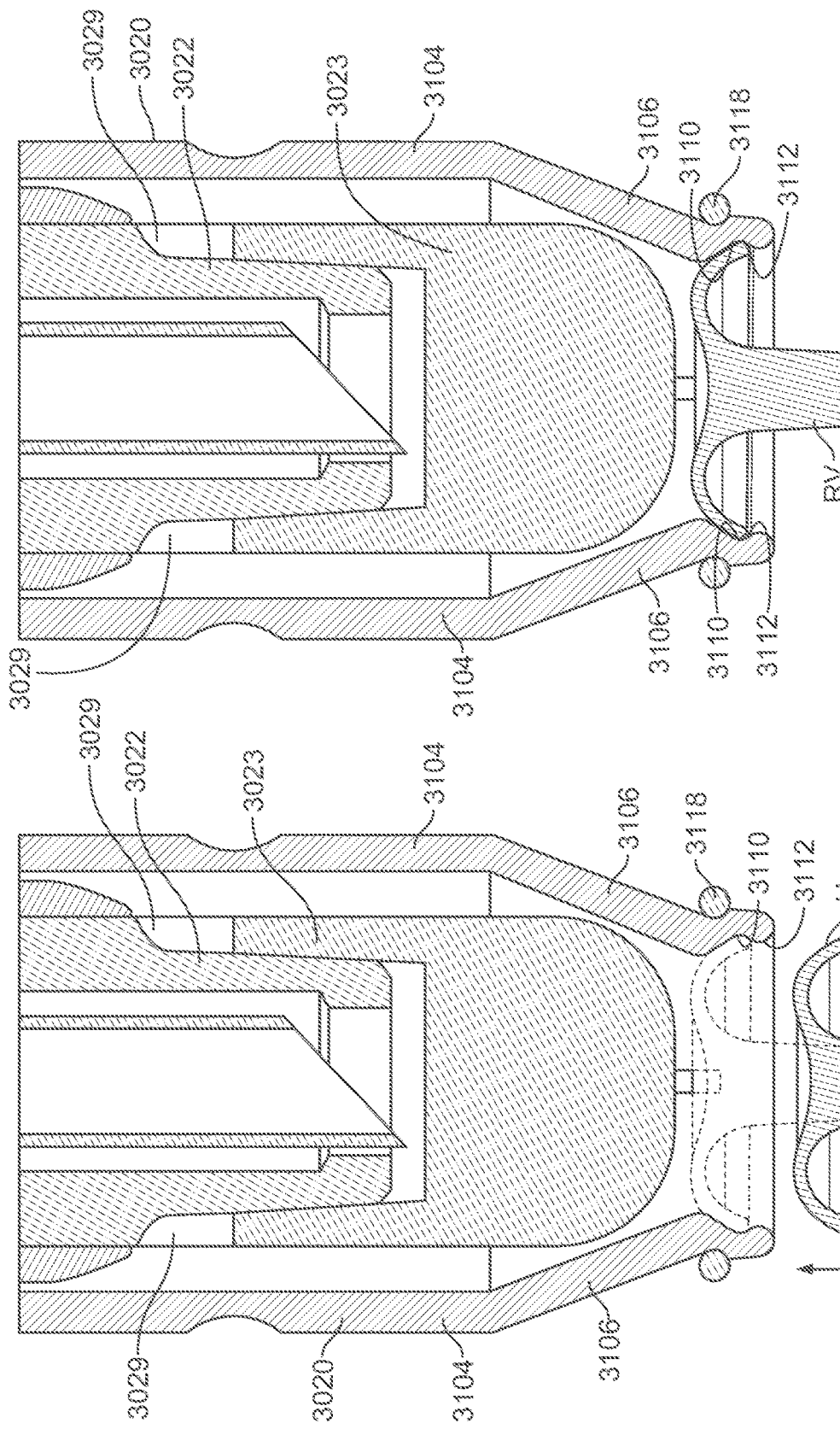

RESISTANCE SPOT RIVET WELDING SYSTEMS AND METHODS OF USE THEREOF

CROSS REFERENCE

This application is a national stage application claiming priority to and the benefit of International Application No. PCT/US2018/065329, filed on Dec. 13, 2018, which claims priority to U.S. Provisional Application No. 62/598,715, filed Dec. 14, 2017. The contents of each is hereby incorporated by reference.

FIELD OF USE

The present disclosure relates to resistance spot rivet welding systems, subsystems, and methods of use thereof.

BACKGROUND

Current methods of fastening together work pieces, such as fastening sheets together, can include the use of, for example, self-piercing rivets and/or flow drill rivets. These methods can require feeding rivets to a robotic riveting system.

SUMMARY

One aspect of the present disclosure is directed to a rivet dispenser reloading system for reloading a rivet dispensing system. The rivet dispenser reloading system may be used with, for example, a resistance spot rivet welding system. The rivet dispenser reloading system comprises a rivet receiving member and a first gate. The rivet receiving member defines a channel therein and comprises a first port and a second port. The first port communicates with the channel and is configured to receive rivets. The second port communicates with the channel and is configured to selectively engage with a rivet dispensing system and introduce rivets to the rivet dispensing system. The channel extends between the first port and the second port and is configured to transport rivets from the first port to the second port in a series arrangement and in a preselected orientation. The first gate is in communication with the second port. The first gate is selectively positionable between a first configuration inhibiting movement of rivets through the second port, and a second configuration enabling movement of rivets through the second port.

A further aspect of the present disclosure is directed to a method for reloading rivets into a rivet dispensing system of a riveting system. The riveting system may be, for example, a resistance spot rivet welding system. The method comprises receiving and storing a plurality of rivets in a series arrangement and in a preselected orientation within a channel of a rivet receiving member of a rivet dispenser reloading system. The rivet dispenser reloading system comprises a gate associated with the channel. The gate is selectively positionable between a first configuration inhibiting movement of rivets from the channel, and a second configuration enabling movement of rivets from the channel. A rivet dispensing system used with a resistance spot rivet welding system is aligned in a preselected orientation with the rivet receiving member utilizing an alignment member in communication with the rivet dispensing system. The plurality of rivets stored in the channel is introduced into the rivet dispensing system in series and in the preselected orientation via the gate associated with the channel.

One aspect of the present disclosure is directed to a rivet dispensing system. The rivet dispensing system comprises a rivet receiving member and a seat member. The rivet receiving member defines a channel therein and comprises a first port and a second port. The first port communicates with the channel and is configured to receive rivets. The second port communicates with the channel and is configured to dispense rivets. The channel extends between the first port and the second port and is configured to transport rivets from the first port to the second port in a series arrangement and in a preselected orientation. The seat member communicates with the second port and is configured to selectively engage with a rivet holder of a resistance spot rivet welding apparatus and present a single rivet from the channel to the rivet holder at one time.

A further aspect of the present disclosure is directed to a method for presenting a rivet to a rivet holder of a resistance spot rivet welding apparatus and/or a pedestal welder. The method comprises receiving the rivet and storing the rivet on a seat member of a rivet dispensing system. The rivet dispensing system moves along a path utilizing two linkages to align the seat member with the rivet holder of the resistance spot rivet welding apparatus. The rivet stored on the seat member is presented to the rivet holder.

In another aspect, a collet assembly is provided. The collet assembly comprises an actuator, and a collet connected to the actuator, the collet assembly being adapted to be installed on an external electrode holder, the collet being moveable by the actuator from an advanced position, in which the collet is adapted to grip a fastener, and a retracted position, in which at least a portion of the collet is retracted into the actuator to enable an electrode attached to the electrode holder to engage the fastener, and in which the collet is adapted to release the fastener. In an embodiment, the collet is adapted to release the fastener once the fastener is clamped by the electrode to an external workpiece.

In another aspect, a collet is provided which includes an elongated shank portion and a plurality of collet fingers extending from the shank portion, the plurality of collet fingers being sized and shaped to grip the fastener when the collet is in its advanced position. In an embodiment, each of the plurality of collet fingers includes a gripping portion. In an embodiment, each of the gripping portions includes a tapered member that is tapered inwardly relative to a longitudinal axis of the collet. In an embodiment, each of the gripping portions includes a first gripping segment that extends from the tapered member outwardly relative to the longitudinal axis of the collet, and a second gripping segment that extends from the first gripping segment inwardly relative to the longitudinal axis of the collet. In an embodiment, the collet includes a ring positioned around the plurality of collet fingers.

In another aspect, an actuator is provided which includes a housing having an upper end, a lower end opposite the upper end, and a central passage extending from the upper end to the lower end, and wherein the collet is positioned slidably within the central passage of the housing of the actuator. In an embodiment, the actuator includes a sleeve member having an inner sleeve positioned within the central passage of the housing of the actuator, and wherein the collet includes an internal passage, and wherein the inner sleeve of the sleeve member of the actuator is positioned within the internal passage of the collet. In an embodiment, the sleeve member includes a cap attached to the upper end of the housing. In an embodiment, the cap is attached removably to the upper end of the housing. In an embodiment, the sleeve member is integral with the housing. In an embodiment, the cap includes an advance port in communication with the central passage of the housing for providing pneumatic air pressure for advancing the collet to its advanced position. In an embodiment, the cap includes a return port in communication with the central passage of the housing for providing pneumatic air pressure for retracting the collet to its retracted position. In an embodiment, the collet includes a sensor member, and wherein the actuator includes a sensor located proximate to the upper end of the housing for sensing an alignment of the sensor member of the collet with the sensor when the collet is in its retracted position.

In another aspect, an electrode holder is provided which is positioned within the inner sleeve of the sleeve member. In an embodiment, the electrode holder includes an adapter shaft, the electrode being attached removably to the adapter shaft, wherein the electrode cap is shrouded by the collet when the collet is in its advanced position, and the electrode cap is exposed from the collet when the collet is in its retracted position. In an embodiment, the electrode is a welding electrode. In an embodiment, the fastener is a rivet or a stud. In an embodiment, the inner sleeve includes a free end having a beveled surface and positioned within the central passage of the housing proximate to the lower end of the housing, and wherein when the collet is moved from its advanced position to its retracted position, the tapered members of the collet engage the beveled surface of the inner sleeve. In an embodiment, the advance port and the return port are further adapted to release the pneumatic air pressure to enable the collet to move freely within the actuator relative to the inner sleeve between the advanced position of the collet and its retracted position of the collet.

In another aspect, in combination, a welding gun having a welding electrode, and a collet assembly, comprising an actuator, and a collet connected to the actuator is provided. The collet assembly being installed on the welding electrode, the collet being moveable by the actuator from an advanced position, in which the collet is adapted to grip a fastener, and a retracted position, in which at least a portion of the collet is retracted into the actuator to enable the electrode to weld the fastener to an external work piece, and in which the collet is adapted to release the fastener.

In another aspect, the present disclosure is directed to a resistance spot rivet welding system. The system can comprise, in combination, a rivet dispensing system according to the present disclosure, a rivet dispenser reloading system according to the present disclosure, and a rivet holder according to the present disclosure. According to one method of using the resistance spot rivet welding system, the rivet dispensing system can dispense rivets to the rivet holder, and the rivet dispenser reloading system can reload the rivet dispensing system with rivets as needed.

It is understood that the inventions disclosed and described in this specification are not limited to the aspects summarized in this Summary. The reader will appreciate the foregoing details, as well as others, upon considering the following detailed description of various non-limiting and non-exhaustive aspects according to this specification.

BRIEF DESCRIPTION OF THE DRAWINGS

The features and advantages of the examples, and the manner of attaining them, will become more apparent, and the examples will be better understood, by reference to the following description taken in conjunction with the accompanying drawings, wherein:

FIG. 12 is a side elevational view of a non-limiting embodiment of a rivet dispensing system comprising substantially parallel link arms according to the present disclosure, shown in three configurations, the substantially parallel link arms can be adjusted in order to change the motion of the rivet dispensing system;

FIG. 20A is close up view of an actuator and a collet employed by the feeding apparatus shown in FIGS. 18 and 19, the actuator and the collet shown in the first, home position, while

FIGS. 36 and 37 are bottom and top perspective views, respectively, of a collet employed by the collet assembly shown in FIG. 31;

FIGS. 42 and 43 are sectional views of a portion of the collet assembly shown in FIG. 30, and further showing steps of the collet assembly engaging and gripping a rivet;

Corresponding reference characters indicate corresponding parts throughout the several views. The exemplifications set out herein illustrate certain embodiments, in one form, and such exemplifications are not to be construed as limiting the scope of the appended claims in any manner.

DETAILED DESCRIPTION OF NON-LIMITING EMBODIMENTS

Figure 1A:
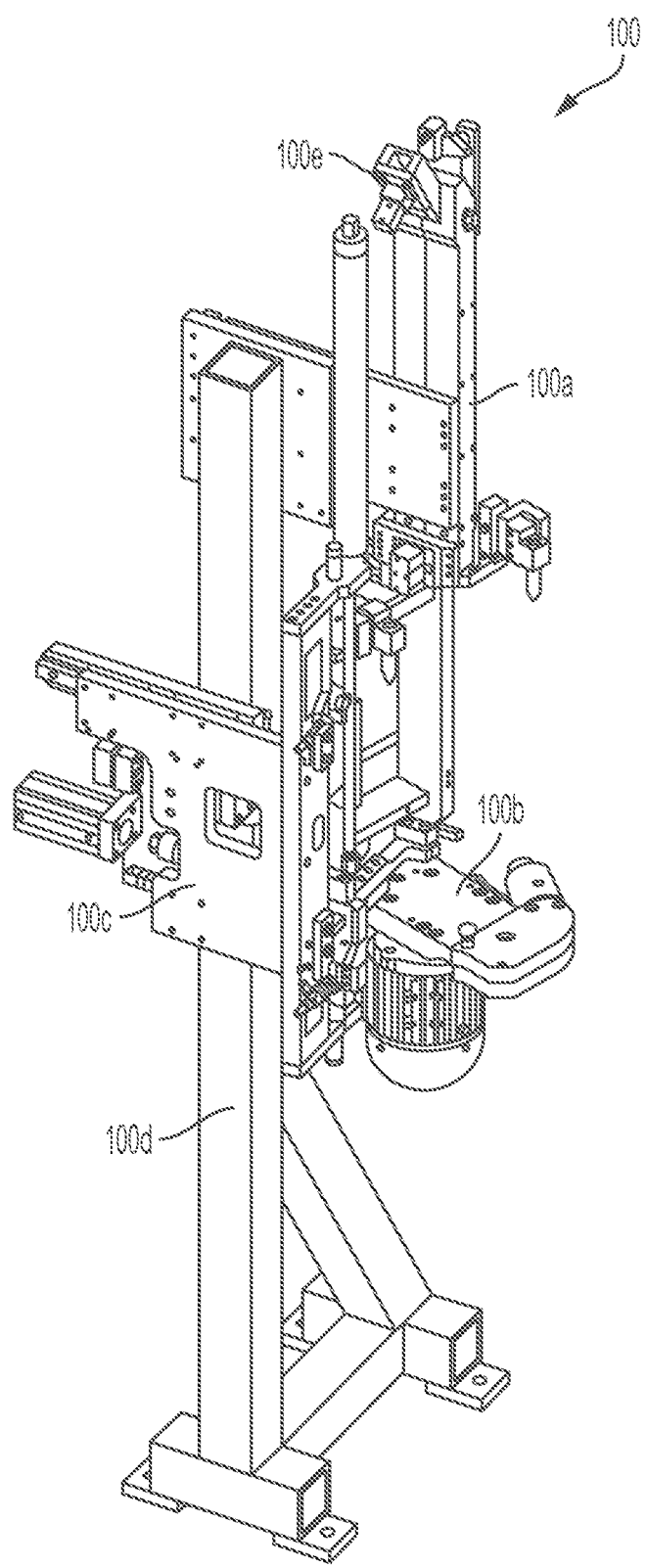
FIG. 1A is a perspective view of a non-limiting embodiment of a rivet dispenser reloading system according to the present disclosure.
Figure 1B:
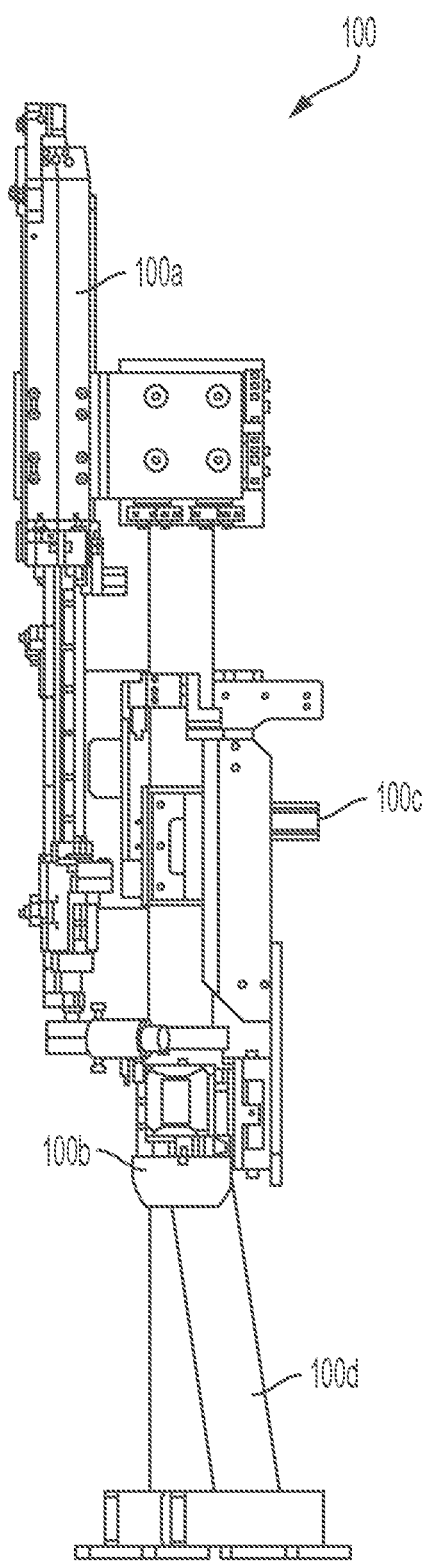
FIG. 1B is a right-side elevational view of the rivet dispenser reloading system of FIG. 1A.

Various examples are described and illustrated herein to provide an overall understanding of the structure, function, and use of the disclosed systems, apparatus, and methods. The various examples described and illustrated herein are non-limiting and non-exhaustive. Thus, the inventions are not limited by the description of the various non-limiting and non-exhaustive examples disclosed herein. Rather, the inventions are defined solely by the claims. The features and characteristics illustrated and/or described in connection with various examples may be combined with the features and characteristics of other examples. Such modifications and variations are intended to be included within the scope of this specification. As such, the claims may be amended to recite any features or characteristics expressly or inherently described in, or otherwise expressly or inherently supported by, this specification. Further, Applicant reserves the right to amend the claims to affirmatively disclaim features or characteristics that may be present in the prior art. The various embodiments disclosed and described in this specification can comprise, consist of, or consist essentially of the features and characteristics as variously described herein.

Any reference herein to "various embodiments," "some embodiments," "one embodiment," "an embodiment," or a like phrase means that a particular feature, structure, or characteristic described in connection with the example is included in at least one embodiment. Thus, appearances of the phrases "in various embodiments," "in some embodiments," "in one embodiment," "in an embodiment," or like phrases in the specification do not necessarily refer to the same embodiment. Furthermore, the particular described features, structures, or characteristics may be combined in any suitable manner in one or more embodiments. Thus, the particular features, structures, or characteristics illustrated or described in connection with one embodiment may be combined, in whole or in part, with the features, structures, or characteristics of one or more other embodiments, without limitation. Such modifications and variations are intended to be included within the scope of the present embodiments.

In this specification, unless otherwise indicated, all numerical parameters are to be understood as being prefaced and modified in all instances by the term "about," in which the numerical parameters possess the inherent variability characteristic of the underlying measurement techniques used to determine the numerical value of the parameter. At the very least, and not as an attempt to limit the application of the doctrine of equivalents to the scope of the claims, each numerical parameter described herein should at least be construed in light of the number of reported significant digits and by applying ordinary rounding techniques.

Also, any numerical range recited herein includes all sub-ranges subsumed within the recited range. For example, a range of "1 to 10" includes all sub-ranges between (and including) the recited minimum value of 1 and the recited maximum value of 10, that is, having a minimum value equal to or greater than 1 and a maximum value equal to or less than 10. Any maximum numerical limitation recited in this specification is intended to include all lower numerical limitations subsumed therein, and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited. All such ranges are inherently described in this specification.

The grammatical articles "a," "an," and "the," as used herein, are intended to include "at least one" or "one or more," unless otherwise indicated, even if "at least one" or "one or more" is expressly used in certain instances. Thus, the foregoing grammatical articles are used herein to refer to one or more than one (i.e., to "at least one") of the particular identified elements. Further, the use of a singular noun includes the plural and the use of a plural noun includes the singular, unless the context of the usage requires otherwise.

As used herein, a referenced element or region that is "intermediate" two other elements or regions means that the referenced element/region is disposed between, but is not necessarily in contact with, the two other elements/regions. Accordingly, for example, a referenced element that is "intermediate" a first element and a second element may or may not be adjacent to or in contact with the first and/or second elements, and other elements may be disposed between the referenced element and the first and/or second elements.

Resistance Spot Rivet (RSR™) technology is a new resistance welding joining technology that can allow joining of a variety of parts and assemblies made from various combinations of materials. RSR™ technology employs rivets (e.g., metallic rivets) of various geometries and materials to offer a selection of solutions to match each joining scenario. In RSR™ technology, rivets may be applied to a joint using conventional resistance spot rivet welding guns (e.g., transguns). The welding guns can be paired with a robotic manipulator and/or a pedestal welder and integrated into a system of auxiliary components. The components may perform operations including, for example, rivet handling, rivet sorting and orientation, rivet staging and feeding, rivet transfer, and presentation of the rivet to the electrode of the welding gun. Each joint created by RSR™ riveting system consumes a single rivet. A rivet source, i.e., a rivet dispensing system, may be a component of the RSR™ riveting system. In certain systems the robotically manipulated welding gun can be decoupled from the rivet dispensing system in order to maximize application flexibility. Periodic replenishment of the rivet dispensing system may be required when decoupled. The frequency of replenishment can be determined by the production application.

The present disclosure is directed to systems for reloading rivets carried in a rivet dispensing system for a riveting apparatus such as, for example, a resistance spot rivet welding system. A rivet dispenser reloading system, according to the present disclosure, can be located proximal to the location at which rivets are robotically installed on a part assembly, such as, for example, an automotive part assembly. The rivet dispenser reloading system may not be directly coupled to the robotic manipulator and welding gun during the welding process. In certain embodiments, the rivet dispenser reloading system can comprise a frame which can be located within reach of the robotic manipulator and within a fenced-off space or other safe operating space for operation of the robotic manipulator. In various embodiments, a single rivet reloading system can be utilized by multiple robotic manipulators.

When a rivet is required for joining of parts, a rivet dispensing system according to the present disclosure can convey rivets to a location proximal to the location of installation of the rivet on the part assembly being joined.

FIGS. 1A-D illustrate a non-limiting embodiment of a rivet dispenser reloading system 100 according to the present disclosure. As illustrated, the rivet dispenser reloading system 100 can comprise a first assembly 100*a*, a second assembly 100*b*, a third assembly 100*c*, a fourth assembly 100*d*, and a fifth assembly 100*e*. As shown in FIG. 1A, fourth assembly 100*d* is configured to be disposed on a floor or other foundation surface. First assembly 100*a* can be connected to and supported by fourth assembly 100*d*. Second assembly 100*b* and third assembly 100*c* can be connected to the fourth assembly 100*d*. The fifth assembly is connected to and supported by the first assembly 100*a*.

Figure 2A:
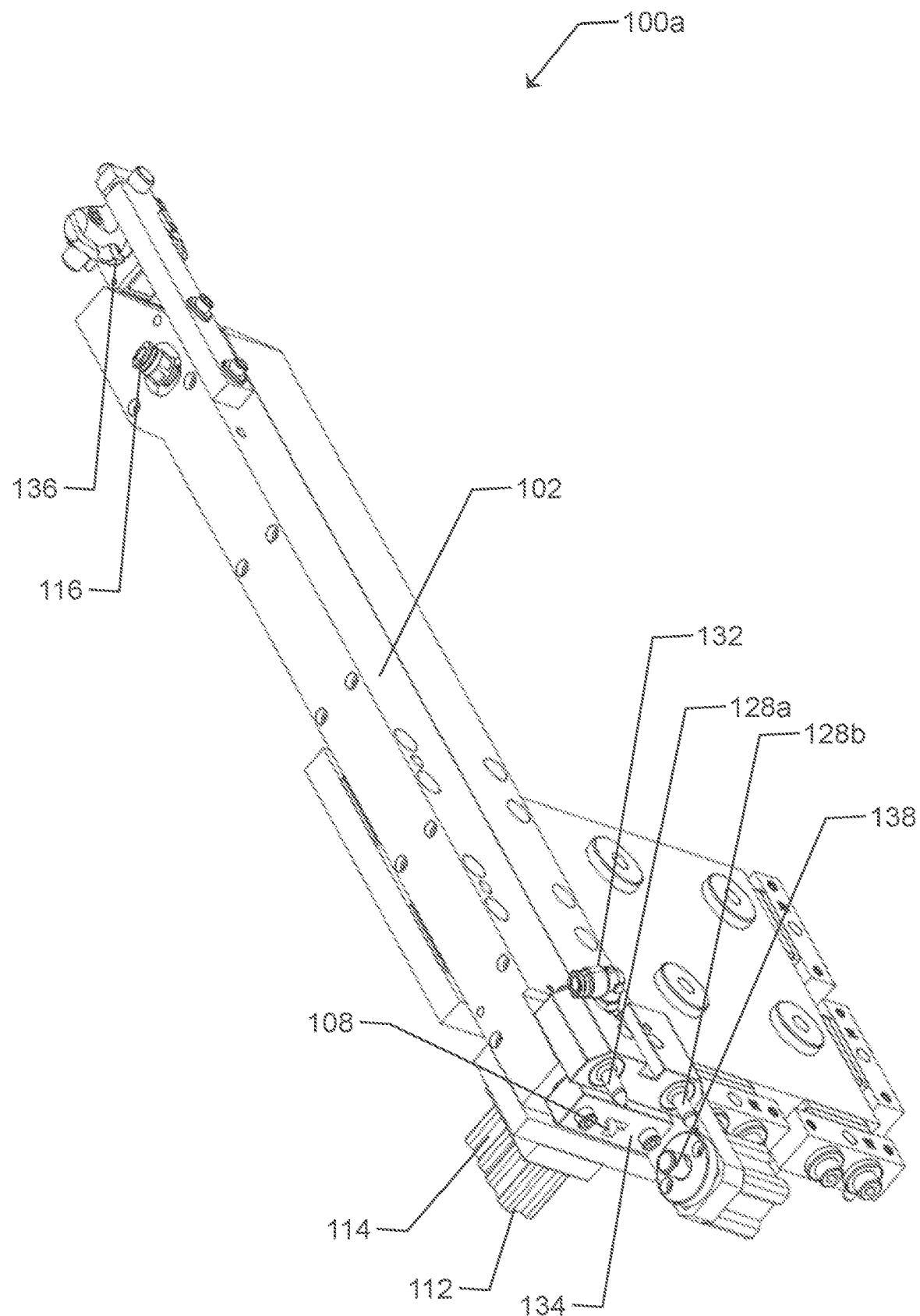
FIG. 2A is a perspective view of a first assembly of the rivet dispenser reloading system of FIG. 1A.
Figure 2B:
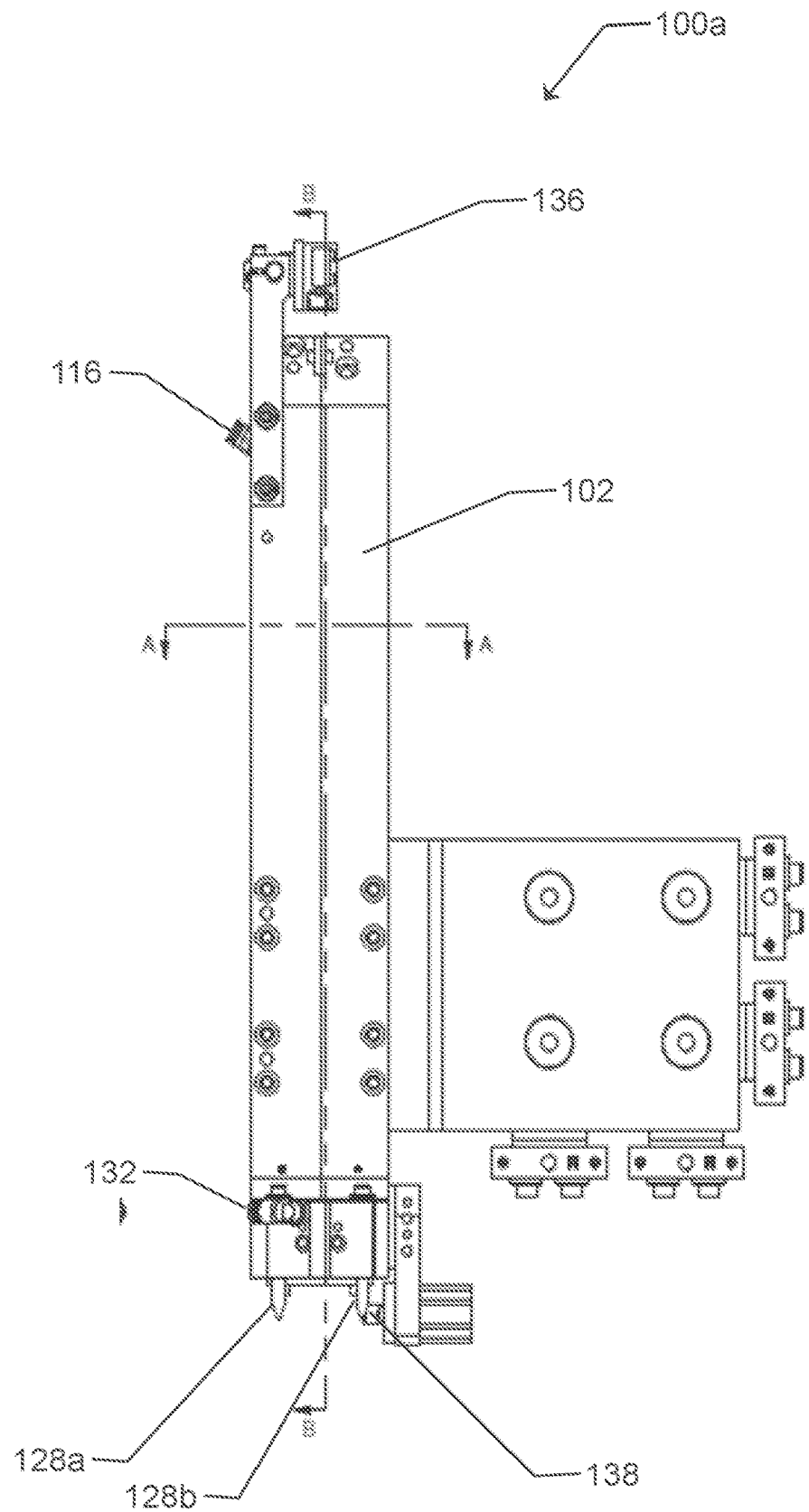
FIG. 2B is a front elevational view of the first assembly of FIG. 2A.
Figure 2C:
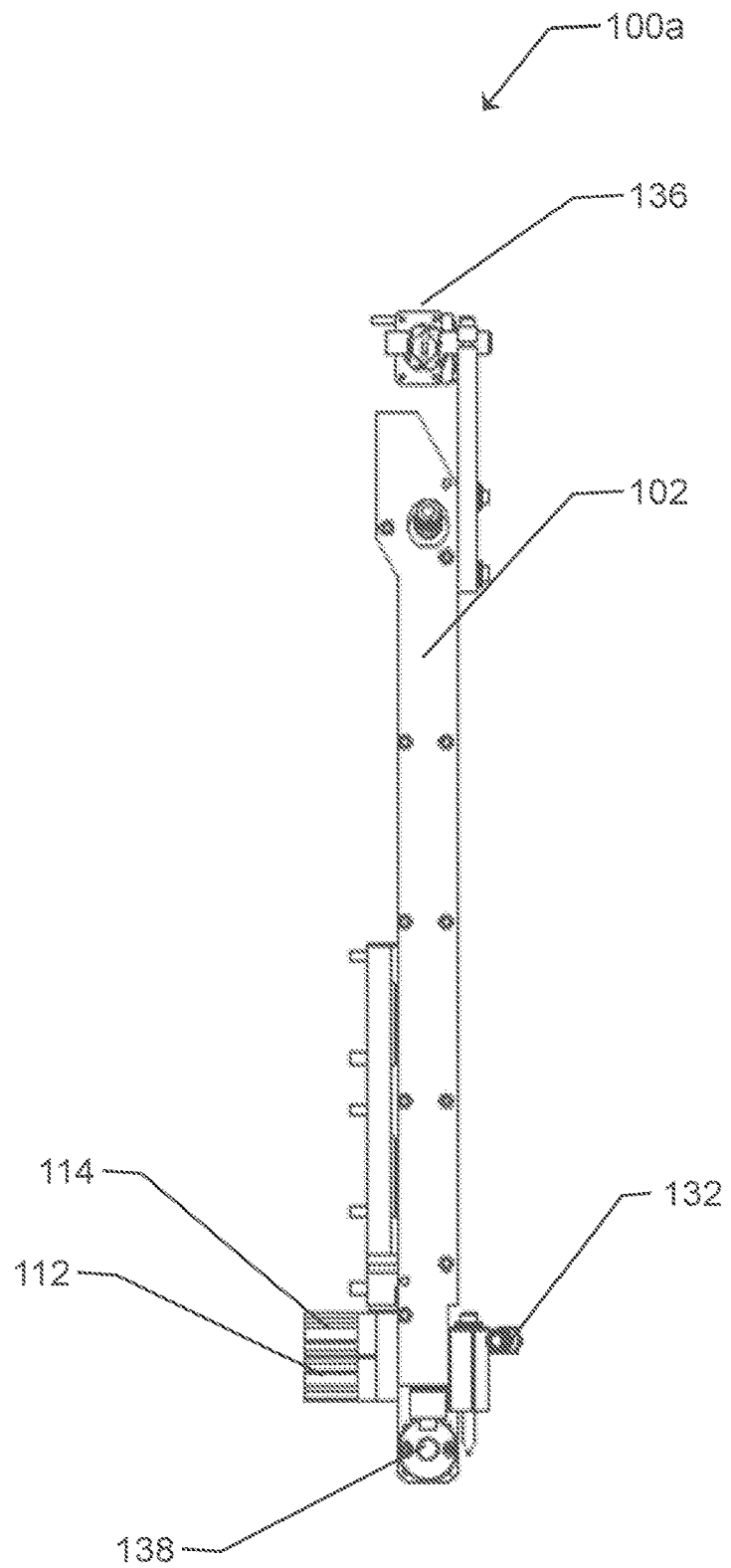
FIG. 2C is a right-side elevational view of the first assembly of FIG. 2A.
Figure 2D:
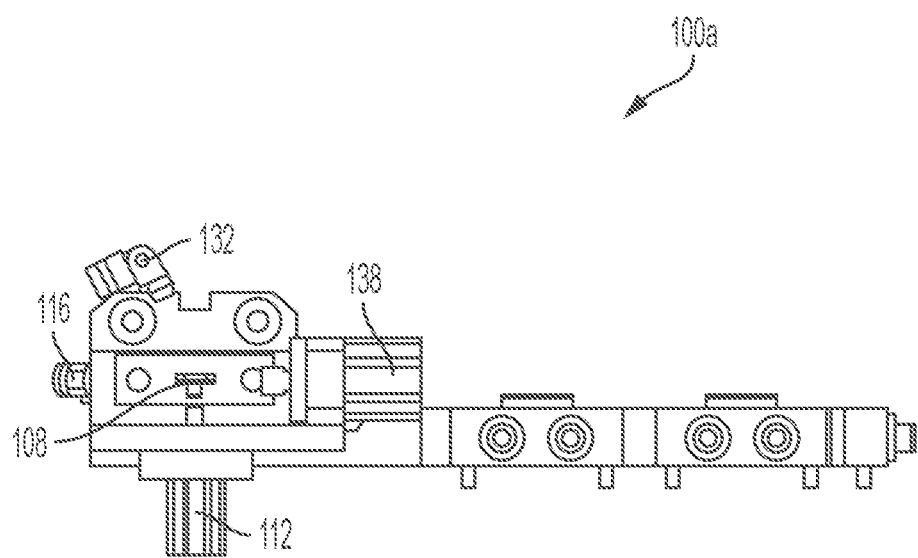
FIG. 2D is a bottom view of the first assembly of FIG. 2A.
Figure 2E:
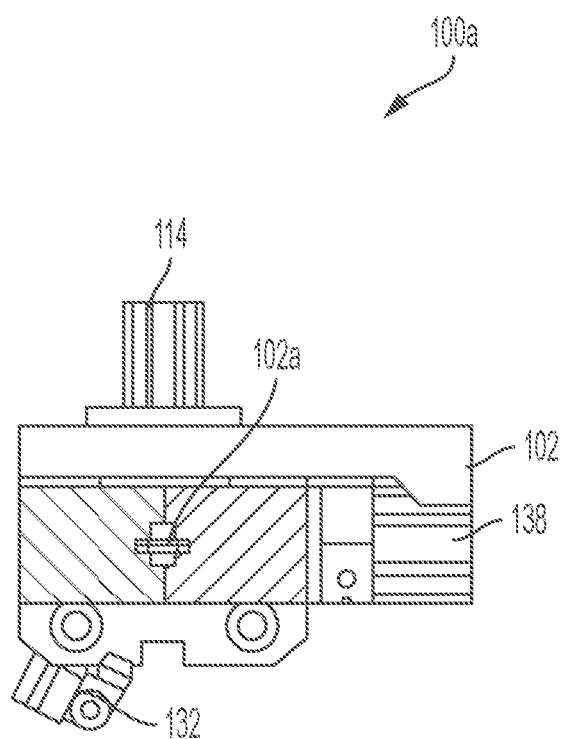
FIG. 2E is a cross-sectional view of the first assembly of FIG. 2A taken along the line A-A shown in FIG. 2B, in the direction of the arrows.
Figure 2F:
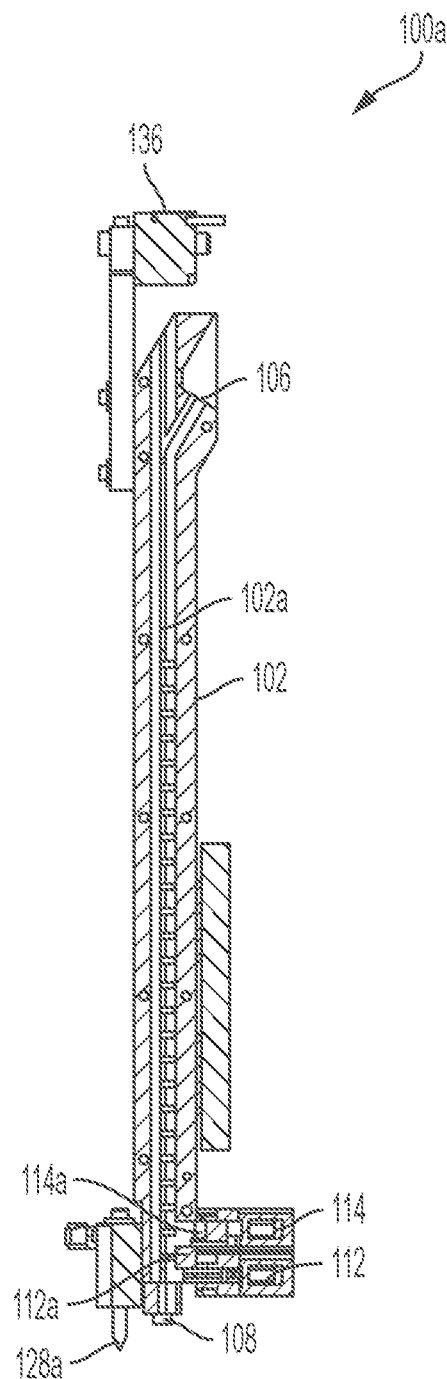
FIG. 2F is a cross-sectional view of the first assembly of FIG. 2A taken along the line B-B shown in FIG. 2B, in the direction of the arrows.
Figure 3A:
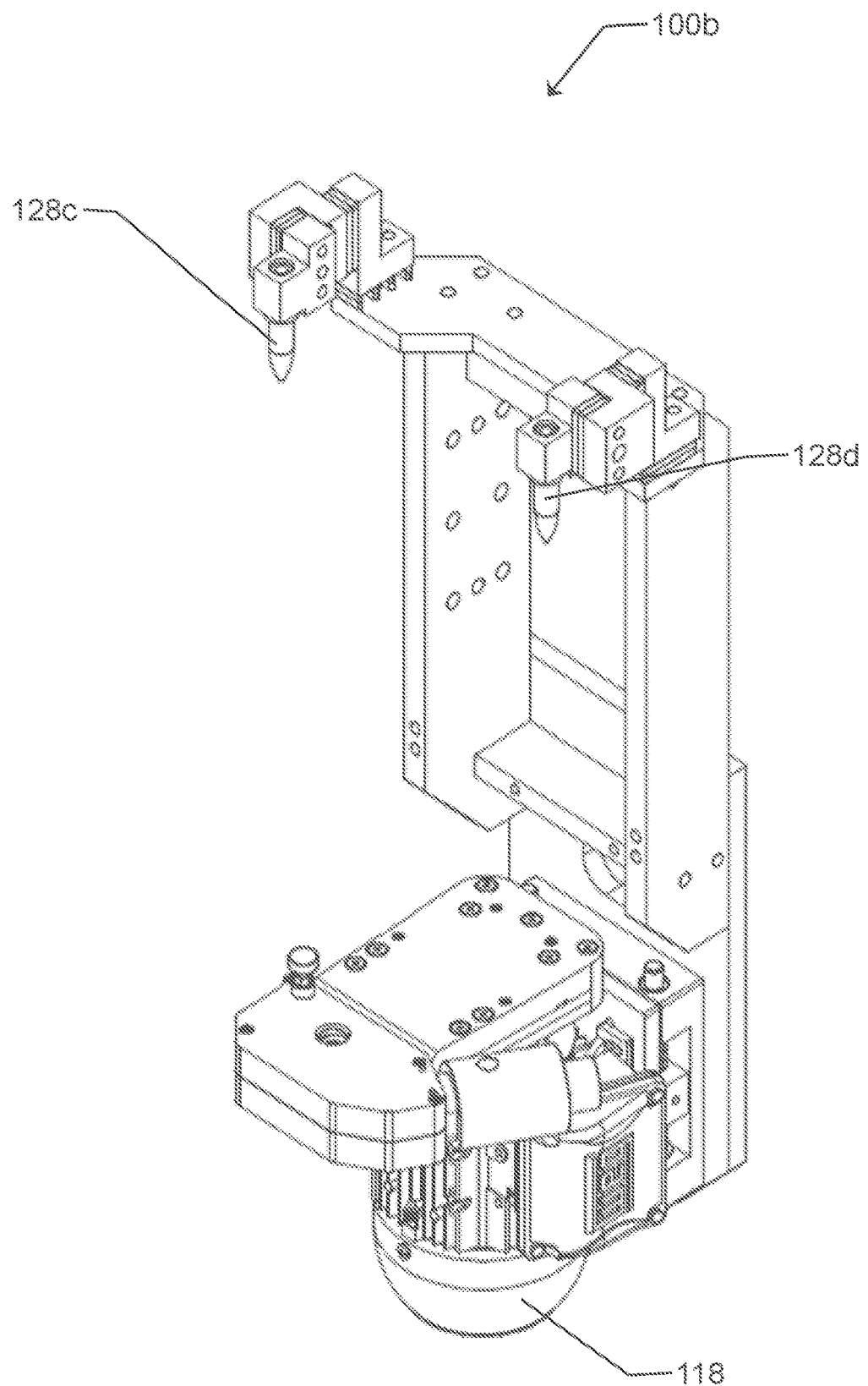
FIG. 3A is a perspective view of a second assembly of the rivet dispenser reloading system of FIG. 1A.
Figure 3B:
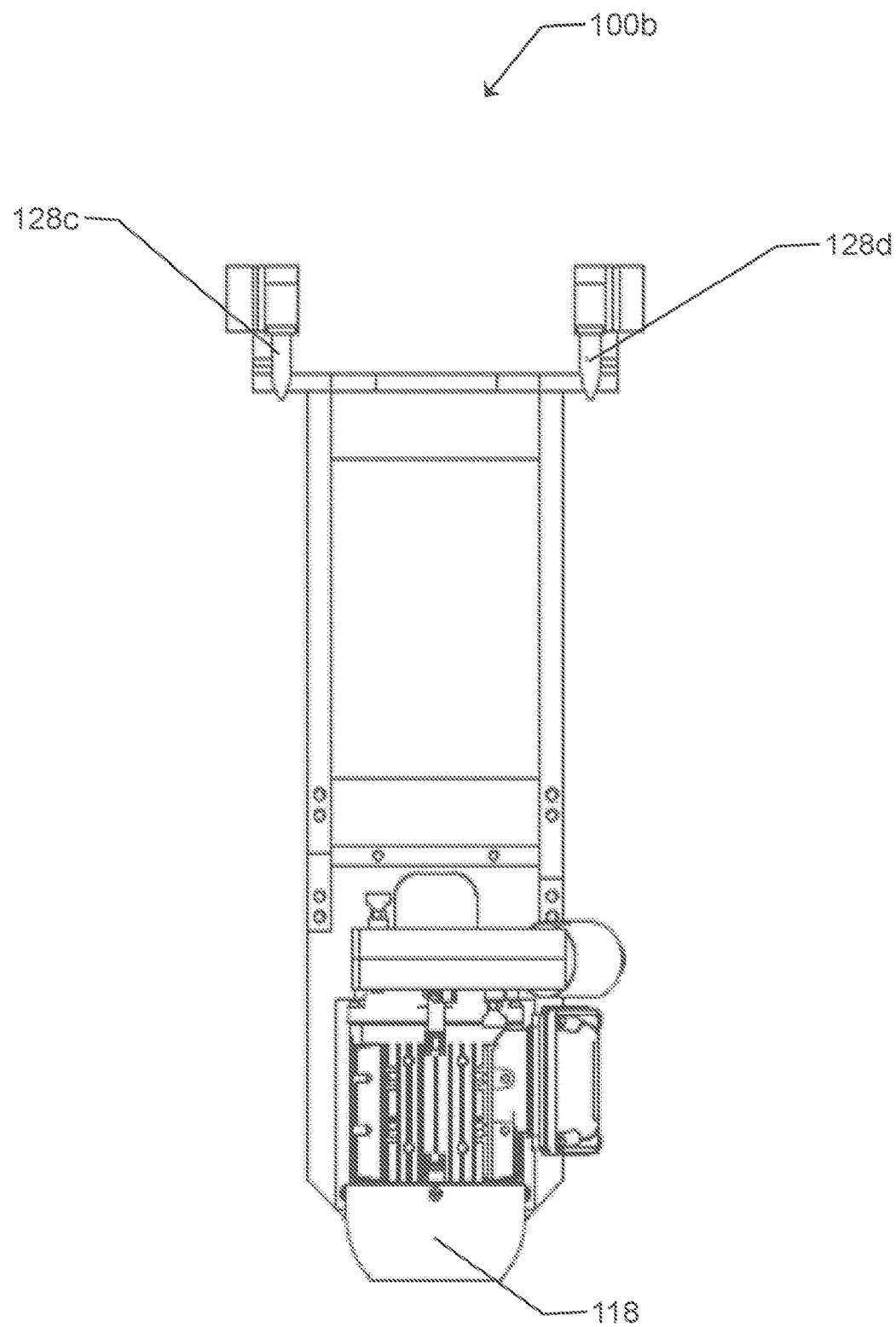
FIG. 3B is a front elevational view of the second assembly of FIG. 3A.
Figure 3C:
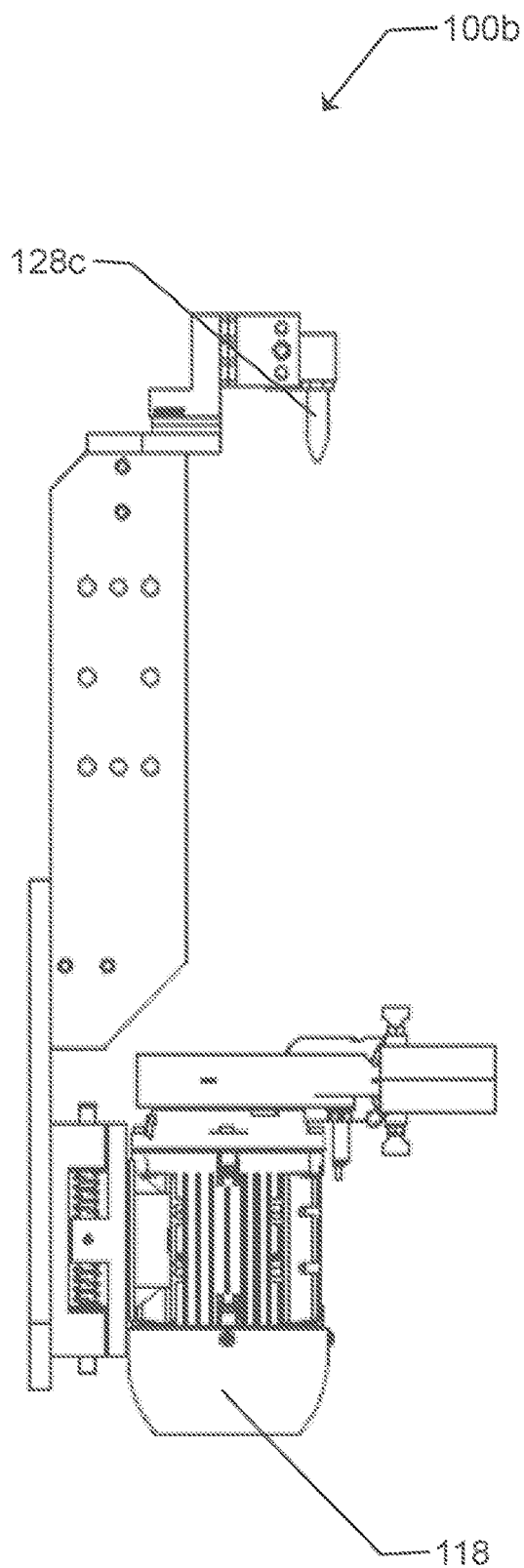
FIG. 3C is a left-side elevational view of the second assembly of FIG. 3A.
Figure 3D:
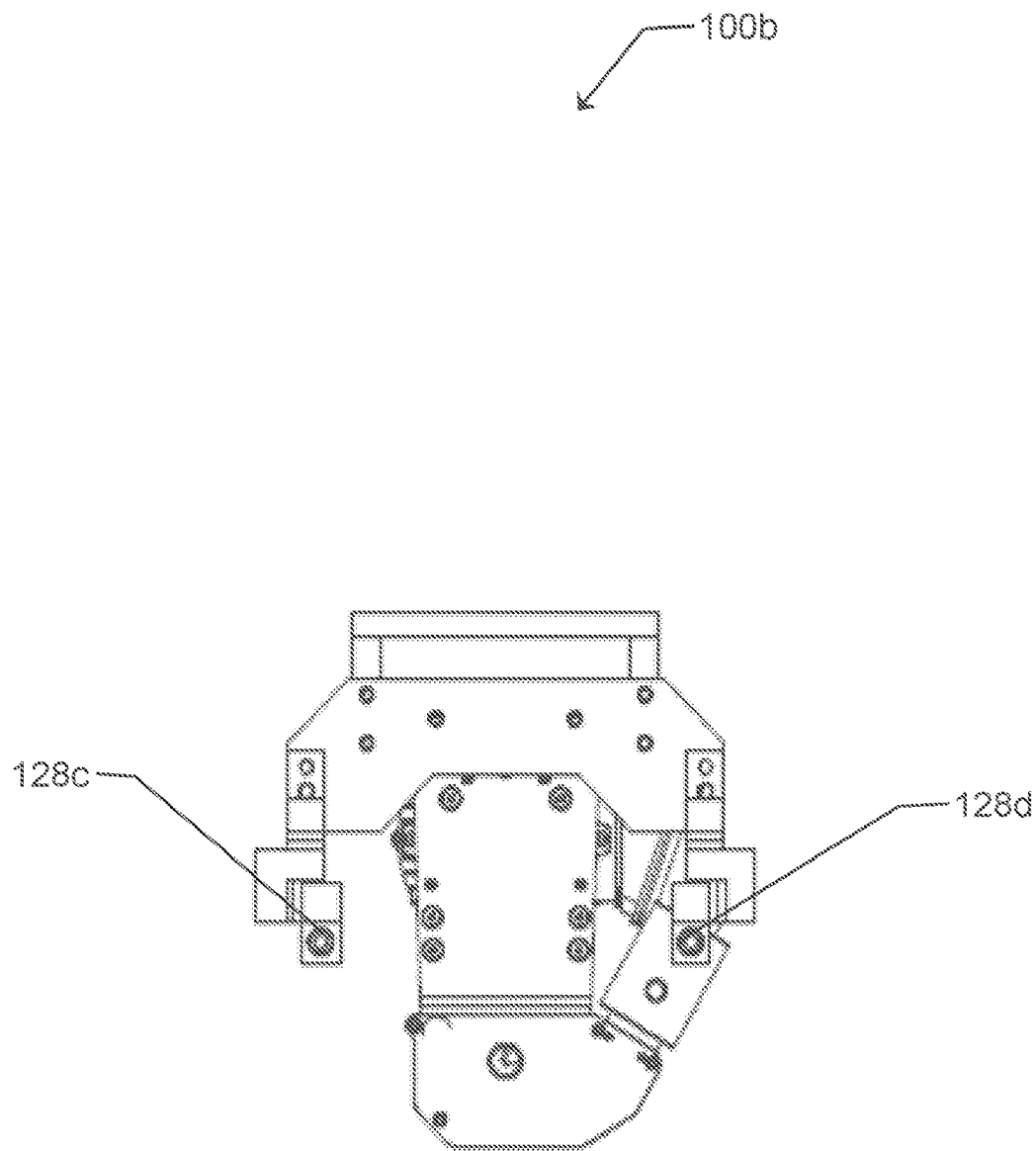
FIG. 3D is a top view of the second assembly of FIG. 3A.
Figure 4A:
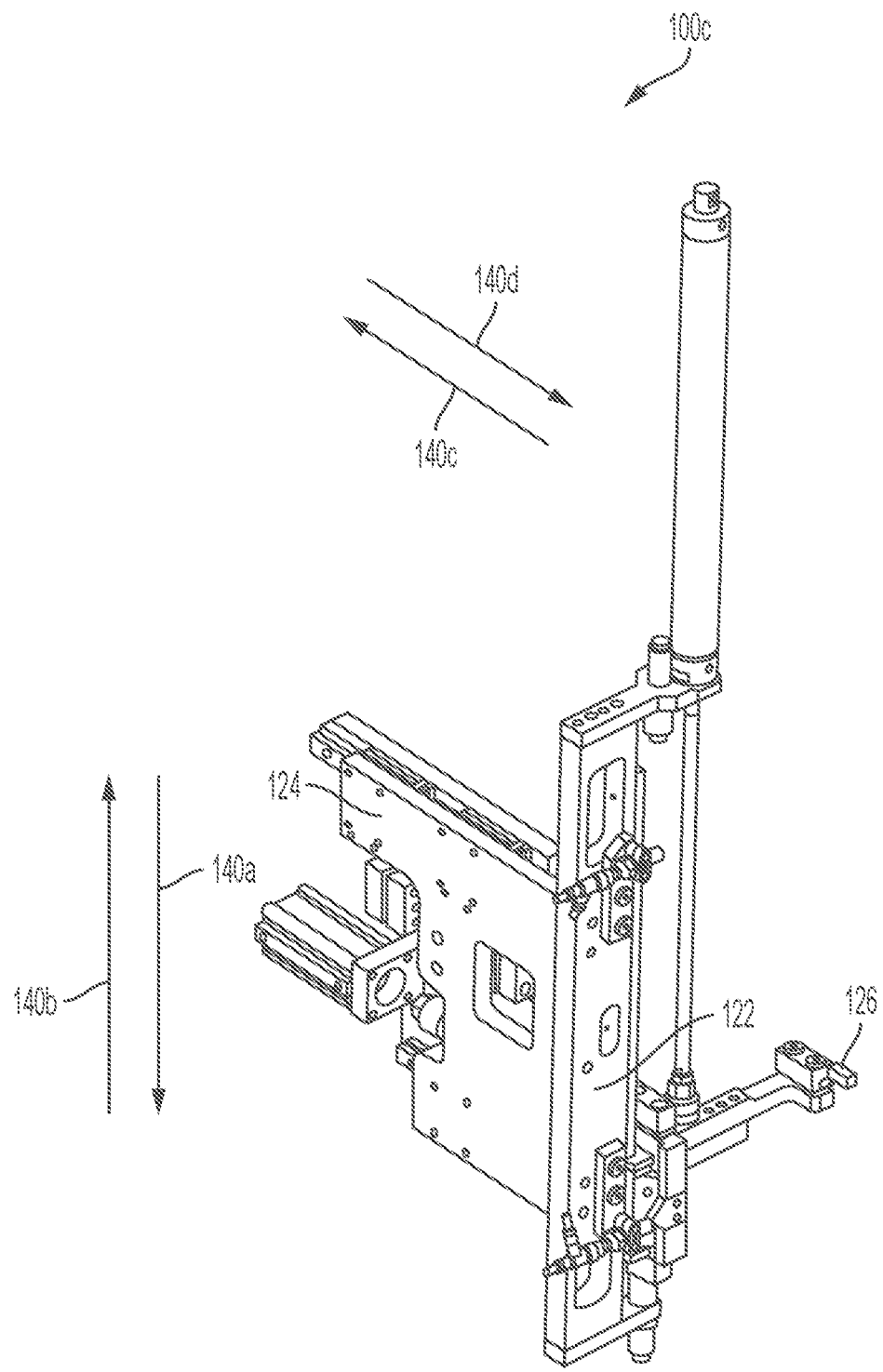
FIG. 4A is perspective view of a third assembly of the rivet dispenser reloading system of FIG. 1A.
Figure 4B:
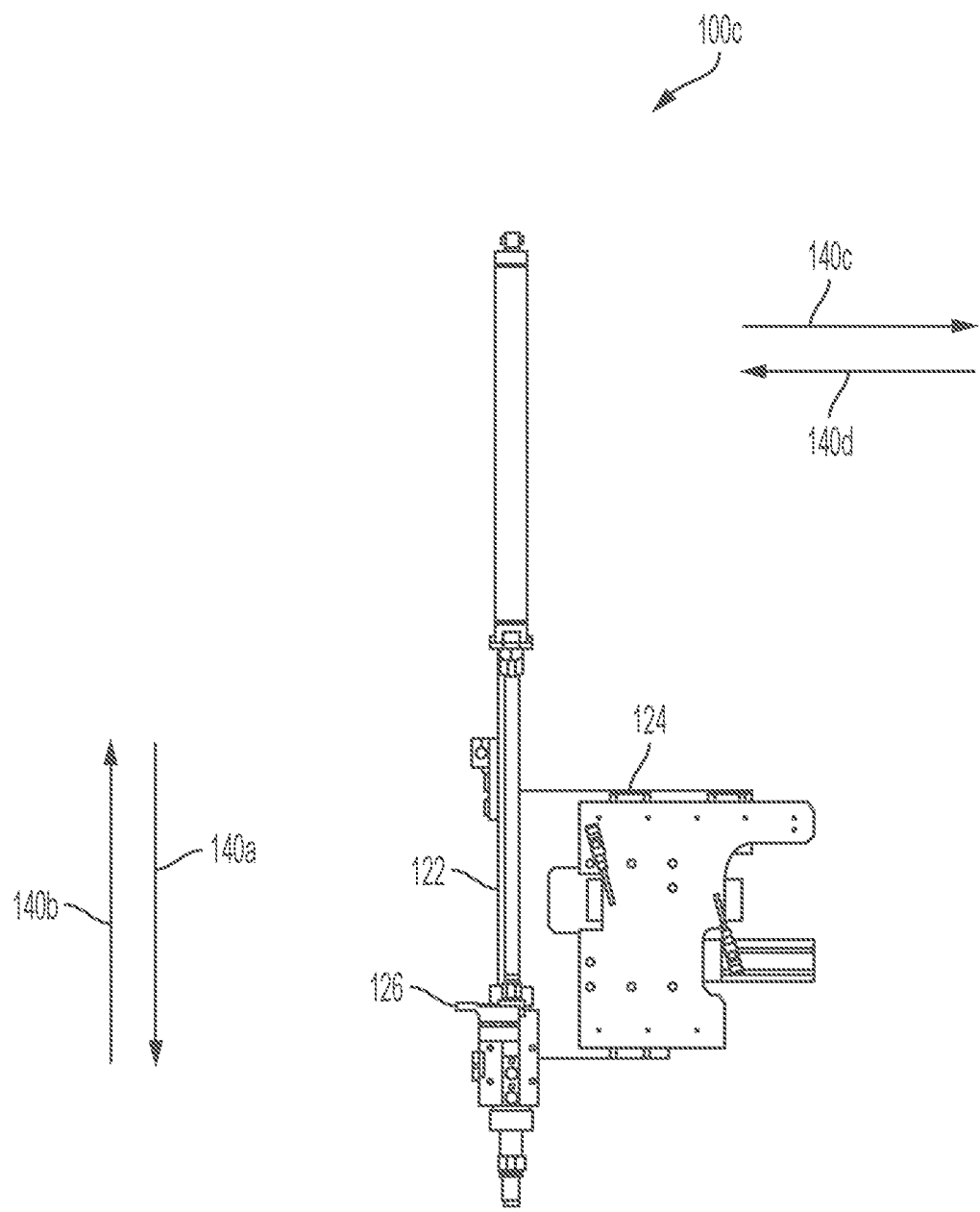
FIG. 4B is a right-side elevational view of the third assembly of FIG. 4A.
Figure 4C:
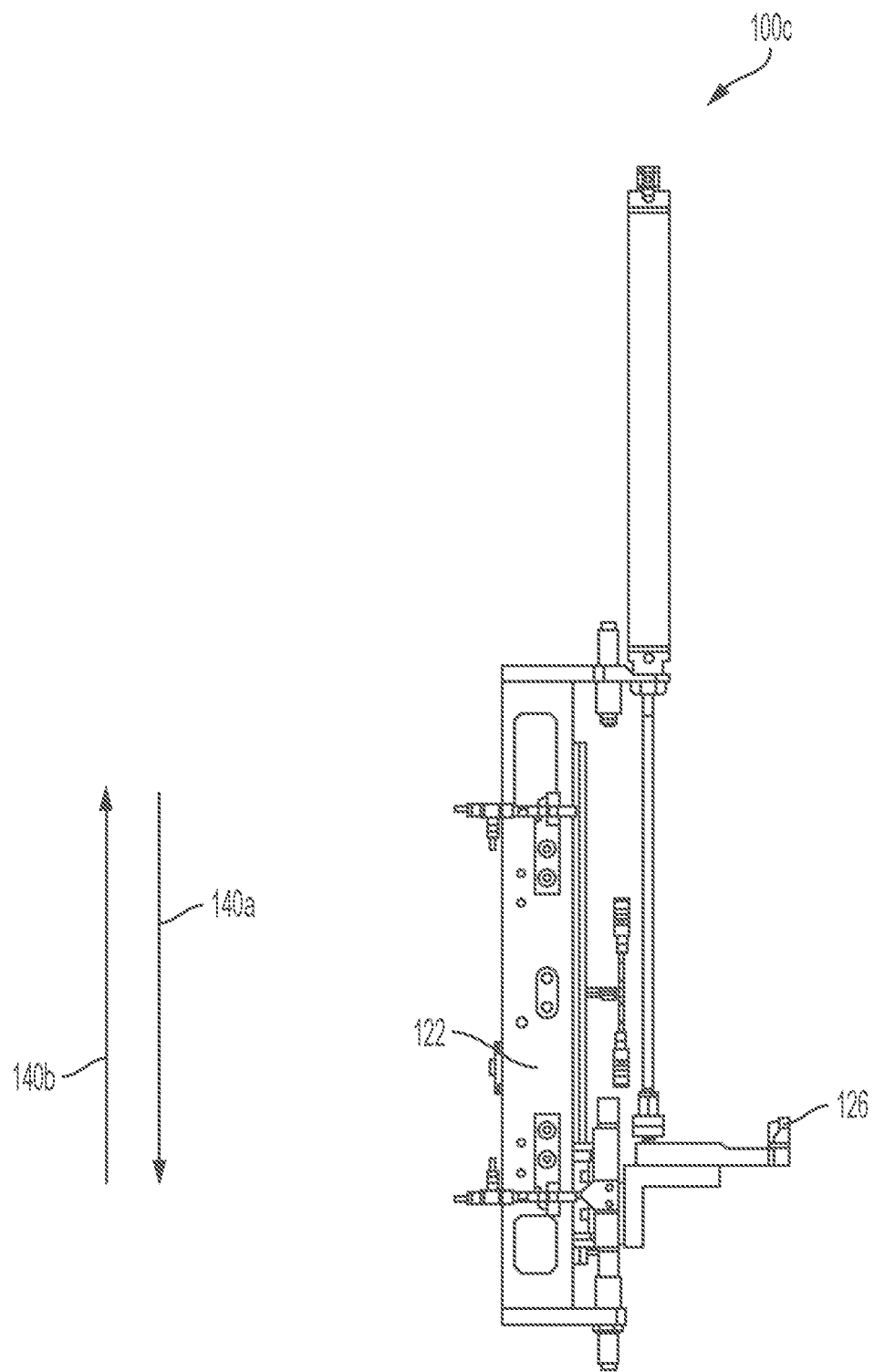
FIG. 4C is a front elevational view of the third assembly of FIG. 4A.
Figure 4D:
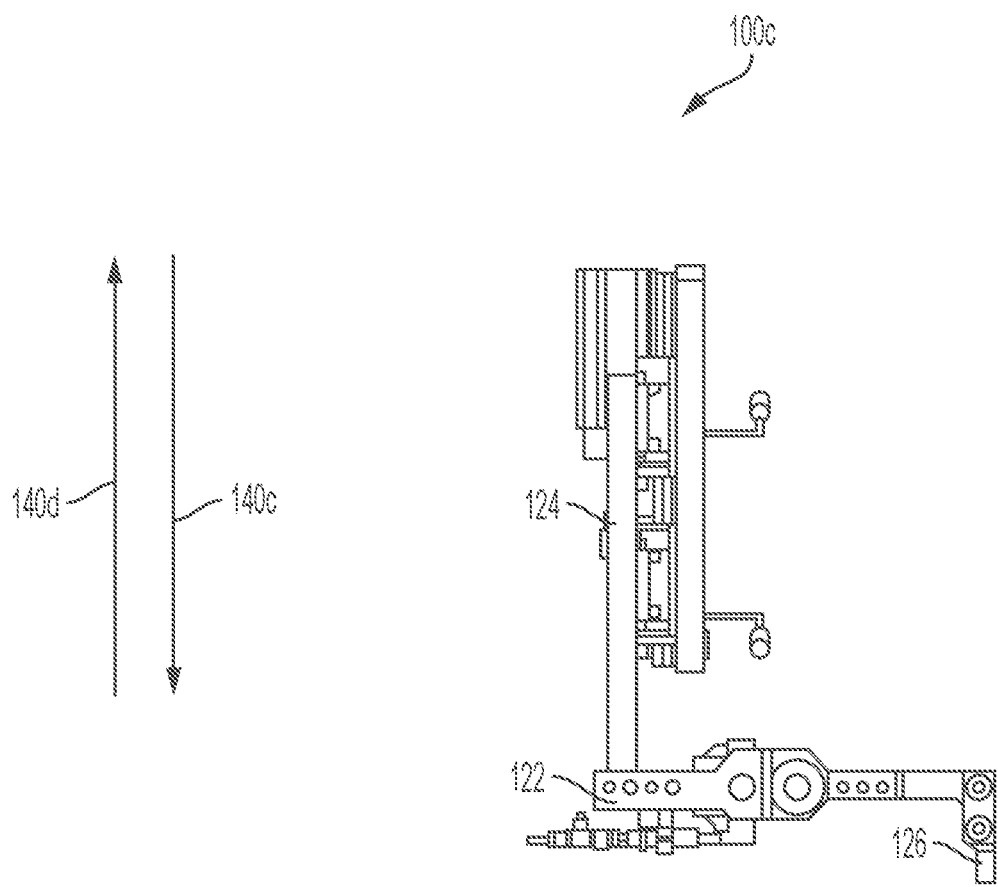
FIG. 4D is a top view of the third assembly of FIG. 4A.
Figure 8:
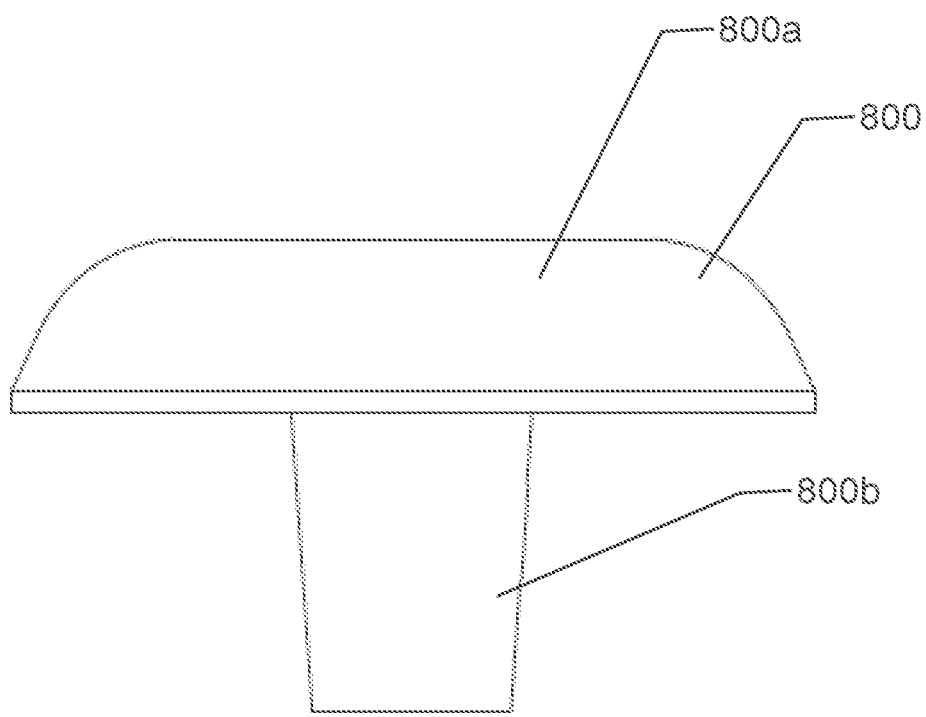
FIG. 8 is a front elevational view of a non-limiting embodiment of a rivet that may be used with certain embodiments of a rivet dispenser reloading system according to the present disclosure.

FIGS. 2A-F show first assembly 100*a* of the rivet dispenser reloading system 100. Assembly 100*a* can be structured to receive and store rivets. One embodiment of a rivet 800 used in, for example, a resistance riveting process is shown in FIG. 8. The rivet 800 comprises a head portion 800*a* and a stem portion 800*b*, and can comprise a metal or metal alloy suitable for resistance riveting. As best shown in FIGS. 2F and 2E, which are sectional views taken along lines A-A and B-B, respectively, shown in FIG. 2B, first assembly 100*a* can comprise a rivet receiving member 102 defining a channel 102*a* therein. The rivet receiving member 102 can comprise a first port 106 and a second port 108. The first port 106 can be in communication with the channel 102*a* and configured (e.g., shaped and positioned) to receive rivets. The second port 108 can be in communication with the channel 102*a* and configured (e.g., shaped and positioned) to dispense rivets from the channel 102*a*.

The first port 106 can receive rivets from a fastener feeder in a series arrangement in a preselected orientation. The rivets received by the first port 106 can traverse into the channel 102*a* in the series arrangement and preselected orientation towards the second port 108.

The channel 102*a* can extend between the first port 106 and the second port 108. The channel 102*a* can be configured to store rivets in, and transport rivets along, channel 102*a* from the first port 106 to the second port 108 in a series arrangement (e.g., aligned in a row) and in a preselected orientation. The channel 102*a* can be configured to store a single rivet or a plurality of rivets in the series arrangement and in the preselected orientation until the rivets are dispensed through the second port 108. As such, as rivets emerge from the second port 108, they do so in series and in the preselected orientation. In various embodiments, the rivets with the channel 102*a* can comprise the same dimensions or different dimensions; and/or the rivets within the channel can comprise the same material composition or different material compositions.

In various non-limiting embodiments, a cross-section of the channel 102*a* can be substantially "T"-shaped. In various other non-limiting embodiments, a cross-section of the channel 102*a* can be suitable to accommodate a weld-stud and/or a weldnut. The channel 102*a* can comprise a cross-sectional shape and size suitable to accommodate one or more sizes and configurations of rivets. The cross-sectional shape and size of the channel 102*a* can be selected so that rivets within the channel move through the channel 102*a* in a series arrangement and in a preselected orientation within the rivet receiving member 102. The cross-sectional shape and size of the channel 102*a* can inhibit, if not prevent, jamming of rivets within the channel 102*a*, shingling (e.g., overlapping head portions of rivets) of rivets, and gaps between successive rivets within the channel 102*a*. In certain embodiments, the rivet receiving member 102 can comprise two halves that are connected together to form the rivet receiving member 102 and the channel 102*a*. For example, each half can comprise a profile cut along its length and, as shown in FIG. 2E, the joined profiles form the channel 102*a*. In certain embodiments, the rivet receiving member 102 can comprise at least one of aluminum, an aluminum alloy, magnesium, a magnesium alloy, steel, a steel alloy, a plastic, and a composite. In various embodiments, the rivet receiving member 102 may be non-magnetic. In certain embodiments, the rivet receiving member 102 can comprise a coating to increase wear resistance.

The rivet receiving member 102 can be oriented in space so that gravity urges rivets to move through the channel 102*a* from the first port 106 to the second port 108 in a series arrangement. For example, the rivet receiving member 102 can be oriented such that channel 102*a* is substantially vertical, maximizing the assisting force of gravity to move rivets through the channel 102*a*.

As shown in FIG. 2B, in certain embodiments, the first assembly 100*a* can comprise a gas port 116 communicating with the channel 102*a*. The gas port 116 can be configured to allow passage of pressurized gas into the channel 102*a* and urge rivets to move through the channel 102a toward the second port 108. The gas port 116 can comprise a fitting suitable for connection with a gas input line. The gas port 116 can be disposed proximal to the first port 106 and can selectively introduce pressurized gas into the channel 102a upstream of rivets disposed within the channel 102a, urging rivets in the channel 102a toward second port 108. The gas can comprise, for example, air or an inert gas.

In certain embodiments, the first assembly 100a can comprise a gas port 132 communicating with the second port 108. The gas port 132 can be configured to introduce a pressurized gas to the second port 108 to thereby urge rivets to move through the second port 108 and be dispensed from the channel 102a. The gas port 132 can comprise a fitting suitable for connection with a gas input line. The gas can comprise, for example, air or an inert gas.

As shown in FIGS. 2A, 2C, 2D, and 2F, a first gate 112 can be in communication with the second port 108. The first gate 112 can be connected to the rivet receiving member 102 and, in certain embodiments, can comprise a pin 112a configured to engage a rivet within the channel 102a. For example, as shown in FIG. 2F, the pin 112a can selectively engage a head of a rivet (e.g., an outer diameter of the rivet) and/or a stem of a rivet in the channel 102a. The first gate 112 can be selectively positioned between a first configuration and a second configuration. When in the first ("closed") configuration, the first gate 112 can inhibit movement of rivets along the channel 102a through the second port 108 (e.g., the pin 112a can enter the channel 102a and block or engage a rivet in the channel 102a). When in the second ("open") configuration, the first gate 112 can allow movement of rivets along the channel 102a and through the second port 108 (e.g., the pin 112a can retract from the channel 102a and allow rivets to move freely through the second gate 112).

As shown in FIGS. 2A, 2C, and 2F, a second gate 114 can be in communication with the channel 102a. The second gate 114 can be connected to the rivet receiving member 102 and, in certain embodiments, can comprise a pin 114a configured to engage a rivet within the channel 102a. For example, the pin 114a can engage a head and/or a stem of a rivet within the channel 102a. The second gate 114 can be selectively positioned between a first configuration and a second configuration. When in the first (e.g., "closed") configuration, the second gate 114 can inhibit movement of rivets along the channel 102a (e.g., the pin 114a can enter the channel 102a and block or engage a rivet in the channel 102a). When in the second (e.g., "open") configuration, the second gate 114 can allow movement of rivets along the channel 102a and (e.g., the pin 114a can retract from the channel 102a and allow rivets to move freely through the second gate 114).

To release rivets from the channel 102a of the rivet receiving member 102, the second gate 114 and the first gate 112 can be positioned in the second configuration. The gas port 116 can introduce pressurized gas into the channel 102a to dispense the rivets from the channel 102a within the rivet receiving member 102. Once the rivets are dispensed from the channel 102a, the first gate 112 can be positioned in the first configuration to inhibit the traversal of rivets through the second port 108 and enable storage of rivets within the channel 102a.

The second gate 114 can be configured to selectively allow movement of a single rivet at one time through the second port 108 to be dispensed from the channel 102a, while inhibiting movement of additional rivets from the channel 102a through the second port 108. For example, the first gate 112 can be intermediate the second gate 114 and the second port 108. The second gate 114 can be placed in the first configuration and a single rivet can be intermediate the second gate 114 and the first gate 112. The first gate 112 can be placed in the second configuration to enable movement of the single rivet through the second port 108. In various non-limiting embodiments, when in their second configurations, the first gate 112 engages a head of a rivet and the second gate 114 engages a stem of a rivet in the channel 102a.

In various embodiments, the first gate 112 and the second gate 114 can be selectively positioned in the first configuration or the second configuration pneumatically, by operation of an electric servo motor, and/or an electric solenoid. In various embodiments, a switch or sensor can be associated with the first gate 112 and/or the second gate 114 to monitor whether the gate 112, 114 is in a first configuration or second configuration.

As shown in FIG. 2A, for example, in certain embodiments the first assembly 100a can comprise a locking pin 138 in a position adjacent the second port 108. The locking pin 138 can be configured, for example, to engage a pin receiving bore of a resistance spot rivet welding apparatus comprising a rivet dispensing system to secure the resistance spot rivet welding apparatus to the rivet dispenser reloading system 100 in an orientation so that the rivet dispenser reloading system 100 can feed rivets into the rivet dispensing system. The locking pin 138 can be operatively coupled to a pneumatic cylinder, a guide bushing, and/or a mounting plate, for example. A switch or sensor can be associated with the locking pin 138 to monitor the position of the locking pin 138. The locking pin 138 can be operated pneumatically or by action of an electric servo motor to secure the rivet dispenser reloading system 100 to a resistance spot rivet welding apparatus.

A sensor 136 can be configured to detect an orientation of rivets within the channel 102a, the quantity of rivets within the channel 102a, or some other property of the rivets within the channel 102a. The sensor 136 can be connected to the rivet receiving member 102. The sensor 136 may be any suitable sensor configured to detect size, orientation, position, and/or amount of rivets. The type of sensor used may vary depending on the type, size, and/or the configuration of the rivet receiving member 102 and/or the rivets used.

In various embodiments, the first assembly 100a can comprise an alignment member 128a and an alignment member 128b. The alignment members 128a, 128b can comprise a bushing, a conical pin, and/or a spring/piston to enable axial compliance between the first assembly 100a and a rivet dispensing system of a resistance spot rivet welding apparatus. For example, the alignment members 128a, 128b can be received in precisely positioned alignment bushings provided in a resistance spot rivet welding apparatus so that a rivet dispensing system of the resistance spot rivet welding apparatus is precisely oriented relative to the rivet receiving member 102a and rivets dispensed through the second port 108 of the rivet receiving member 102a are received in the rivet dispensing system.

In various embodiments, the first assembly 100a can include a contact block 134. The contact block 134 can be configured to inhibit transfer of forces between the first assembly 100a and the rivet dispensing system of a resistance spot rivet welding apparatus as the rivet dispensing system is brought into contact with the first assembly 102a in an orientation so that the rivets can be dispensed from the rivet receiving member 102 of the first assembly 100a through the second port 108 and into the rivet dispensing system. In certain embodiments, the contact block 134 may include spring-mounted pins that absorb force as the rivet dispensing system closely approaches the first assembly 102a in a correct orientation.

In various embodiments, the first assembly 100a also can include additional elements, such as, for example, at least one of a mounting plate, a squaring block, and a shim. The additional elements can enable adjustment of the first assembly 100a in at least three degrees of freedom relative to the fourth assembly 100d of the rivet dispenser reloading system 100.

Figure 1C:
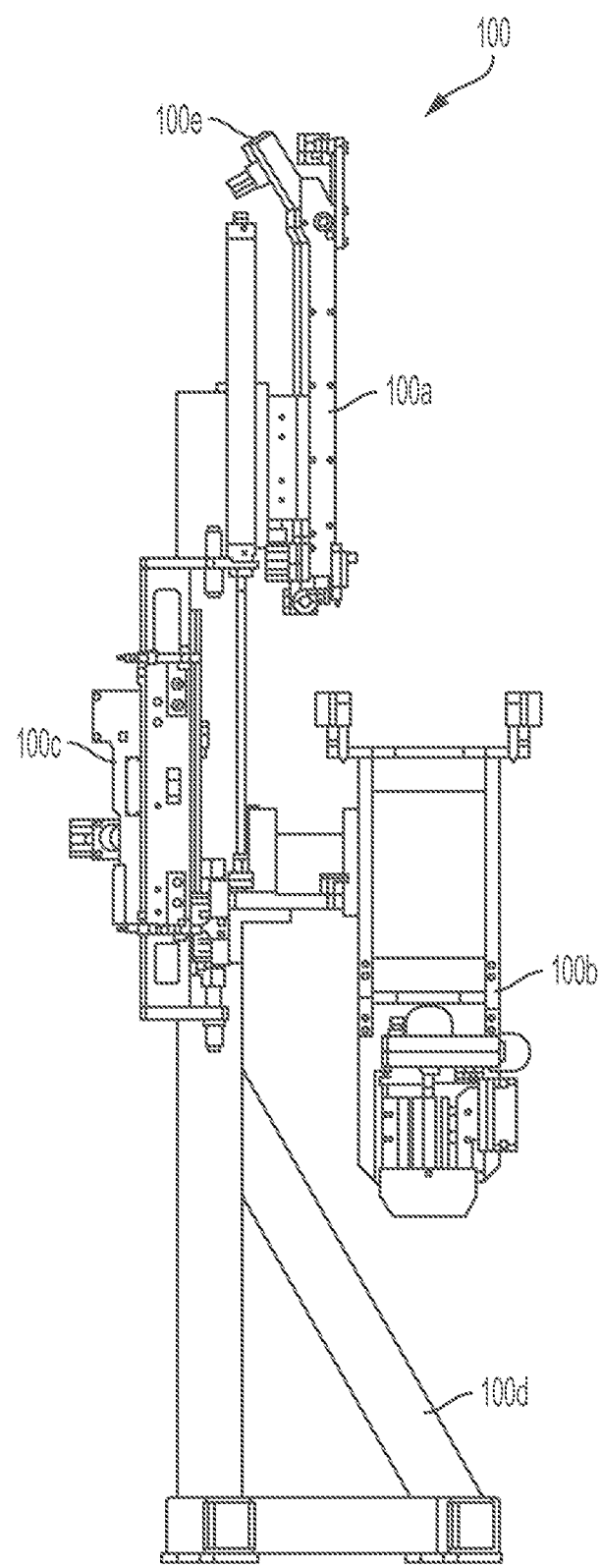
FIG. 1C is a front elevational view of the rivet dispenser reloading system of FIG. 1A.
Figure 1D:
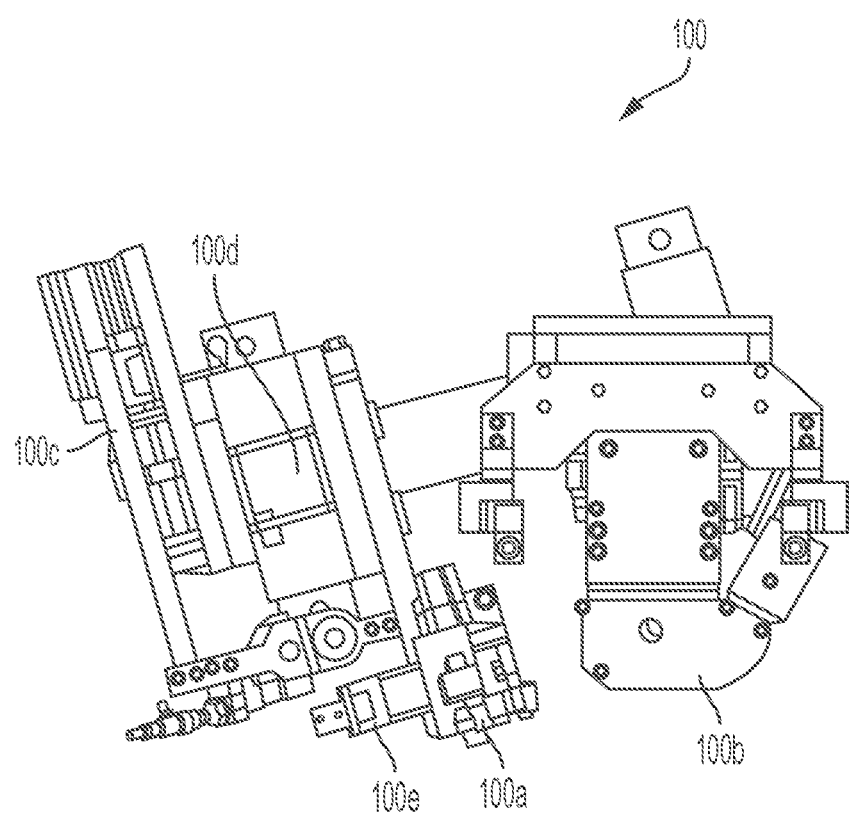
FIG. 1D is a top view of the rivet dispenser reloading system of FIG. 1A.

FIGS. 3A-D illustrate the second assembly 100b of the rivet dispenser reloading system 100. The second assembly 100b can include an electrode dressing component 118 configured to dress a resistance welding electrode of a welding gun of a resistance spot rivet welding apparatus. The construction of the electrode dressing component 118 can vary depending on resistance welding electrode type and/or application of the resistance spot rivet welding apparatus. The electrode dressing component 118 can comprise a set of motor-driven cutting blades, abrasives, and/or buffing pads which rotate around the centerline of the resistance welding electrode and provide a desired electrode contour. As best shown in FIGS. 1A and 1C, the electrode dressing component 118 can be positioned on the rivet dispenser reloading system 100 in proximity to the second port 108 of the rivet receiving member 102 via a connection to the fourth assembly 100d. In certain embodiments, the electrode dressing process can occur using the electrode dressing component 118 of the second assembly while the rivet dispensing system of the resistance spot rivet welding apparatus receives rivets from the second port 108 of the rivet receiving member 102 of the first assembly 100a.

The second assembly 100b can be structured to properly align a resistance spot rivet welding apparatus with the rivet dispenser reloading system 100. For example, the second assembly 100b can comprise an alignment member 128c and an alignment member 128d that are received in precisely positioned alignment bushings on the resistance spot rivet welding apparatus. The alignment members 128c, 128d can comprise a bushing, a conical pin, an alignment block, and/or a spring/piston to enable axial compliance between the rivet dispenser reloading system 100 and the resistance spot rivet welding apparatus.

The alignment members 128a-b of the first assembly 100a and the alignment members 128c-d of the second assembly 100b can contact a resistance spot rivet welding apparatus prior to any other component of the rivet dispenser reloading system 100. In various embodiments, the alignment members 128c-d of the second assembly 100b can contact the resistance spot rivet welding apparatus first, and the alignment members 128a-b of the first assembly 100 a can contact the resistance spot rivet welding apparatus immediately thereafter. In certain embodiments, the alignment members 128a-d can be adjustable in three degrees of freedom, for example, via a shim pack, an adjustment block, and/or a cam so that each alignment member 128a-d is in the correct position and orientation to properly align the resistance spot rivet welding apparatus with the first assembly 100a and with the second assembly 100b of the rivet dispenser reloading system 100. For example, the alignment members 128c-d can be adjusted relative to the second port 108 of the rivet receiving member 102 of the first assembly 100a to enable alignment of the second port 108 relative to a rivet dispensing system of a resistance spot rivet welding apparatus. Also, for example, the alignment members 128c-d can be adjusted relative to an electrode dressing component 118 of the second assembly 100b to enable alignment of the electrode dressing component 118 relative to a resistance welding electrode of a welding gun of a resistance spot rivet welding apparatus. A rivet dispensing system of the resistance spot rivet welding apparatus can then receive rivets from the first assembly 100a and, if desired, a resistance welding electrode of the welding gun of the resistance spot rivet welding apparatus can be dressed using the electrode dressing component 118 of the second assembly 100b.

In various embodiments, the second assembly 100b can comprise additional elements (e.g., compliance devices), such as, for example, at least one of a bolted plate, an adjustment block, and a pin retainer block. The compliance devices can accommodate normal misalignment in positioning during robot learning or day to day variation between operations. The compliance devices can enable normal operation with some misalignment and provide a visual cue during robot learning that force is being applied to the a rivet dispenser reloading system 100 so that corrections can be made before the rivet dispenser reloading system 100 can be damaged.

FIGS. 4A-D depict the third assembly 100c of the rivet dispenser reloading system 100. The third assembly 100c can enable movement of the third assembly 100c relative to the fourth assembly 100d. For example, the third assembly 100c can comprise a first slide 122 and a second slide 124. The first slide 122 and the second slide 124 can enable a resistance spot rivet welding apparatus engaged with the alignment members 128c-d to move relative to the first assembly 100a. As indicated in FIGS. 4A-D, the first slide 122 can be configured to enable movement of the third assembly 100c relative to the fourth assembly 100d in a first direction 140a and a second direction 140b. The second slide 124 can be configured to enable access for actuation of the first slide 122 in a third direction 140c and a fourth direction 140d relative to fourth assembly 100d. In the depicted embodiments, the third direction 140c and the fourth direction 140d can be substantially perpendicular to the first direction 140a and the second direction 140b. In various embodiments, the second slide 124 can be directly connected to the first slide 122.

The contact member 126 can be configured to engage a protrusion of a tensioner of a rivet dispenser and to move utilizing the first slide 122 and/or the second slide 124 responsive to engagement of the contact member 126 with the resistance spot rivet welding apparatus. The engagement can move the tensioner of the rivet dispenser into a reload position in order to enable the rivet dispenser to accept rivets.

In various embodiments, the third assembly 100c can comprise a proximity switch configured to detect a position of the first slide 122 and/or the second slide 124. The third assembly 100c can comprise additional elements, such as, for example, at least one of a bolted plate, a linear slide rail and carriage, a pneumatic cylinder, a rod alignment coupler, a stop block, and a shock absorber.

Figure 5:
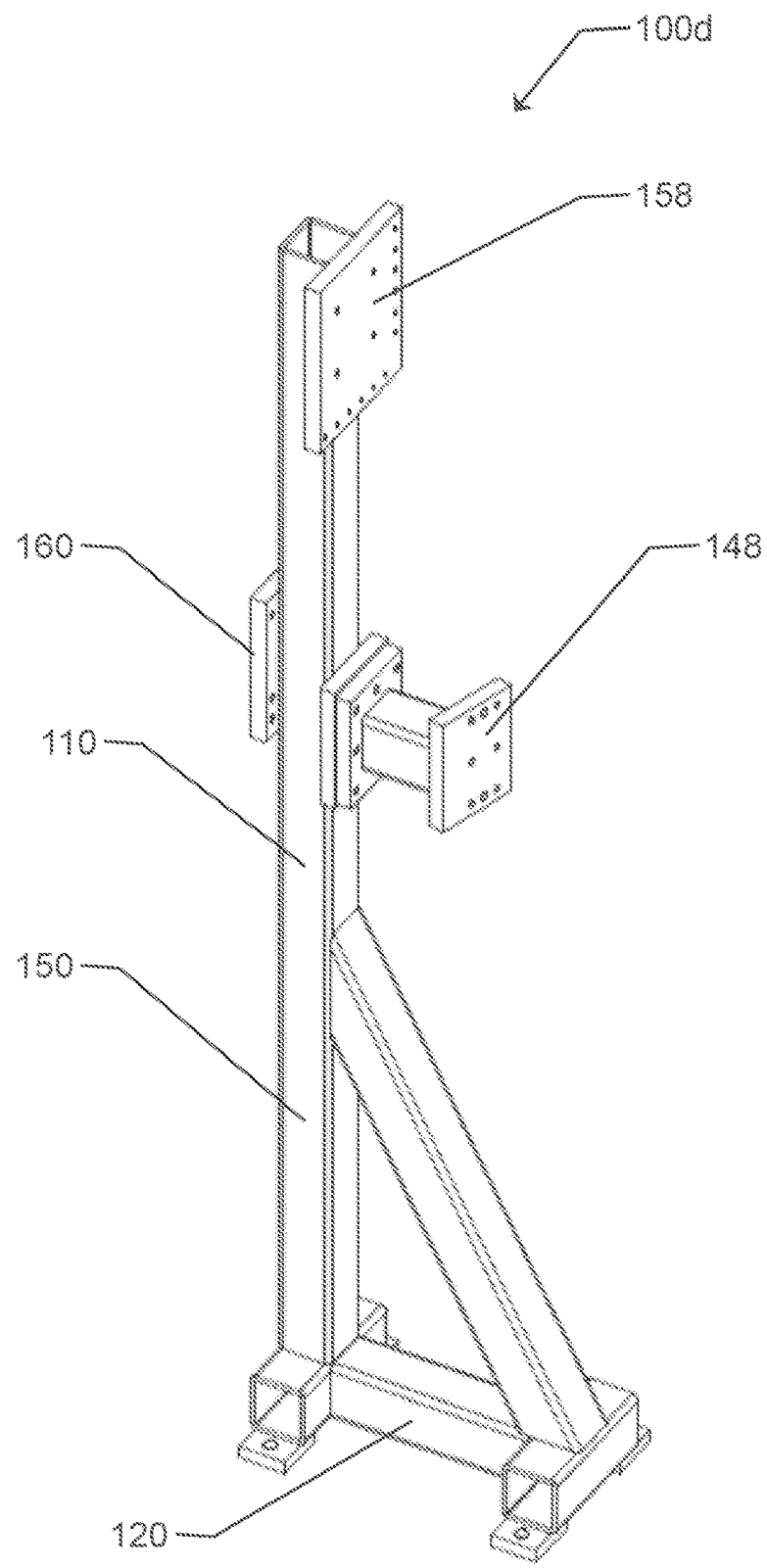
FIG. 5 is a perspective view of a fourth assembly of the rivet dispenser reloading system of FIG. 1A.

FIG. 5 depicts the fourth assembly 100d of the rivet dispenser reloading system 100. The fourth assembly 100d can support the first, second, and third assemblies (100a, 100b, 100c) in a plurality of preselected orientations. The preselected orientations can be chosen such that a resistance spot rivet welding apparatus may have reduced movements when aligning with the rivet dispenser reloading system 100. For example, the fourth assembly 100d can comprise a frame 110 configured to retain the rivet receiving member 102 in a plurality of preselected orientations. In various embodiments, the fourth assembly 100d can comprise tubing and plates.

In certain embodiments, the frame 110 of the fourth assembly 100d can comprise a base 120, a support column 150, a first attachment region 148, a second attachment region 158, and a third attachment region 160. The base 120 can provide stability to the rivet dispenser reloading system 100 and can be secured to a platform, floor, or other surface with fasteners (e.g., bolts, screws). The support column 150 can transfer force from the first attachment region 148 the second attachment region 158, and the third attachment region 160 to the base 120. The first attachment region 148 can be structured to connect to the second assembly 100b. The second attachment region 158 can be structured to connect to the first assembly 100a. The third attachment region 160 can be structured to connect to the third assembly 100c.

A fastener feeder can be configured to directly connect to the first port 106 of the first assembly 100a or communicate with the fifth assembly 100e, if present, to introduce fasteners in a preselected orientation to the first port 106. The fastener feeder may not be a part of the rivet dispenser reloading system 100. The fastener feeder is a source of rivets that can be utilized when additional rivets are needed to reload the first assembly 100a in preparation for reloading a rivet dispensing system of a resistance spot rivet welding apparatus. The fastener feeder can comprise at least one of a vibratory bowl, a magnetic collator, a flexible feed track, and/or other collator type.

Figure 6A:
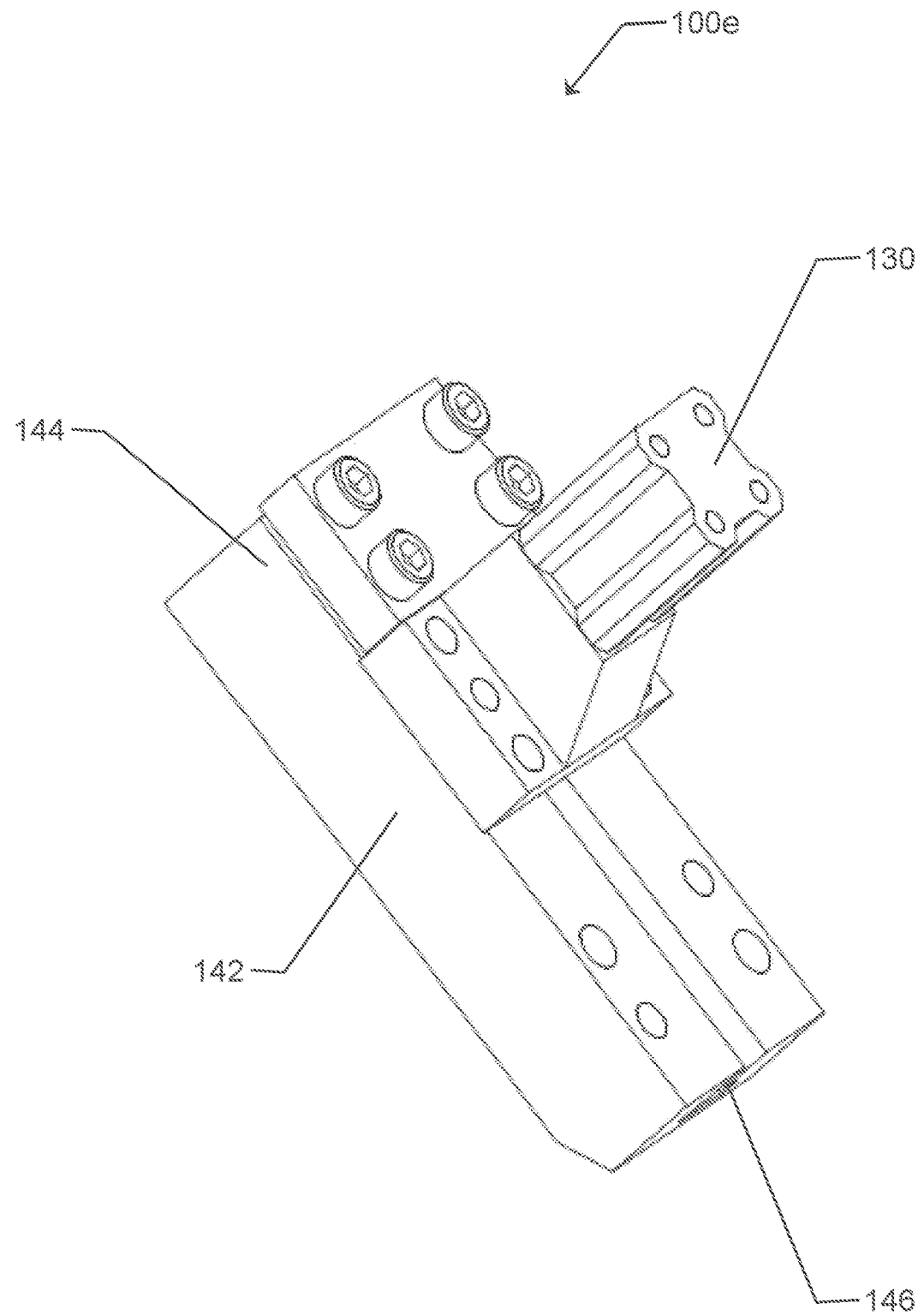
FIG. 6A is a perspective view of a fifth assembly of the rivet dispenser reloading system of FIG. 1A.
Figure 6B:
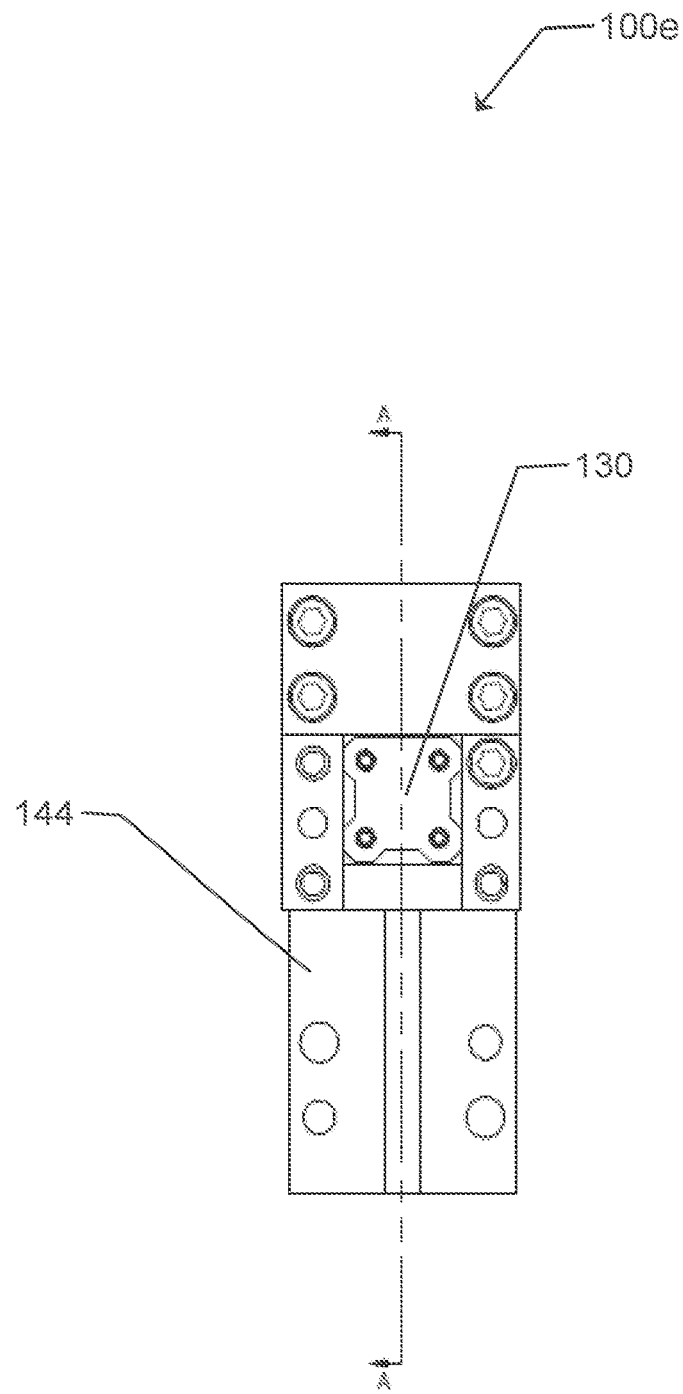
FIG. 6B is a front elevational view of the fifth assembly of FIG. 6A.
Figure 6C:
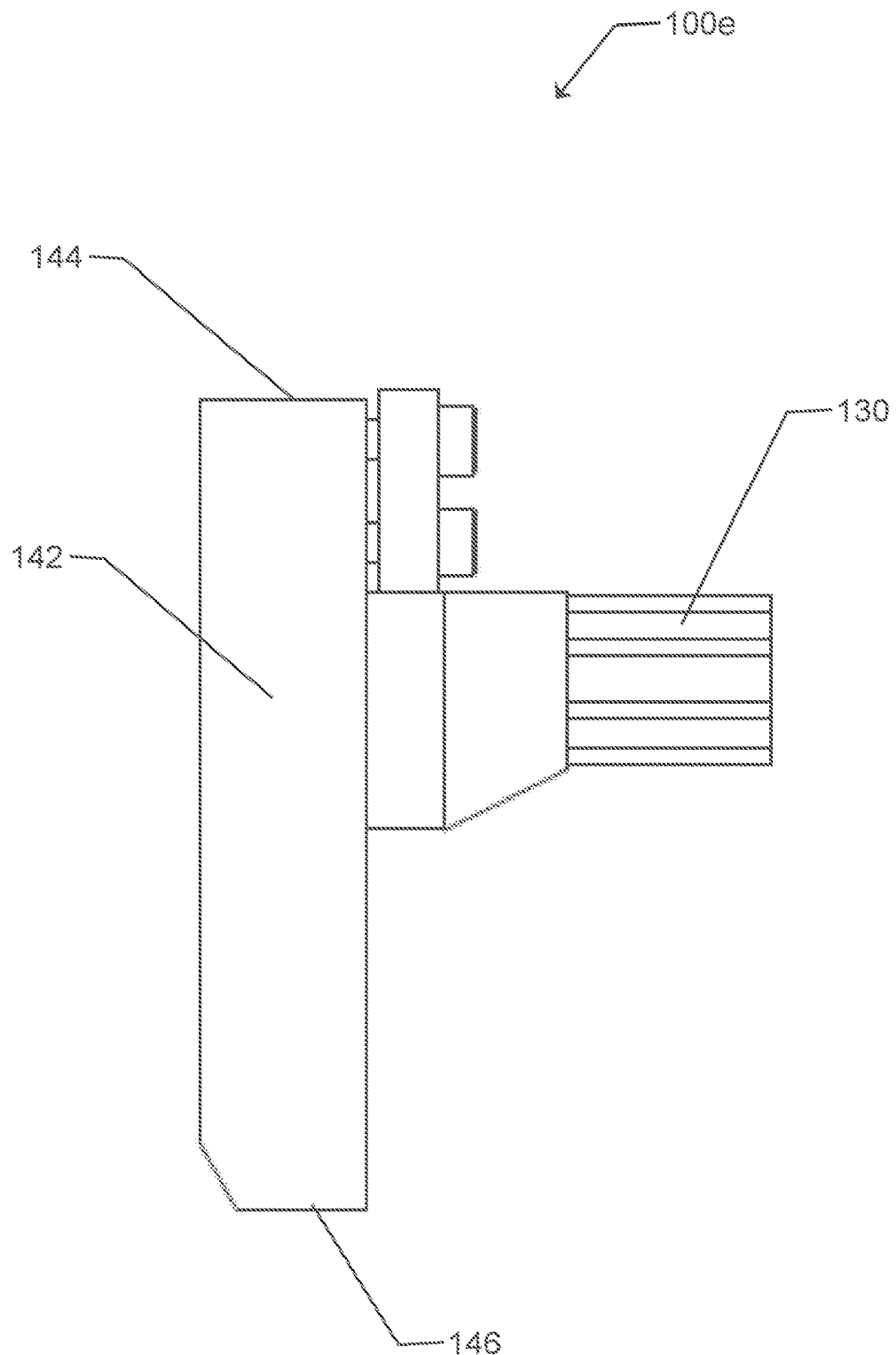
FIG. 6C is a left-side elevational view of the fifth assembly of FIG. 6A.
Figure 6D:
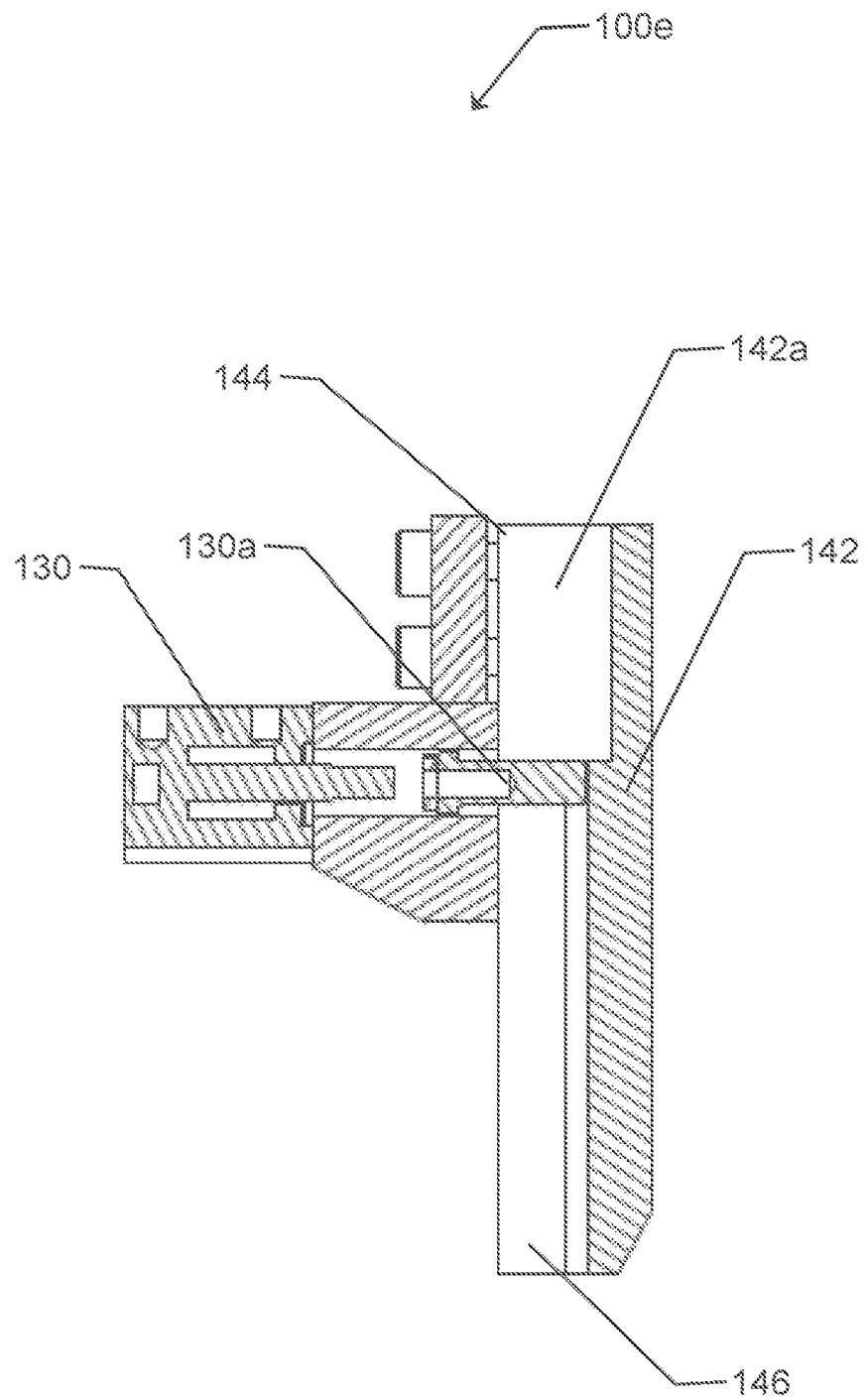
FIG. 6D is a cross-sectional view of the fifth assembly of FIG. 6A taken along the line A-A in FIG. 6B, in the direction of the arrows.
Figure 6E:
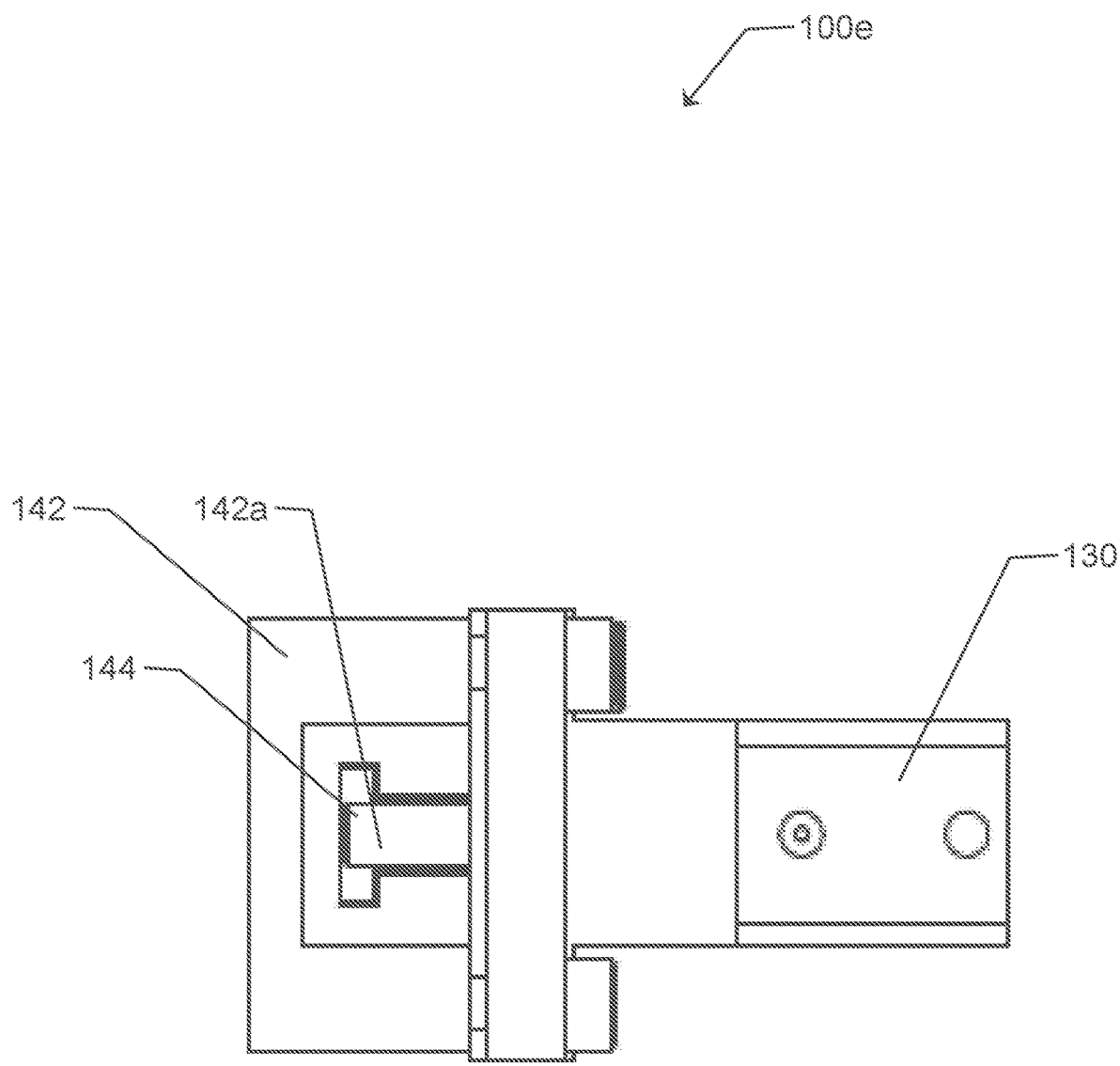
FIG. 6E is a top view of the fifth assembly of FIG. 6A.
Figure 7A:
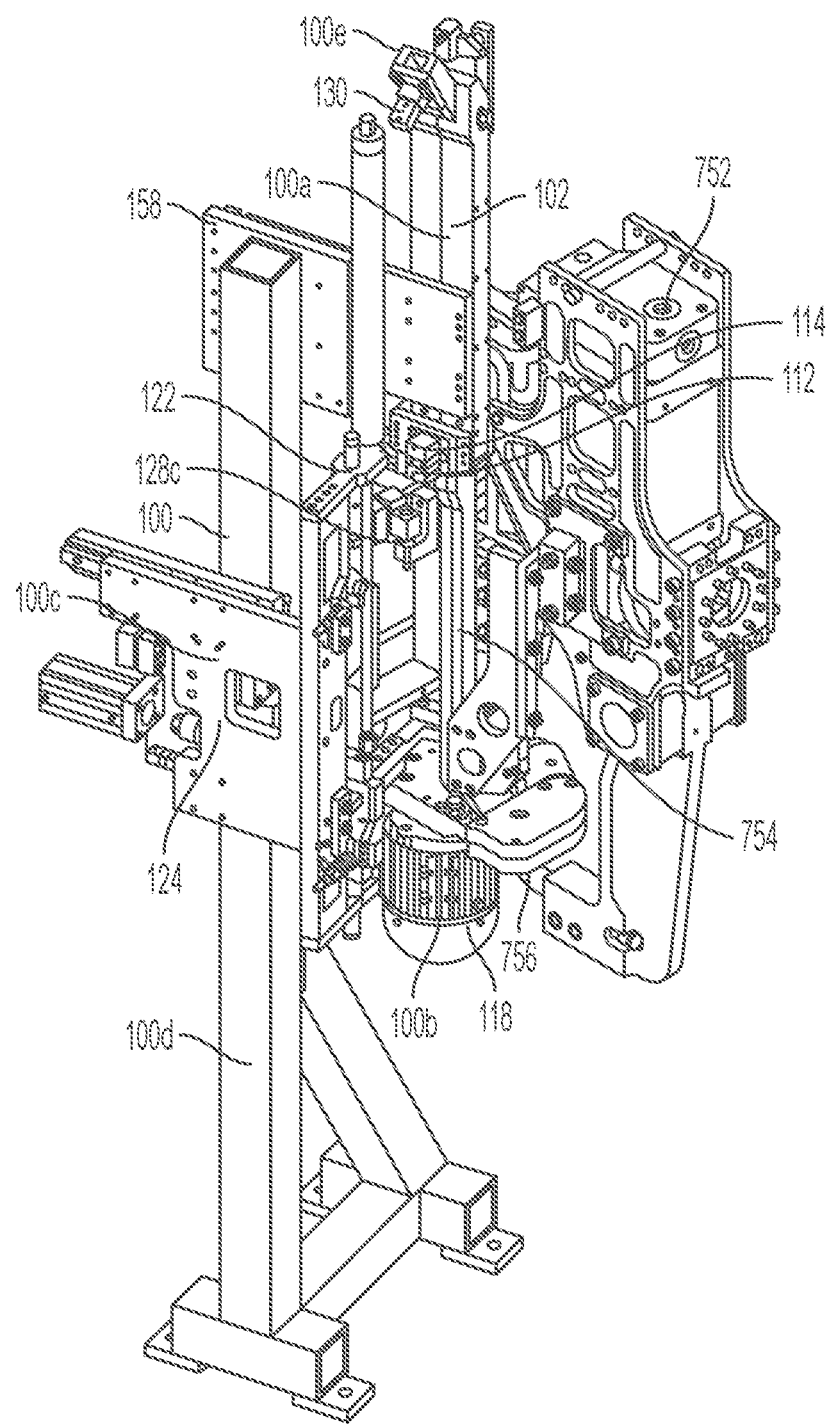
FIG. 7A is a perspective view of the rivet dispenser reloading system according to the present disclosure and a resistance spot rivet welding apparatus aligned with the rivet dispenser reloading system.
Figure 7B:
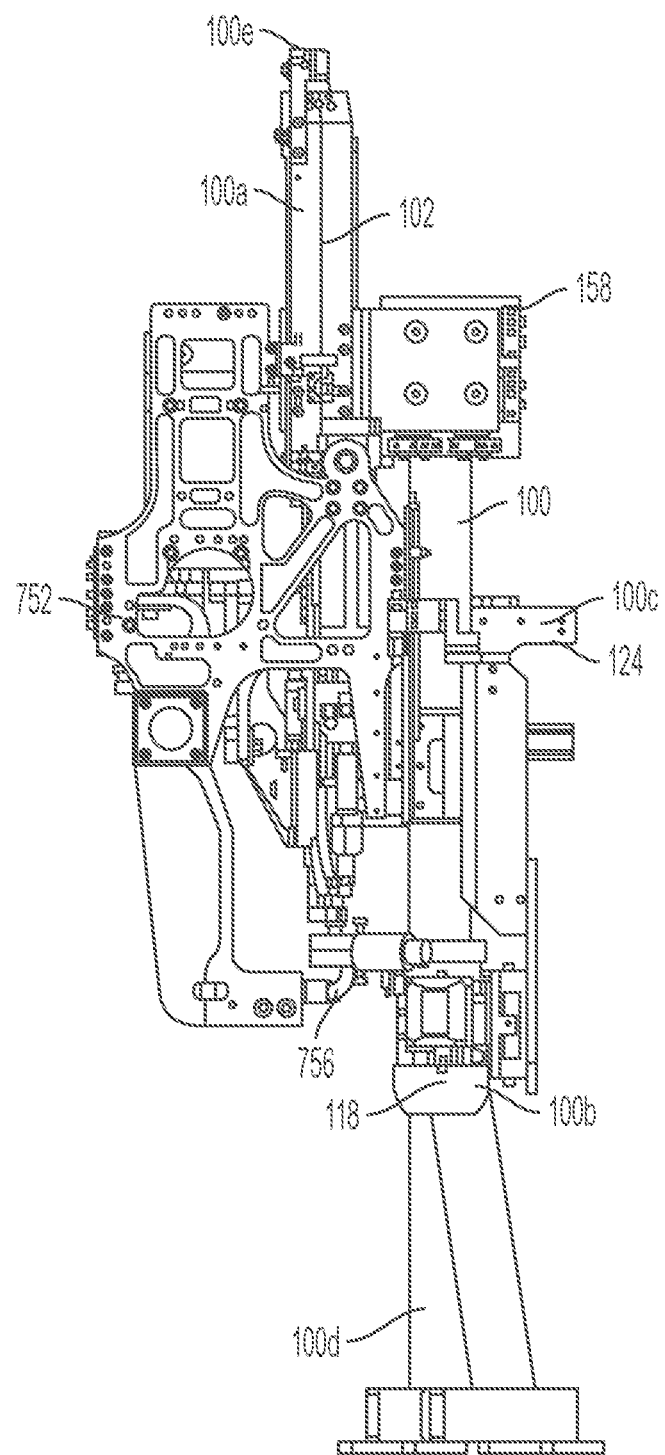
FIG. 7B is a right-side elevational view of the rivet dispenser reloading system and the resistance spot rivet welding apparatus as shown in FIG. 7A.
Figure 7C:
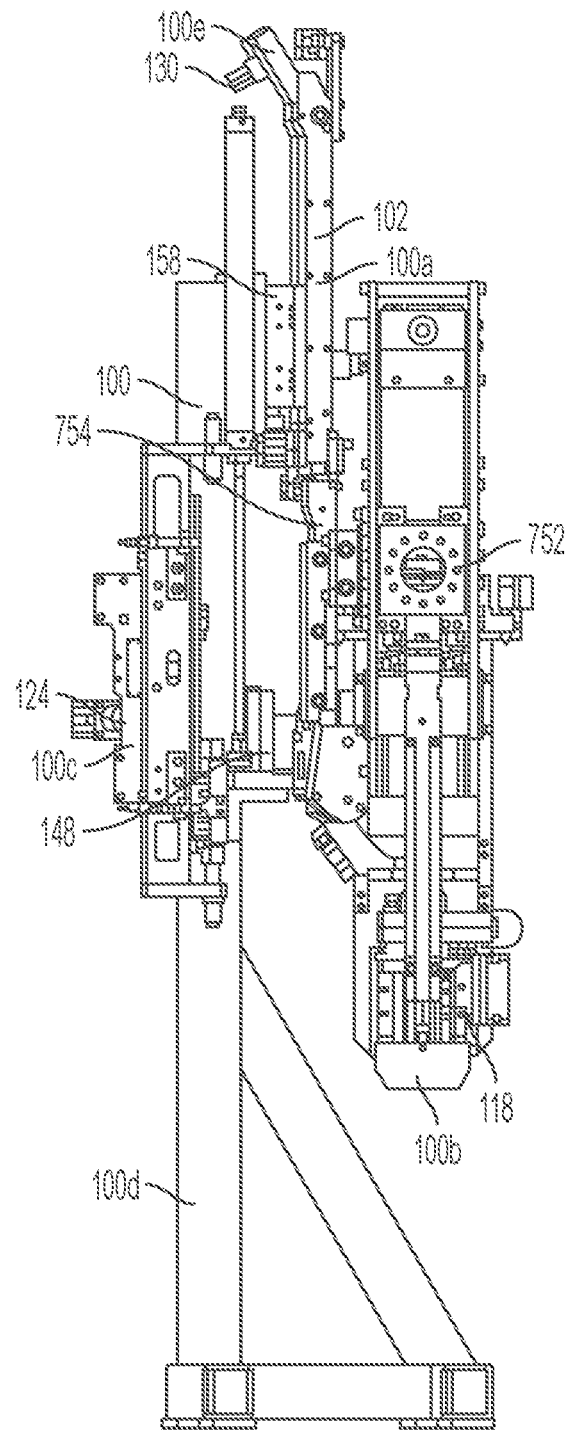
FIG. 7C is a front elevational view of the rivet dispenser reloading system and the resistance spot rivet welding apparatus as shown in FIG. 7A.
Figure 7D:
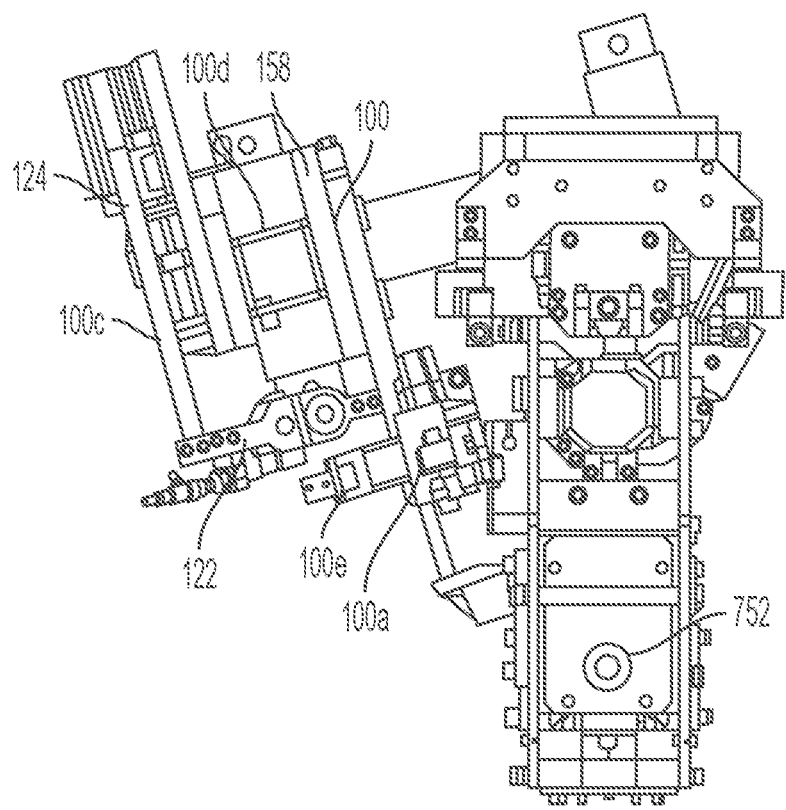
FIG. 7D is a top view of the rivet dispenser reloading system and the resistance spot rivet welding apparatus as shown in FIG. 7A.
Figure 7E:
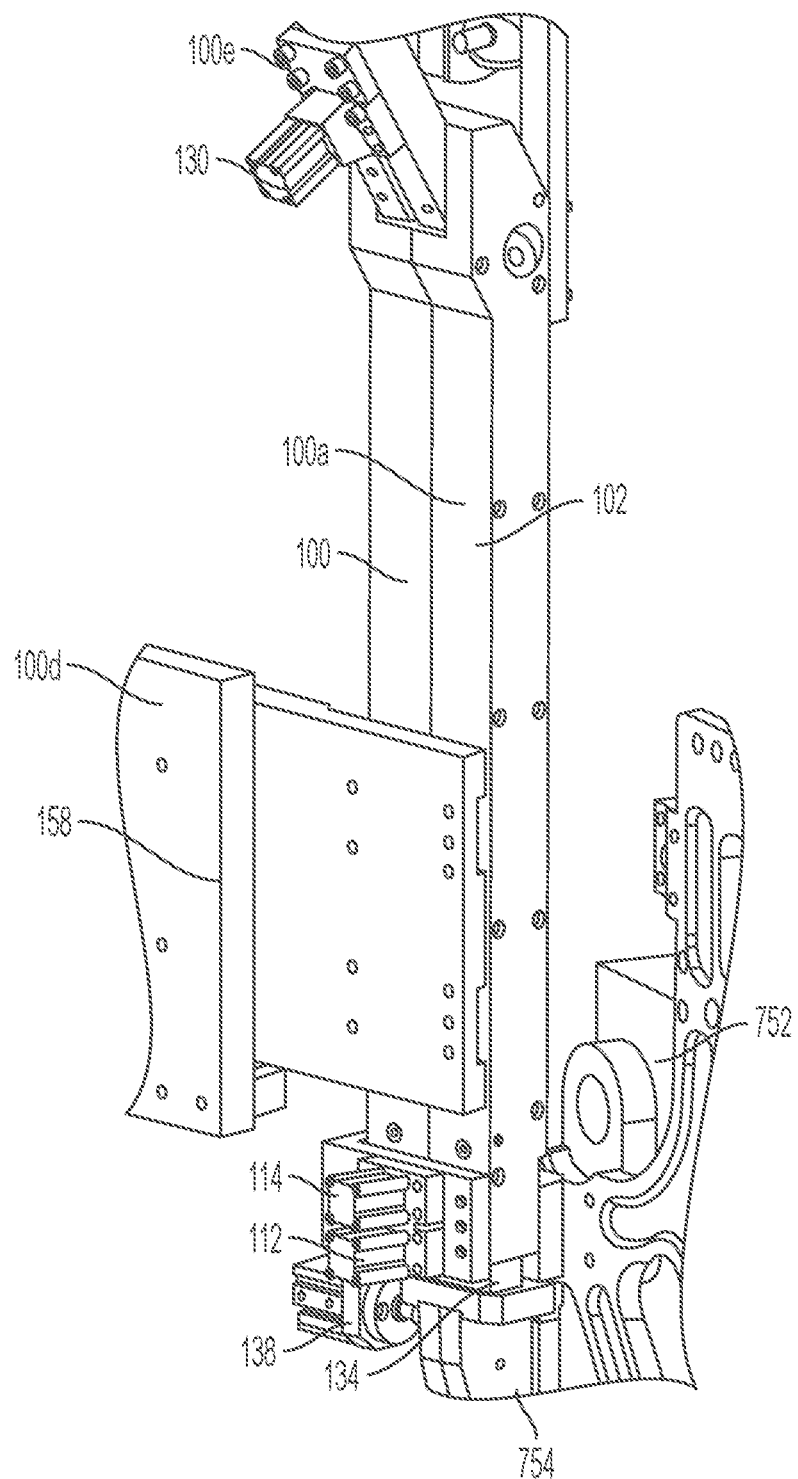
FIG. 7E is a detailed view of the first assembly of the rivet dispenser reloading system mating with the rivet dispensing system of the resistance spot rivet welding apparatus as shown in FIG. 7A.

FIGS. 6A-E depict the fifth assembly of the rivet dispenser reloading system 100. Fifth assembly 100e can control the movement of rivets into the first port 106 of the rivet receiving member 102 of the first assembly 100a. For example, the fifth assembly 100e can comprise a secondary rivet receiving member 142 and a third gate 130. As indicated in FIG. 6D, the secondary rivet receiving member 142 can define a channel 142a therein. The rivet receiving member 142 can comprise a first port 144 and a second port 146. The first port 144 can be in communication with the channel 142a and configured to receive rivets from a fastener feeder. The second port 146 can be in communication with the channel 142a and configured to receive rivets. The channel 142a can extend between the first port 144 and the second port 146. The channel 142a can be configured to transport rivets from the first port 144 to the second port 146 in a series arrangement and in a preselected orientation. The channel 142a can be configured to receive a flexible feed track from a fastener feeder and control the release of rivets through the second port 146.

The third gate 130 of the fifth assembly 100e can be in communication with the first port 106 via the channel 142a. The third gate 130 can comprise a pin 130a configured to engage a rivet within the channel 142a. For example, the pin 130a can engage a head and/or a stem of a rivet within the channel 142a. The third gate 130 can be selectively positionable between a first configuration and a second configuration. The first configuration of the third gate 130 can inhibit movement of rivets through the channel 142a (e.g., the pin 130a can enter the channel 142a and engage the rivet) and to the first port 106 of the rivet receiving member 102 of the first assembly 100a. The second configuration of the third gate 130 can allow movement of rivets through the channel 142a (e.g., the pin 130a can retract from the channel 142a) to the first port 106 of the rivet receiving member 102 of the first assembly 100a. In various embodiments, the third gate 130 can be pneumatic or actuated by an electric servo motor. A switch or sensor can communicate with the third gate 130 to monitor the configuration of the third gate 130.

To introduce a rivet into the receiving member 102, the third gate 130 and the second gate 114 can be in the second configuration and the first gate 112 can be in the first configuration. The fifth assembly 100e can comprise additional elements, such as, for example, a clamp plate and a mounting block.

As shown in FIGS. 7A-E, the rivet dispenser reloading system 100 can mate with a resistance spot rivet welding apparatus 752. The resistance spot rivet welding apparatus 752 can comprise a rivet dispensing system 754 and a welding gun including a resistance welding electrode 756. The rivet dispensing system 754 can receive rivets from the first assembly 100a of the rivet dispenser reloading system 100, and the resistance welding electrode 756 can be dressed by the second assembly 100b of the rivet dispenser reloading system 100. For example, rivets can be received by the rivet dispensing system 754 and simultaneously the resistance welding electrode 756 can be dressed.

In order to engage and be received by the rivet dispenser reloading system 100, the resistance spot rivet welding apparatus 752 can move towards the rivet dispenser reloading system 100 in a substantially horizontal path to align the alignment members 128c-d with first alignment bushings on the resistance spot rivet welding apparatus 752. The resistance spot rivet welding apparatus 752 can move in a substantially vertical path towards alignment members 128c-d such that the first alignment bushings can receive and engage the alignment members 128c-d. Thereafter, the resistance spot rivet welding apparatus 752 can move to align second alignment bushings of the resistance spot rivet welding apparatus 752 with the alignment members 128a-b. The resistance spot rivet welding apparatus 752 can move in a substantially vertical path towards alignment members 128a-b such that second alignment bushings can receive and engage the alignment members 128a-b. When the alignment members 128c-d are engaged with first alignment bushings and the alignment members 128a-b are engaged with second alignment bushings, the resistance spot rivet welding apparatus 752 has reached a "reload position" in which it is correctly oriented relative to the rivet dispenser reloading system 100.

In the reload position, the second port 108 can be aligned with rivet dispensing system 754 and the locking pin 138 can engage and secure the resistance spot rivet welding apparatus 752 in the reload position relative to the rivet dispenser reloading system 100. The first gate 112 can be positioned in the second configuration and the gas port 116 can introduce pressurized gas into the channel 102a to urge rivets in series and in a preselected orientation from the channel 102a and into the rivet dispensing system 754. The pressurized gas can inhibit, if not prevent, jamming of rivets within the channel 102a, shingling of rivets (e.g., overlapping head portions of rivets), and gaps between successive rivets within the channel 102a. In various embodiments, the resistance welding electrode 756 can be dressed during the reloading of rivets into the rivet dispensing system 754 and when the locking pin 138 has been engaged. The locking pin 138 can retain proper alignment of the resistance spot rivet welding apparatus 752 with the rivet dispenser reloading system 100 during dressing of the resistance welding electrode 756, and any operation that may produce significant vibrations.

After reloading, the first gate 112 can be positioned in the first configuration. The locking pin 138 can disengage the resistance spot rivet welding apparatus 752, and the first slide 122 and the second slide 124 can translate to release the resistance spot rivet welding apparatus 752 from the alignment members 128a-b. The resistance spot rivet welding apparatus 752 can move in a substantially vertical path away from the alignment members 128c-d and then the resistance spot rivet welding apparatus 752 can move in a substantially horizontal path away from the rivet dispenser reloading system 100. Recharged with rivets, the resistance spot rivet welding apparatus 752 can resume its programmed riveting operation.

Referring to FIGS. 9A-D, a rivet dispensing system 900 is provided. The rivet dispensing system 900 can comprise a rivet receiving member 902, a seat member 904, an actuation member 906, and a tensioner 908. The rivet receiving member 902 can be configured with a size and shape suitable to accommodate a predetermined number of rivets. The rivet receiving member 902 defines a channel 914 therein and comprises a first port 910 and a second port 912 communicating with the channel 914. The channel 914 extends from the first port 910 to the second port 912. The first and second ports 910, 912 can receive and/or store rivets, such as, for example, rivet 934a and rivet 934b. In various embodiments, the rivets 934a, 934b can comprise the same dimensions or different dimensions; and/or the rivets 934a, 934b can comprise the same material composition or different material compositions. The channel 912 can comprise a capacity suitable for the production application.

The first port 910 can receive a rivet from a rivet source, such as, for example, a vibratory bowl or a rivet dispenser reloading system, and the second port 912 can receive a rivet from the channel 914 and dispense the rivet downstream. The channel 914 can be suitable to transport rivets between the first port 910 and the second port 912. The channel 914 can comprise, for example, a generally T-shaped cross-section suitable to receive and transport rivets having a T-shaped profile. In various other non-limiting embodiments, a cross-section of the channel 914 can be suitable to accommodate a weld-stud and/or a weldnut. The cross-sectional shape and size of the channel 914 can inhibit, if not prevent, jamming of rivets within the channel 914, shingling (e.g., overlapping head portions of rivets) of rivets, and gaps between successive rivets within the channel 902a.

The channel 914 is generally J-shaped, including a curved region 902a. The rivet receiving member 902 can receive the rivets in a preselected orientation and, by passage through the J-shaped path of the channel 914, can re-orient the rivets for presentation to a rivet holder of a resistance spot rivet welding apparatus (not shown in FIGS. 9A-D).

Pressurized gas can urge rivets in series and in a preselected orientation into and through the first port 910, into and through the channel 914, and into and through the second port 912. The pressurized gas can be introduced into the first port 910 and/or the channel 914. The pressurized gas can inhibit, if not prevent, jamming of rivets within the channel 914, shingling of rivets (e.g., overlapping head portions of rivets), and gaps between successive rivets within the channel 914.

The tensioner 908 can move through a portion of the channel 914 and into a secondary channel 916. In a first configuration of tensioner 908, shown in FIG. 9A, the tensioner 108 can be disposed within the secondary channel 916 in order to enable rivets to traverse through the channel 914 towards the second port 912. The tensioner 908 can comprise a protrusion 908a which can be suitable to engage a rivet dispenser reloading system (not shown) that is configured to reload the channel 914 with rivets. Upon engagement with the rivet dispenser reloading system, the protrusion 908a can move the tensioner 908 into the secondary channel 916.

Figure 9A:
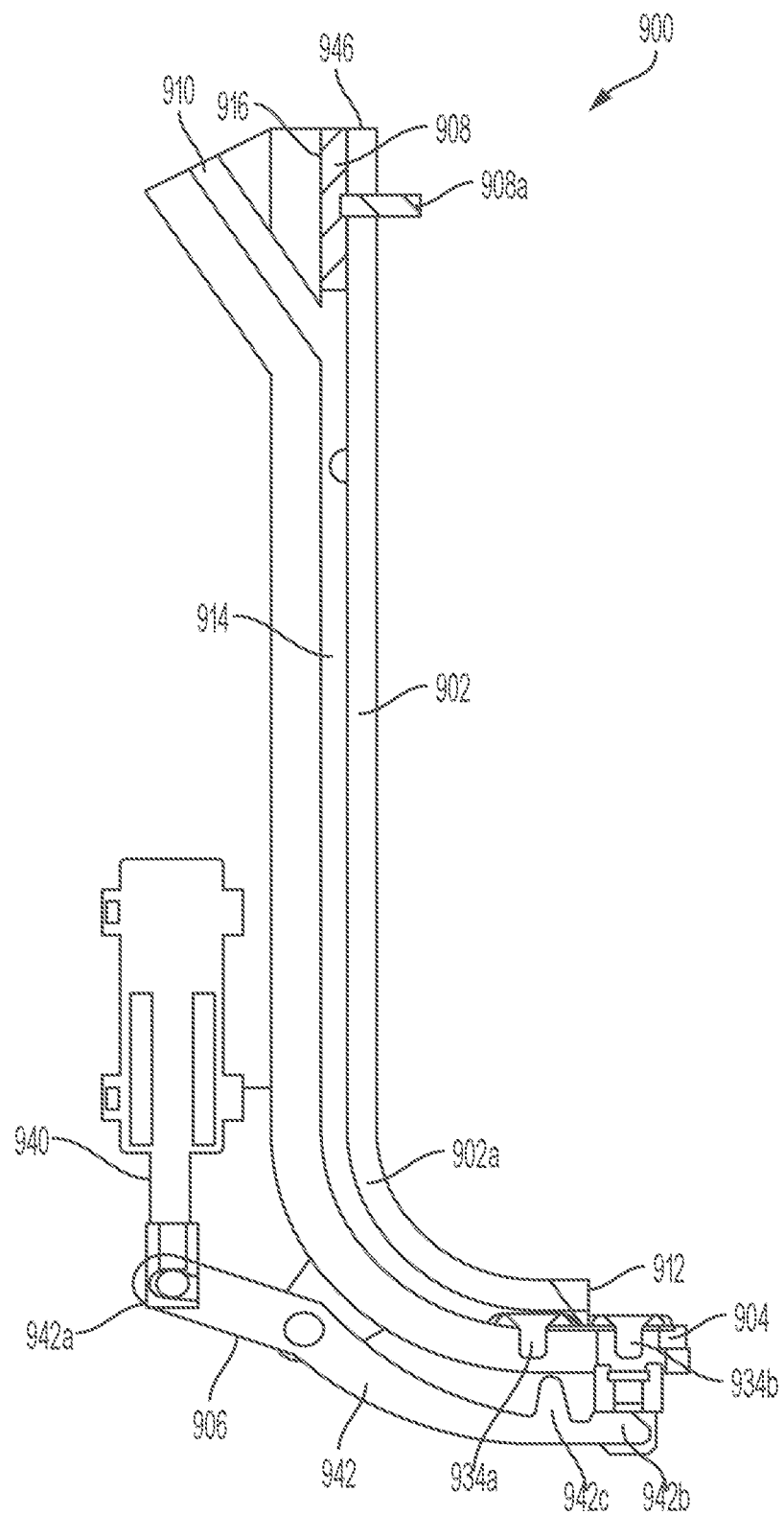
FIG. 9A is a right side cross-sectional view of a non-limiting embodiment of a rivet dispensing system according to the present disclosure.
Figure 9B:
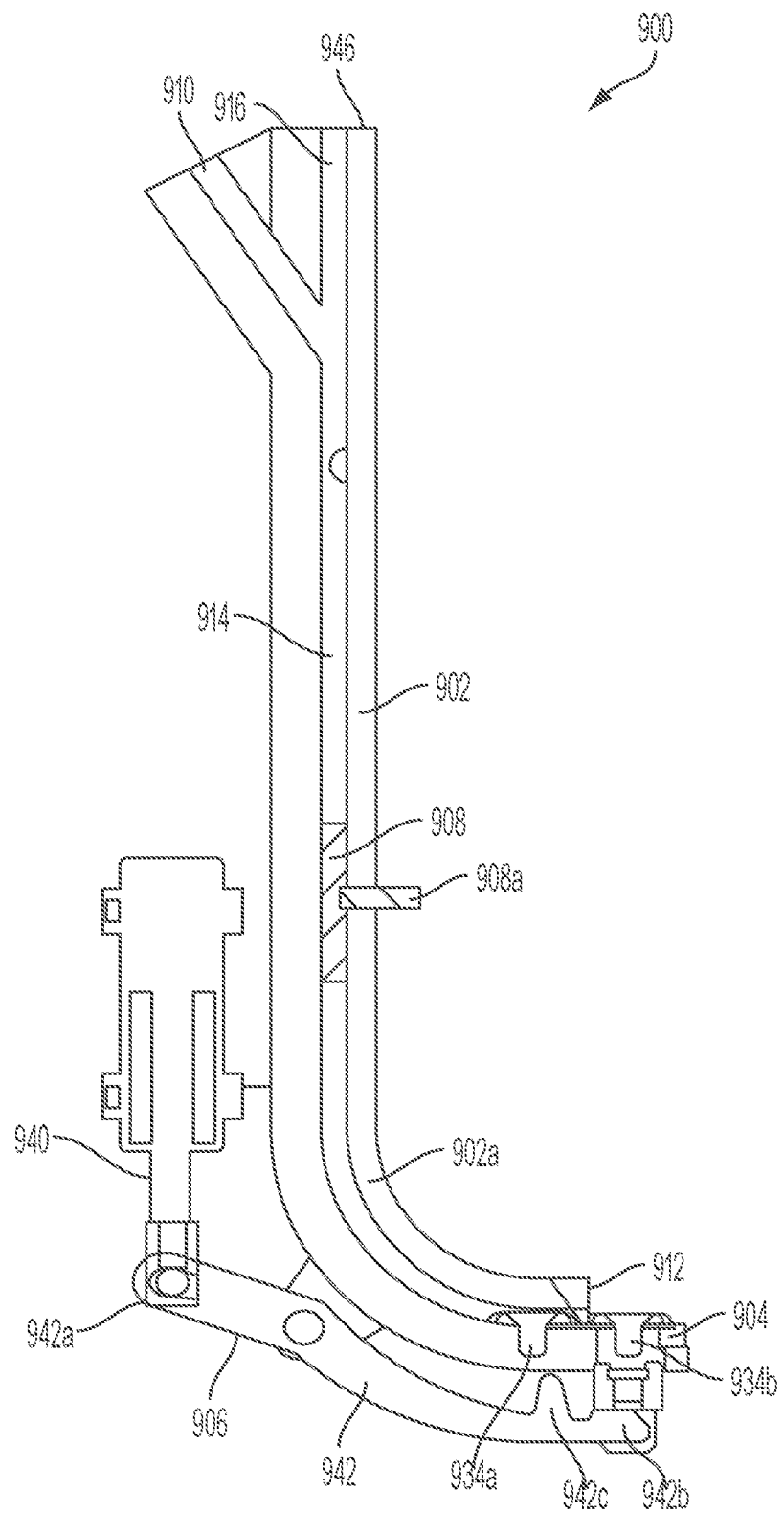
FIG. 9B is a right side cross-sectional view of the rivet dispensing system of FIG. 9A comprising a tensioner shown in a second configuration.

Upon disengagement with the rivet dispenser reloading system, the tensioner 908 can be released and, as shown in FIG. 9B, move along the channel 914 to apply a force to the rivets within the channel 914 in order to urge the rivets towards the seat member 904. The tensioner 908 can comprise at least one of a spring, a piston, an actuator, and a plunger.

Figure 9C:
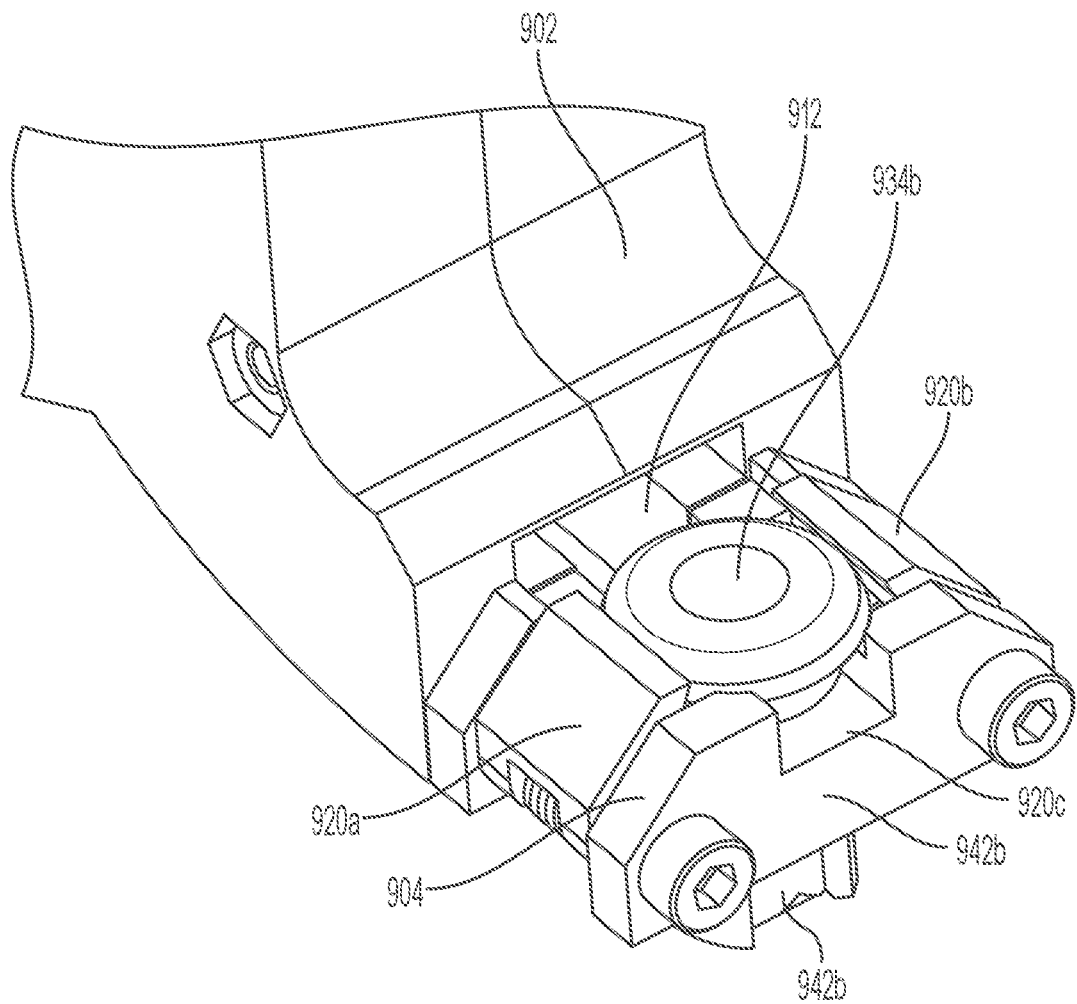
FIG. 9C is a perspective view of the seat member and a proximate region of the rivet dispensing system of FIG. 9A.
Figure 9D:
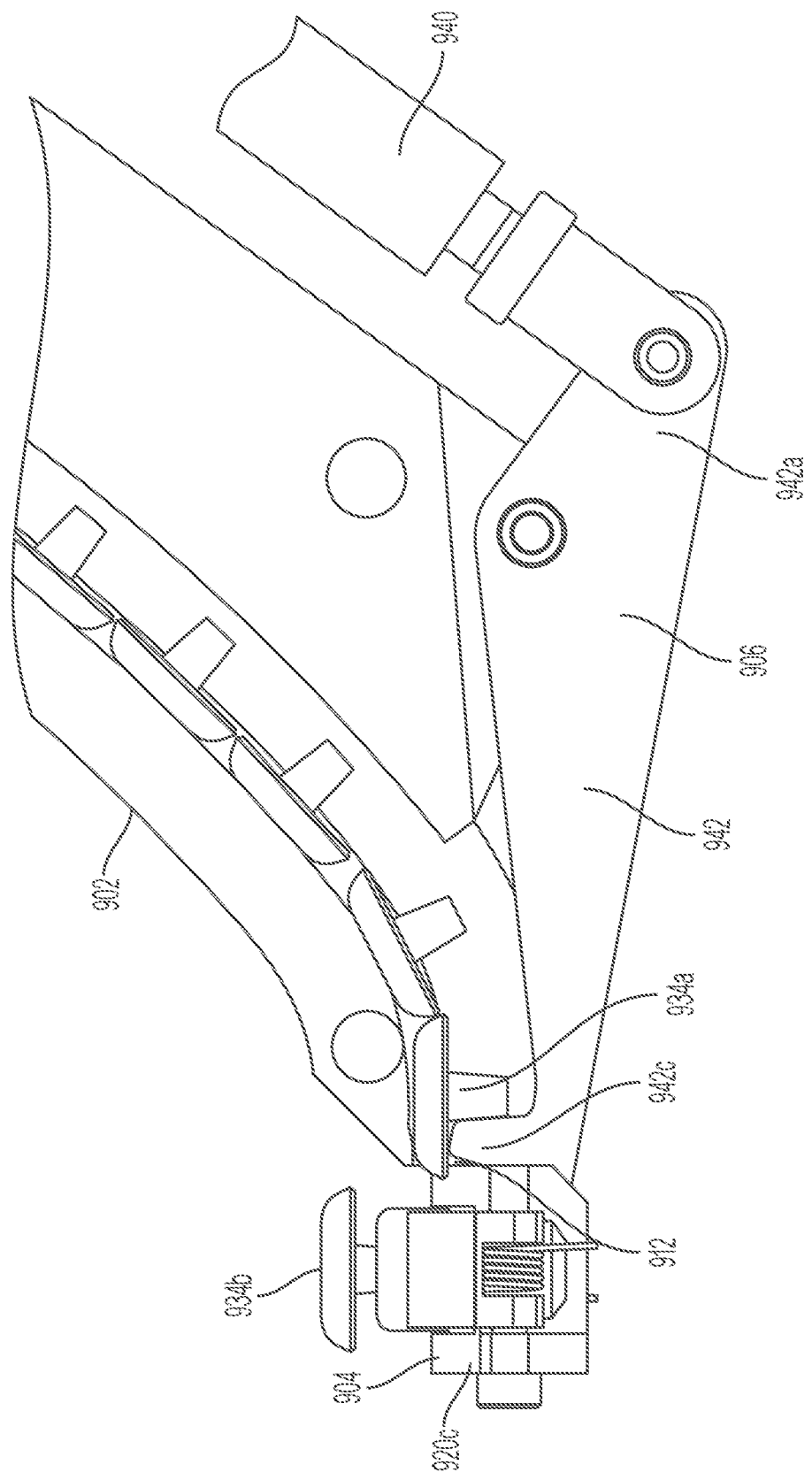
FIG. 9D is a left side view in partial cross section of the seat member and a proximate region of the rivet dispensing system of FIG. 9A.

As shown in FIGS. 9C-D, the seat member 904 can receive a rivet form the channel 914 through the second port 912. For example, the seat member 904 can be configured to receive a single rivet at one time. The seat member 904 can comprise a first jaw 920a, a second jaw 920b, and a block 920c that can be structured to receive the rivet from the second port 912 of the channel 914 and maintain the rivet in a preselected position and orientation on the rivet dispensing system 900 until the rivet is removed from the seat member 904 and is taken into a rivet holder of a resistance spot rivet welding apparatus (not shown in FIGS. 9A-D). In various embodiments, the seat member 904 can comprise a grommet such that the rivet is positioned intermediate the grommet and the jaws 920a, 920b when the rivet is in the preselected position. The single rivet captured in the jaws 920a, 920b can be transferred to the rivet holder.

The actuation member 906 can move the rivet within the seat member 904 independently of the rivet receiving member 902. For example, the actuation member 906 can comprise an actuator or piston 940. The piston or actuator 940 can apply a force to a first end 942a of a lever 942 of the actuation member 906 which causes a second end 942b of the lever 942 to move from a first position to a second position, thereby engaging and moving a rivet within the seat member 904 to a secondary position above the seat member 904 (as illustrated in FIG. 9D). The secondary position allows the rivet to be urged into a rivet holder of a resistance spot rivet welding apparatus. After engaging the rivet holder, the rivet may not return to the seat member 904 when the lever 942 returns to the first position. Thereafter, another rivet can traverse along the channel 914 into the seat member 904.

The lever 942 can comprise a protrusion 942c which can engage additional rivets within the channel 914 and inhibit the additional rivets from advancing from the second port 912 into the seat member 904.

The rivet receiving member 902 can comprise a contact plate 946 suitable for engaging a rivet dispenser reloading system.

Figure 10A:
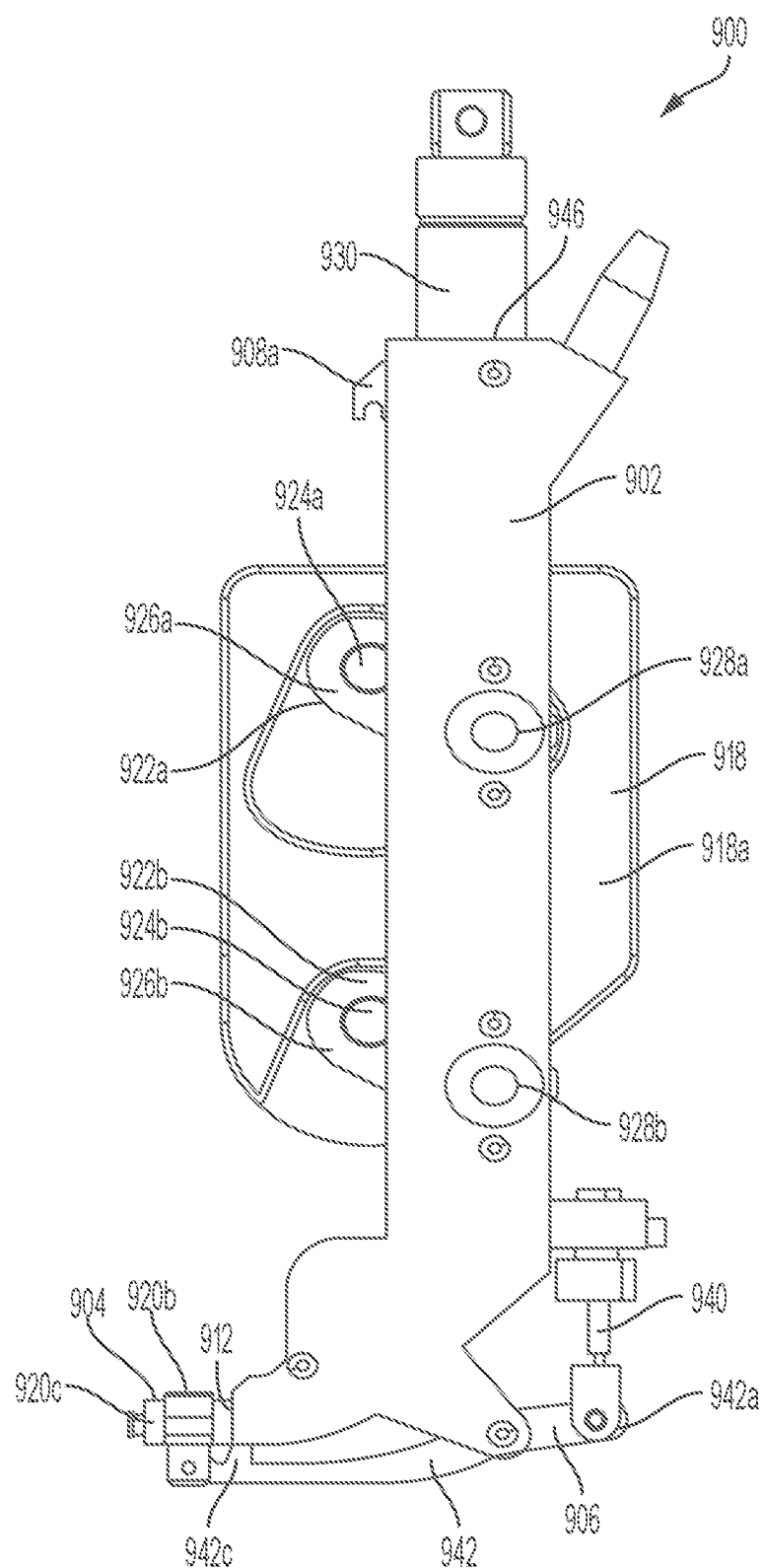
FIG. 10A is a left side elevational view of a non-limiting embodiment of a rivet dispensing system in a first configuration according to the present disclosure.
Figure 10B:
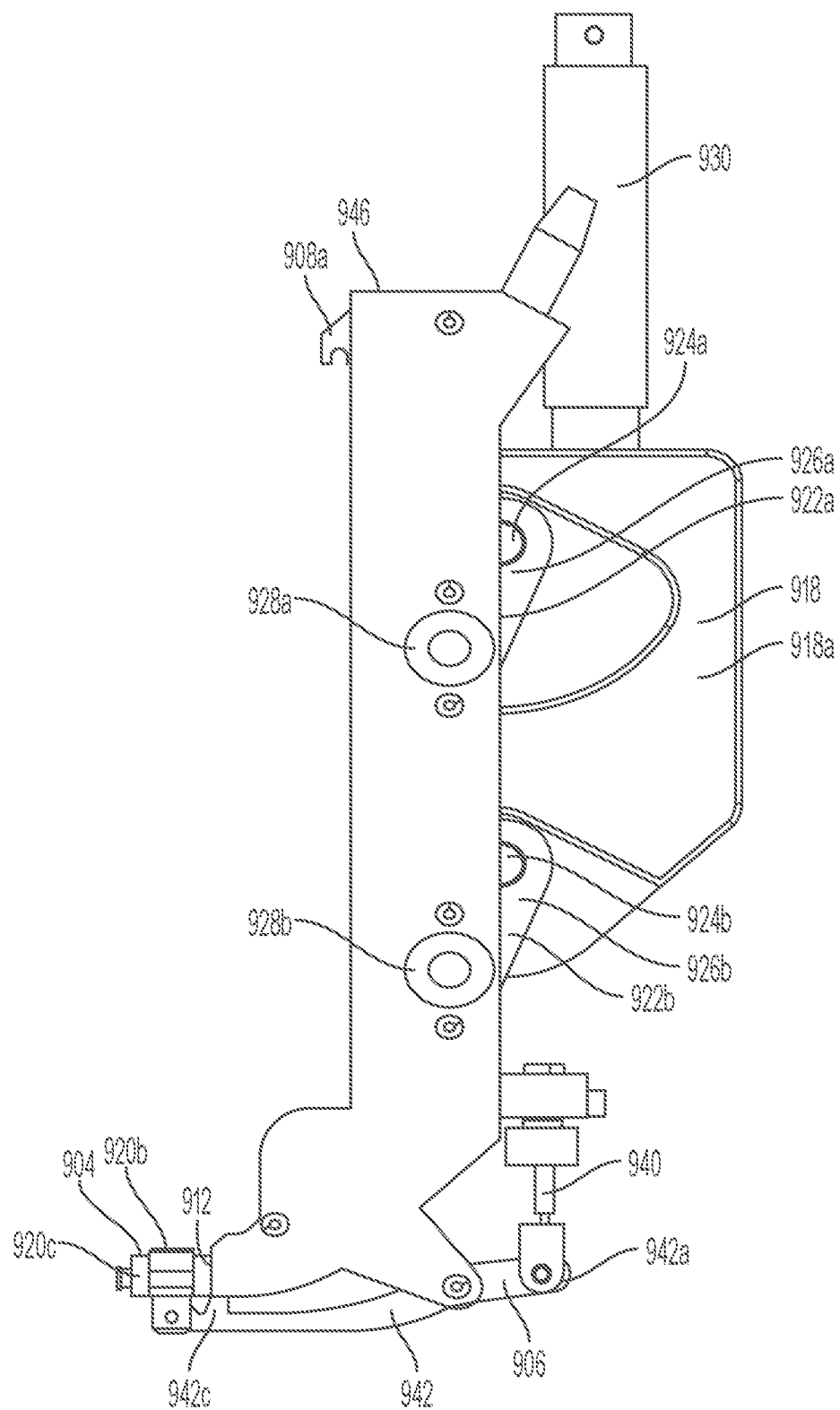
FIG. 10B is a left side elevational view of the rivet dispensing system of FIG. 10A in a second configuration.
Figure 10C:
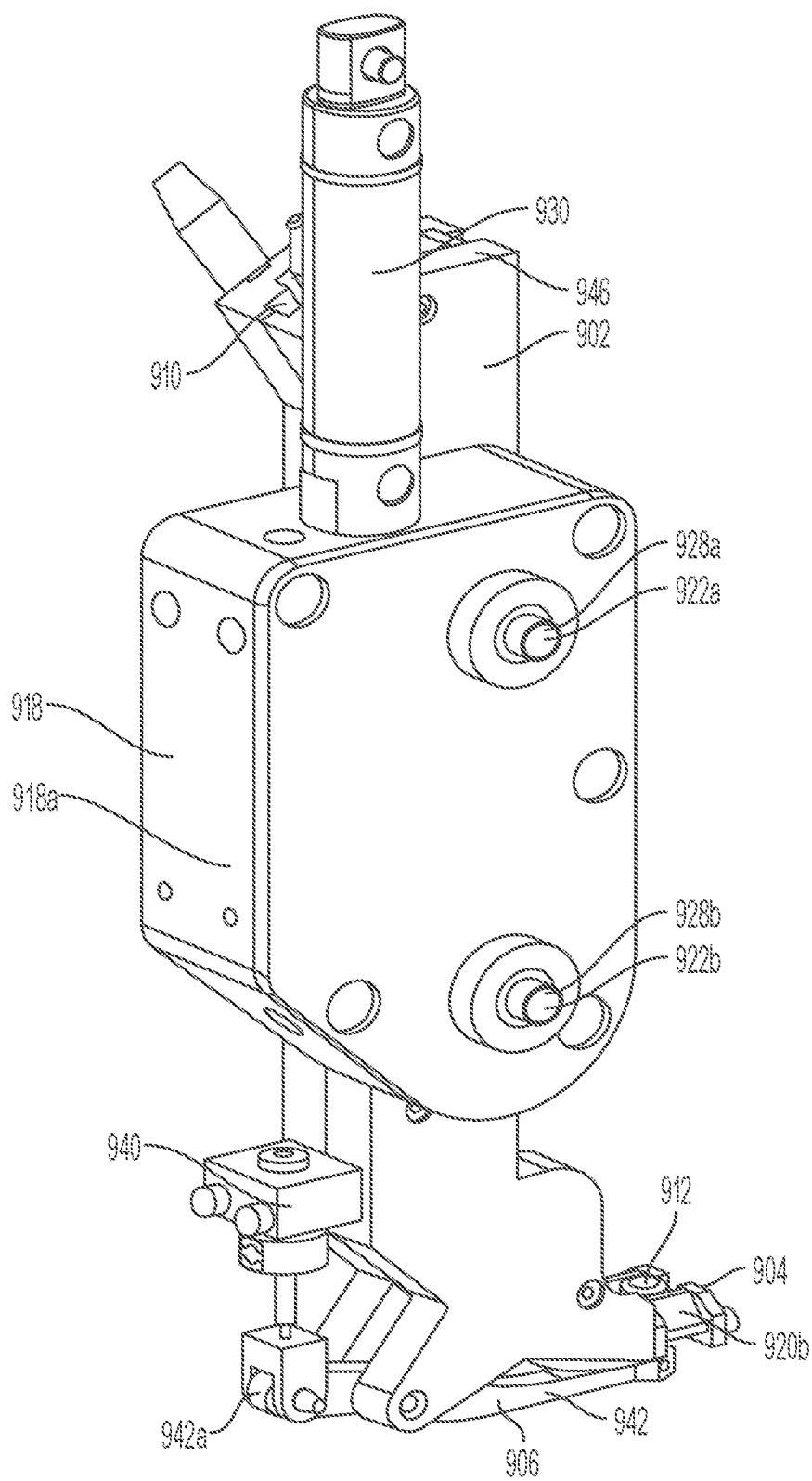
FIG. 10C is a right rear perspective view of the rivet dispensing system of FIG. 10A.

The rivet dispensing system 900 can be configured to move in a single plane. For example, as illustrated in FIGS. 10A-D, the system 900 can comprise a drive unit 918. The drive unit 918 can be configured to move the rivet receiving member 902 along a path between a first position, as shown in FIG. 10A, and a second position, as shown in FIG. 10B. The path can be a constant arc. The drive unit 918 can comprise two linkages, a first linkage 922a and a second linkage 922b. The first linkage 922a can comprise a pin 924a, a link member 926a, and a pin 928a. The pin 924a can be fixed with respect to the link member 926a and rotatable with respect to a body 918a of the drive unit 918. The pin 926a can be rotatable with respect to the link member 926a and the rivet receiving member 902. Rotating the pin 924a can thereby rotate the link member 926a. The second linkage 922b can comprise a pin 924b, a link member 926b, and a pin 926b. The pin 924b can be fixed with respect to the link member 926b and rotatable with respect to the body.

The pin 926b can be rotatable with respect to the link member 926b and the rivet receiving member 902. Rotating the pin 924b can thereby rotate the link member 926b. Rotating the link members 926a, 926b can move the rivet receiving member 902 in a single plane along a path between the first position and the second position. In various embodiments, the linkages 922a, 922b can comprise angled bars and/or parallel arms.

Figure 15A:
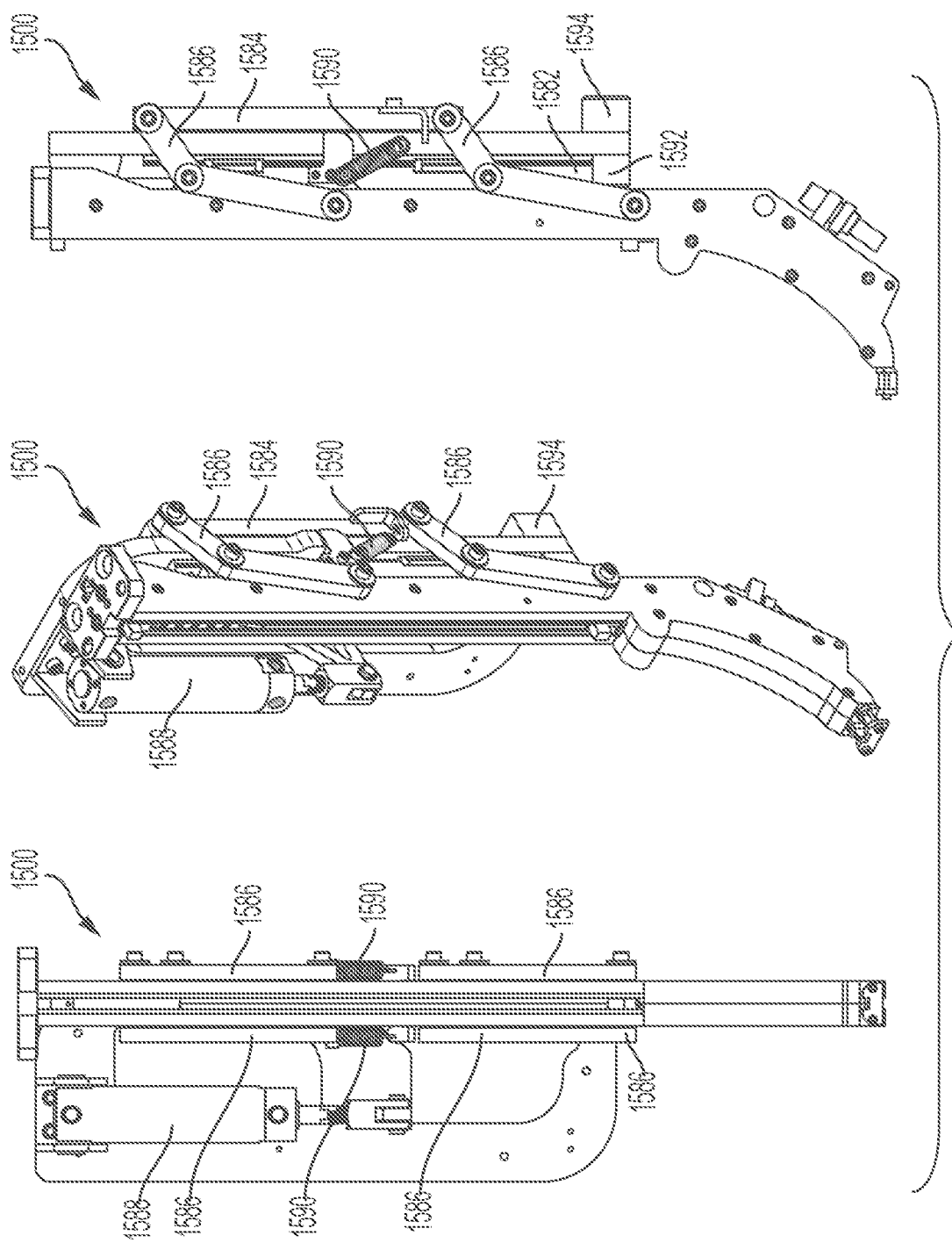
FIG. 15A is a non-limiting embodiment of a rivet dispensing system comprising substantial parallel bar linkages according to the present disclosure, shown in a front view, a front perspective view, and a side view.
Figure 15B:
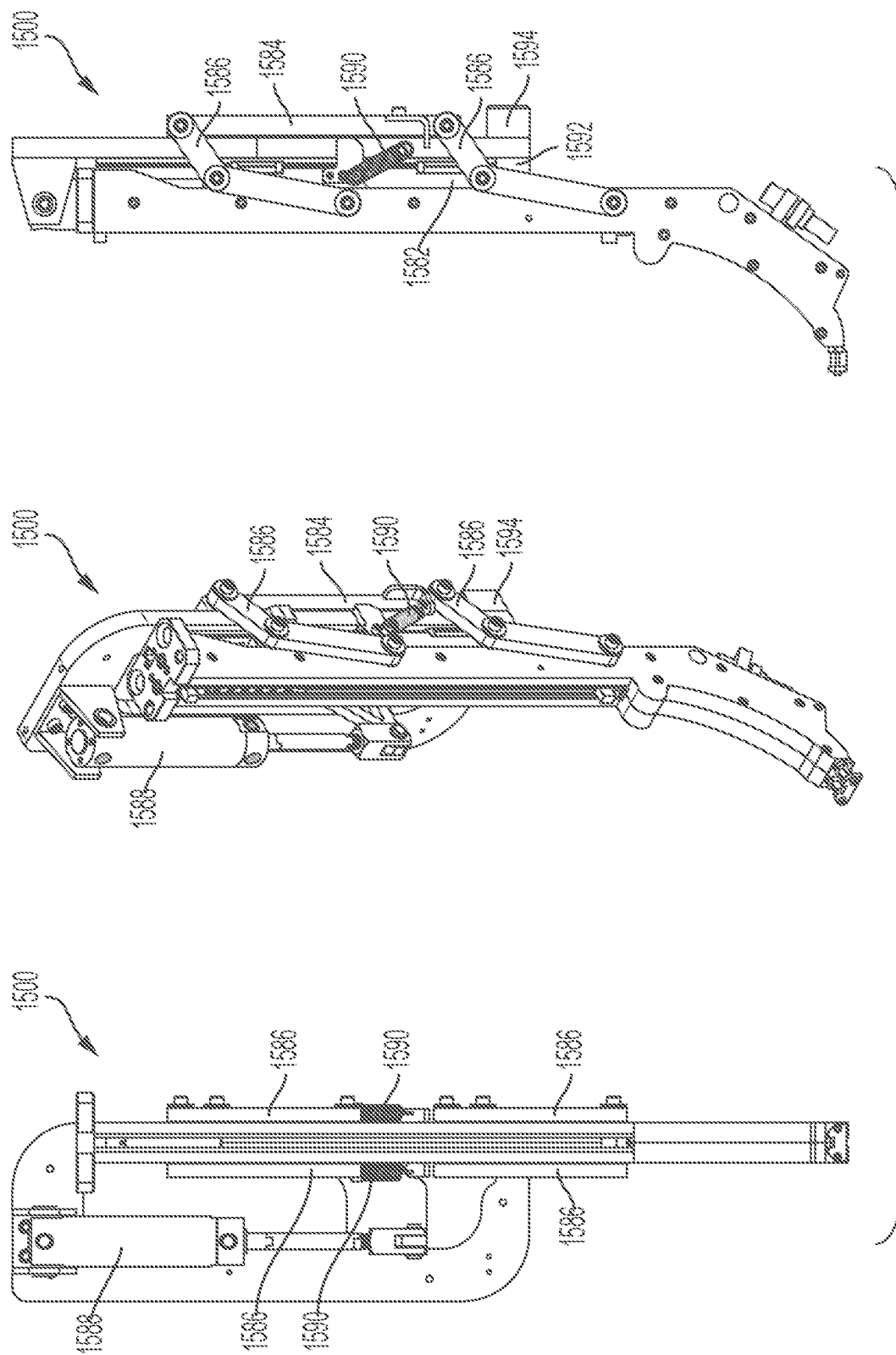
FIG. 15B is the rivet dispensing system of FIG. 15A in a second configuration, shown in a front view, a front perspective view, and a side view.
Figure 15C:
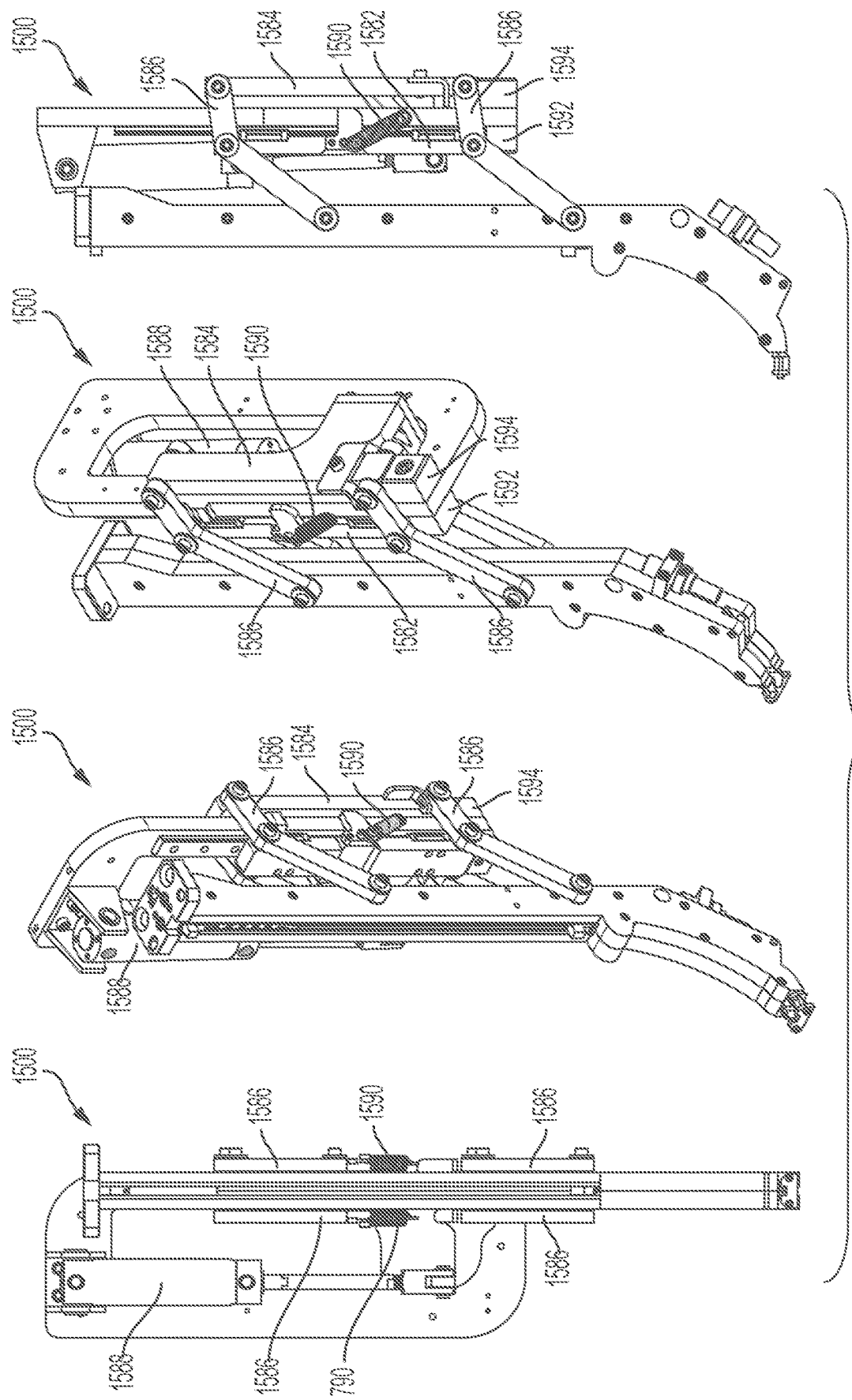
FIG. 15C is the rivet dispensing system of FIG. 15A in a third configuration, shown in a front view, a front perspective view, a rear perspective view, and a side view.
Figure 16A:
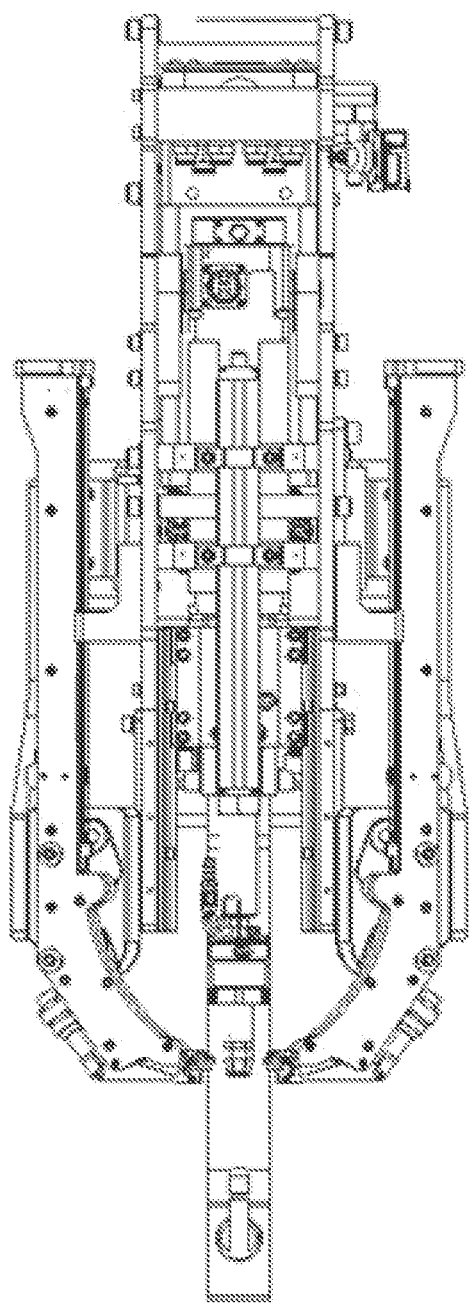
FIG. 16A is a front view showing a non-limiting embodiment of a resistance spot rivet welding apparatus comprising two rivet dispensing systems according to the present disclosure.
Figure 16B:
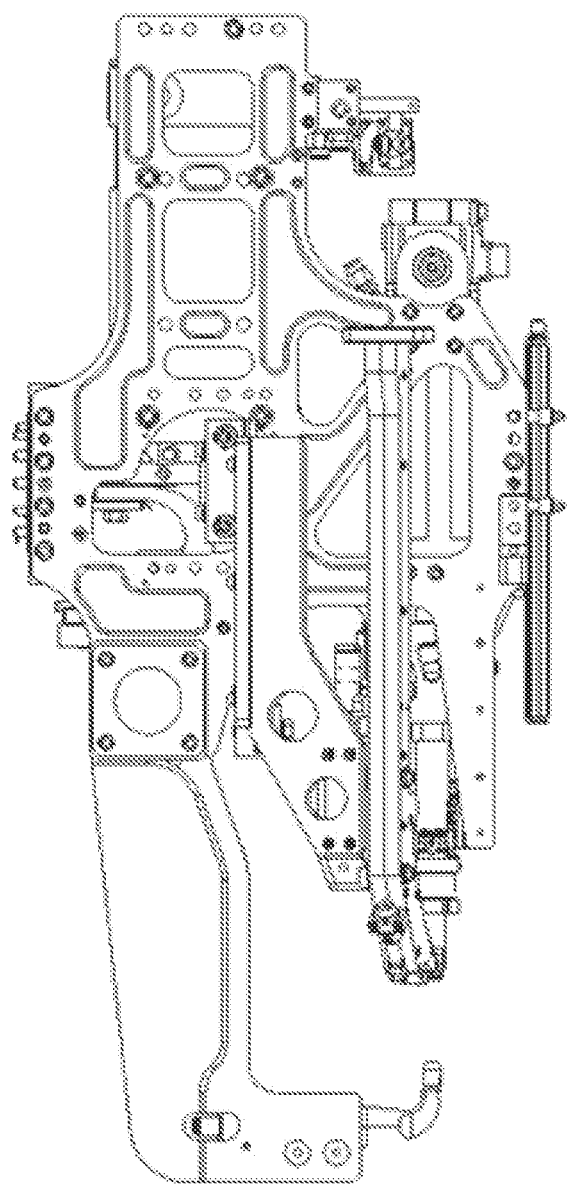
FIG. 16B is a left side view of the resistance spot rivet welding apparatus of FIG. 16A.
Figure 16C:
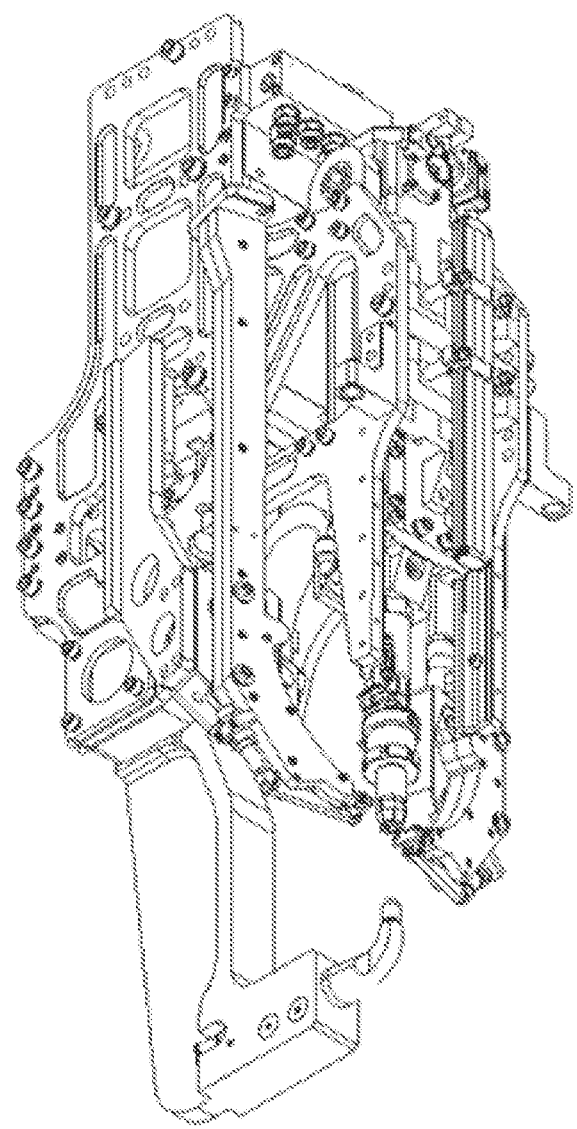
FIG. 16C is a bottom perspective view of the resistance spot rivet welding apparatus of FIG. 16A.
Figure 16D:
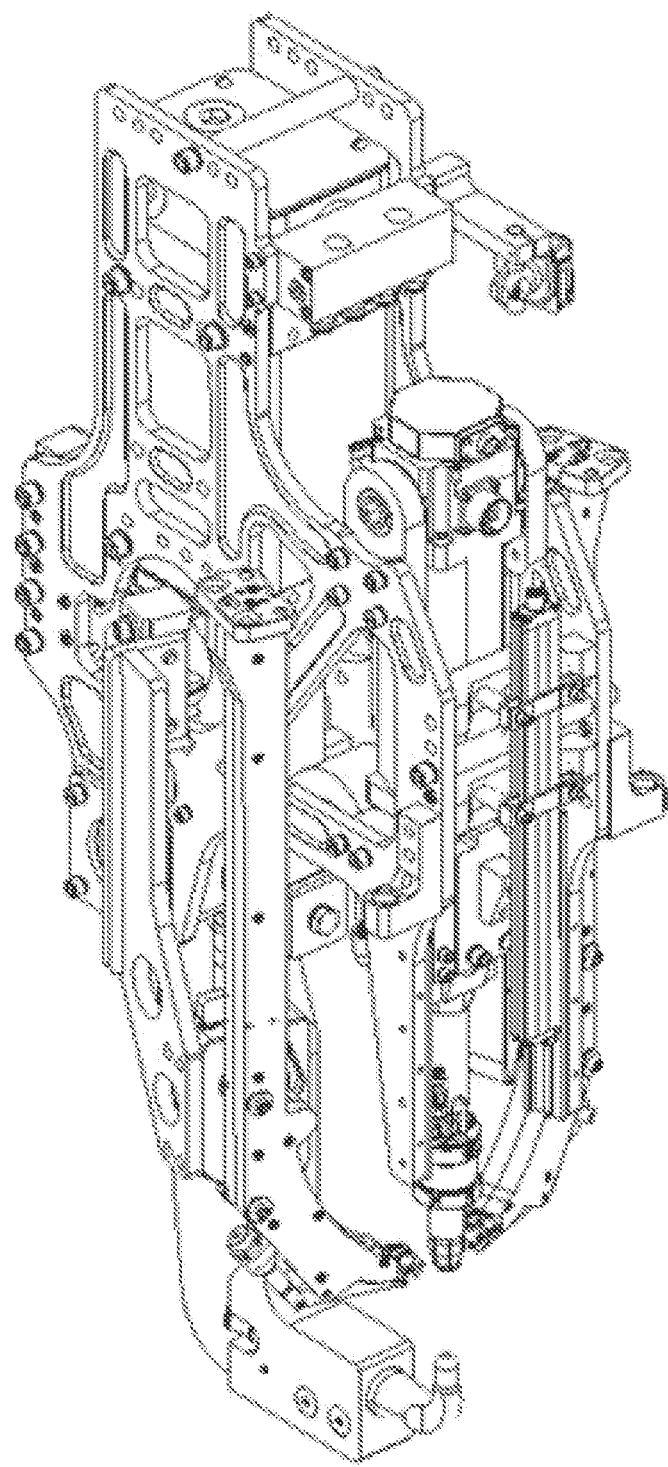
FIG. 16D is a top perspective view of the resistance spot rivet welding apparatus of FIG. 16A.
Figure 17A:
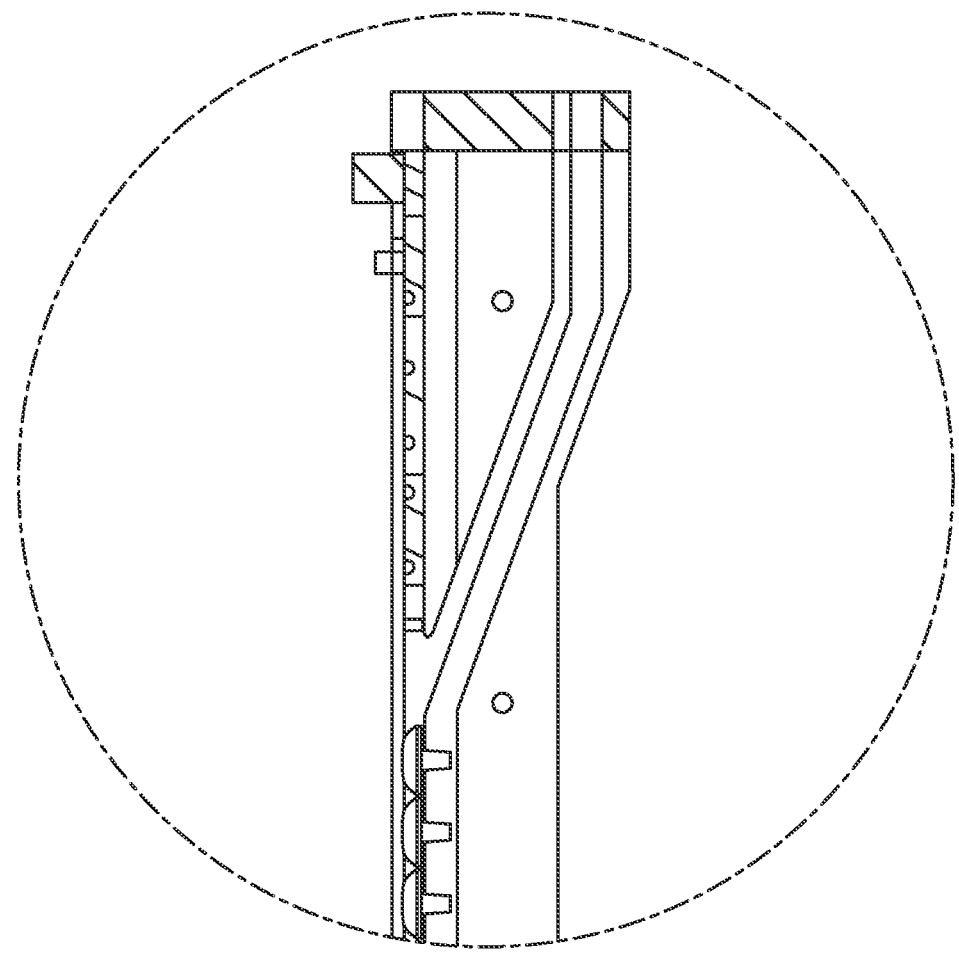
FIG. 17A is a detail view of the tensioner in FIG. 14C.
Figure 17B:
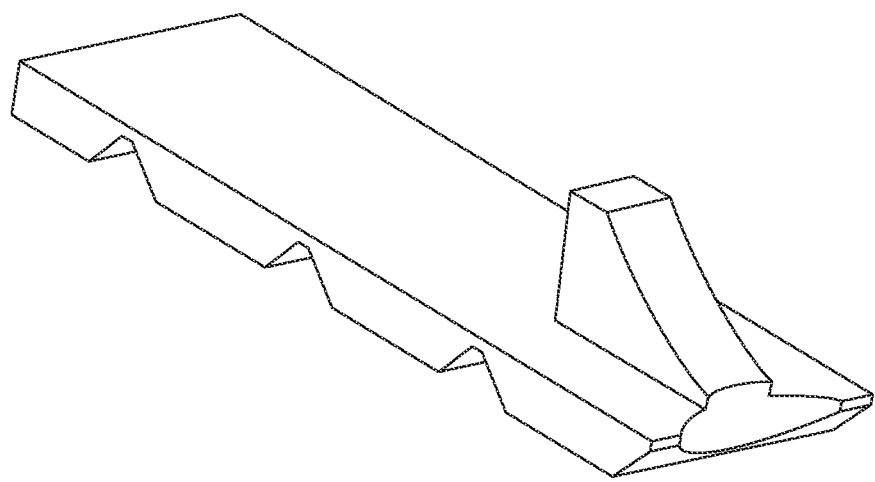
FIG. 17B is an isolated view of the tensioner in FIG. 17A, the shape of the tensioner can assist in preventing rivets from entering channel 916 (e.g., close the gate) so that rivets can smoothly transition from the first port 910 to the remainder of the channel 914 at the "Y" shaped junction, the shape of the tensioner can comprise a shark fin like protrusion with a thickness of a rivet shank diameter, a height of a rivet shank length, and follow the profile of that radius of the rivet.

The rivet dispensing system 900 can move in a multi-step path to avoid a throat of the welding gun and increase part clearance as illustrated in FIGS. 15A-C. For example, as illustrated, the rivet dispensing system 1500 can comprise a main carriage 1582, a secondary carriage 1584, a substantially parallel bar linkage 1586, an actuator 1588, and a spring 1590. FIG. 15A illustrates a resting position of the rivet dispensing system 1500. The rivet dispensing system 1500 can move linearly towards the throat of the weldgun to a first position as illustrated in FIG. 15C by movement of a piston of the actuator 1588. Once at the first position in FIG. 15B, the main carriage 1582 can contact a hard stop 1592, causing the secondary carriage 1584 to overcome tension created by spring 1590 and actuate the bar linkage 1586 towards a second position as illustrated in FIG. 15C. Once at the second position as illustrated in FIG. 15C, the secondary carriage 1584 can contact a secondary hard stop 1594 to restrain the rivet dispensing system 1500 in a position for loading a rivet into a rivet holder such as rivet holder 1538. The actuator 1588 can release the piston and enable the spring 1590 to return the bar linkage 1586 and the secondary carriage 1584 to the first position as illustrated in FIG. 15B and thereafter the resting position as illustrated in FIG. 15A.

Figure 10D:
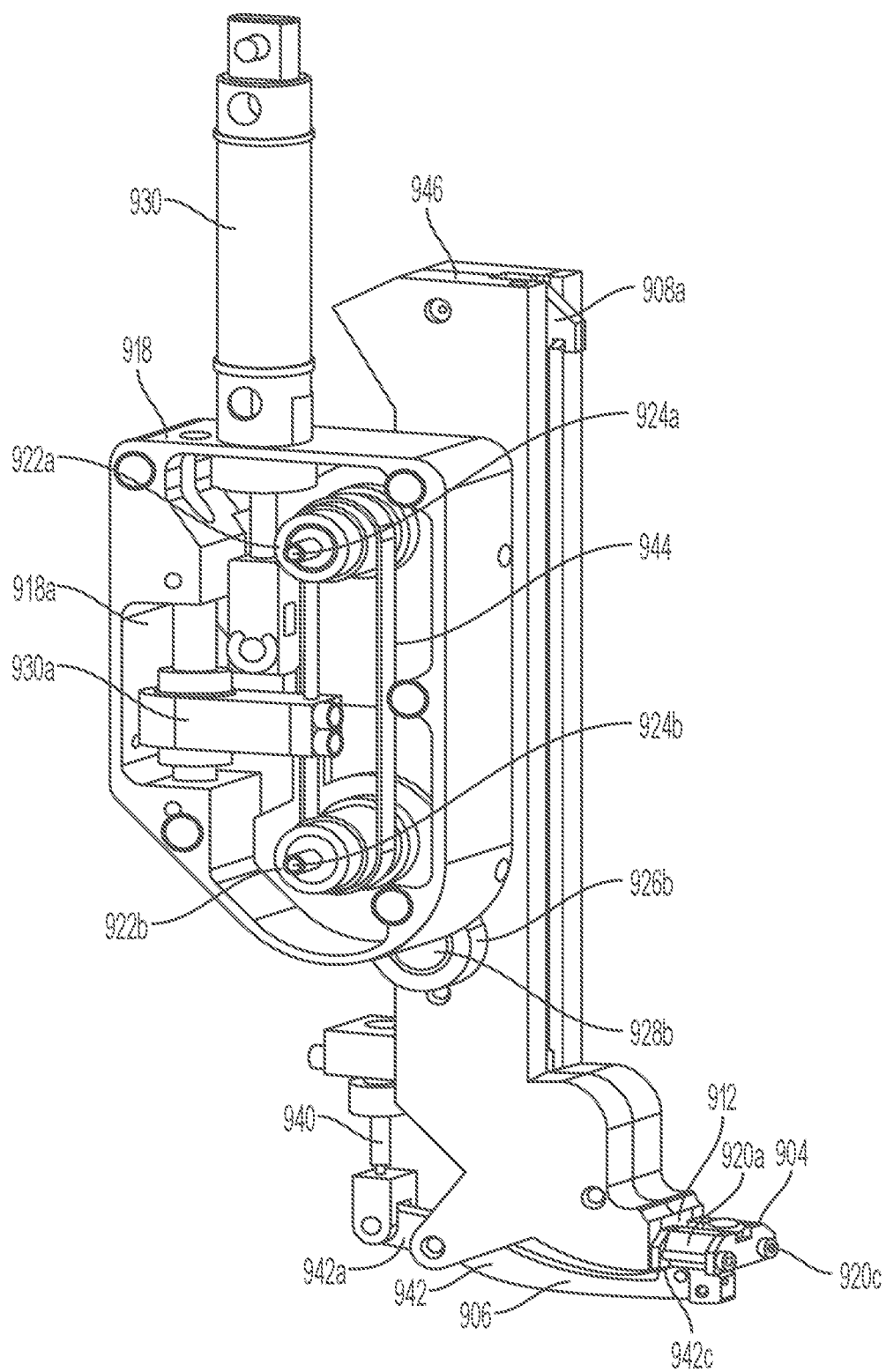
FIG. 10D is a right front perspective view of the rivet dispensing system of FIG. 10A with a cover removed from the drive unit.

As illustrated in FIG. 10D, pins 924a, 924b can be rotated simultaneously by a belt 944. The belt 944 can be in communication with both of the pins 924a, 924b. Rotation of the belt 944 can rotate the pins 924a, 924b. The belt 944 can synchronize the movement of the linkages 922a, 922b. The belt 944 can comprise teeth and the pins 924a, 924b can each comprise a gear. In various embodiments, a linkage, gear, and/or link can be used in place of or in combination with the belt 944. For example, parallel link arms may be used as illustrated in FIG. 12.

A linear actuation member 930 can move the belt 928 which rotates the pins 924a, 924b. For example, the linear actuation member 930 can be connected to the belt 928 via a joint 930a. When the linear actuation member 930 moves, the belt 928 moves accordingly. In various embodiments, the linear actuation member 930 comprises at least one of an actuator and a piston. In various embodiments, the linear actuation member 930 is pneumatically powered.

A linear position transducer (not shown) can be in communication with the rivet receiving member 902 to detect the position of the rivet receiving member 902.

The rivet dispensing system 900 can comprise a rivet sensor configured to detect the number of rivets within the channel 914. For example, the rivet sensor can comprise a laser distance sensor or a linear displacement transducer.

Figure 11A:
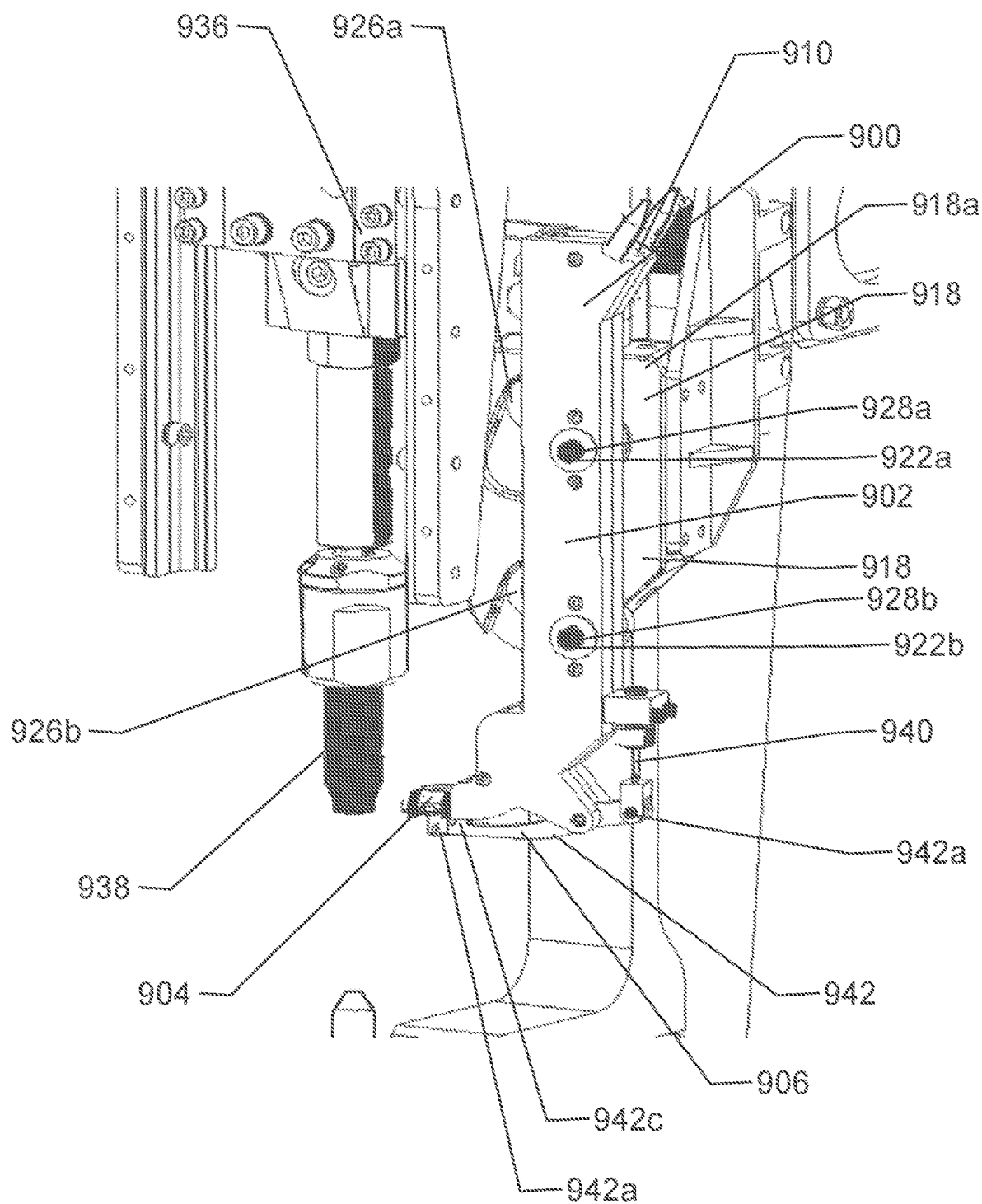
FIG. 11A is a perspective view showing a non-limiting embodiment of a resistance spot rivet welding apparatus comprising a rivet dispensing system in a first configuration according to the present disclosure.
Figure 11B:
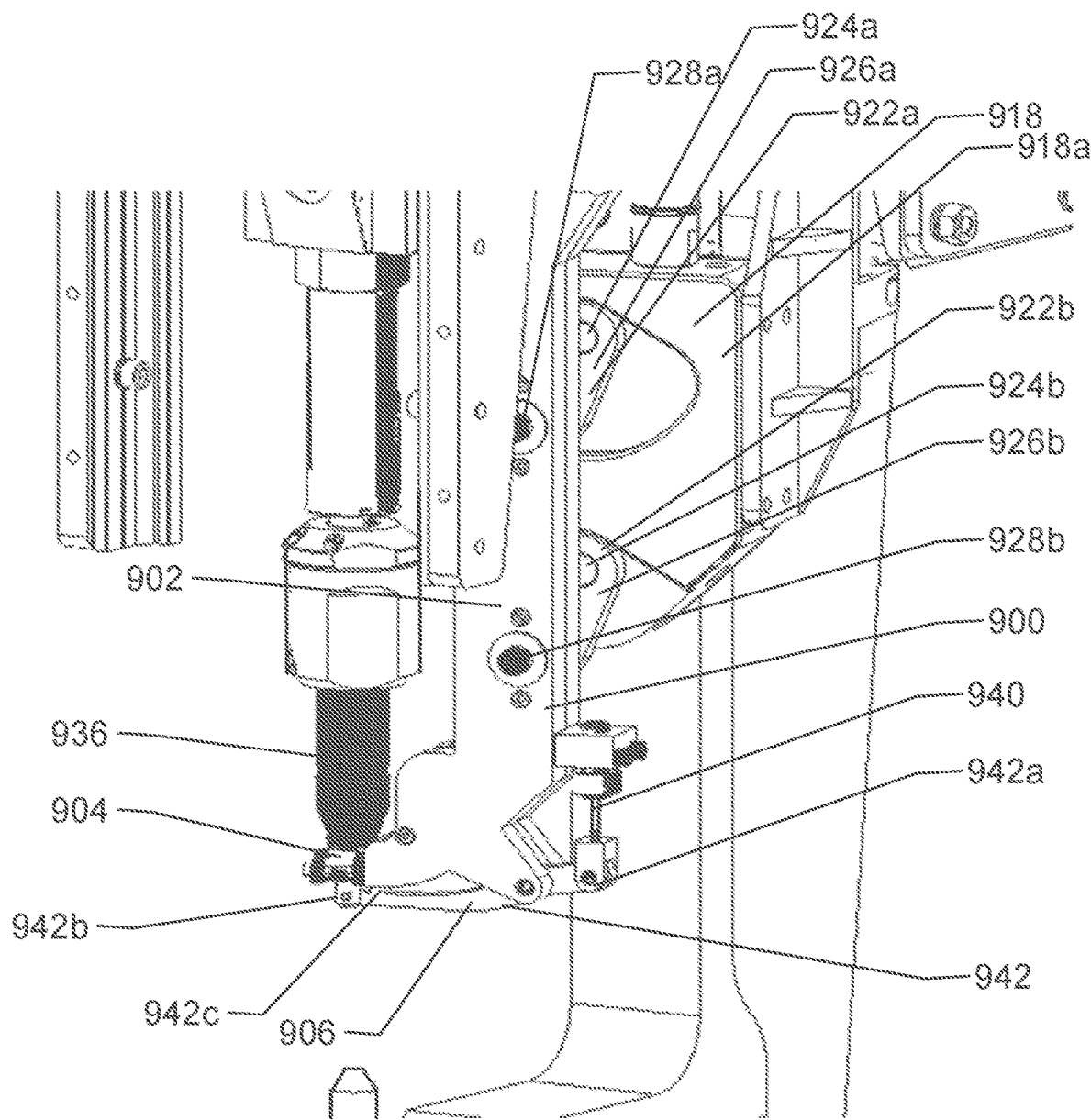
FIG. 11B is a perspective view of the resistance spot rivet welding apparatus of FIG. 11A comprising the rivet dispensing system in a second configuration.
Figure 13A:
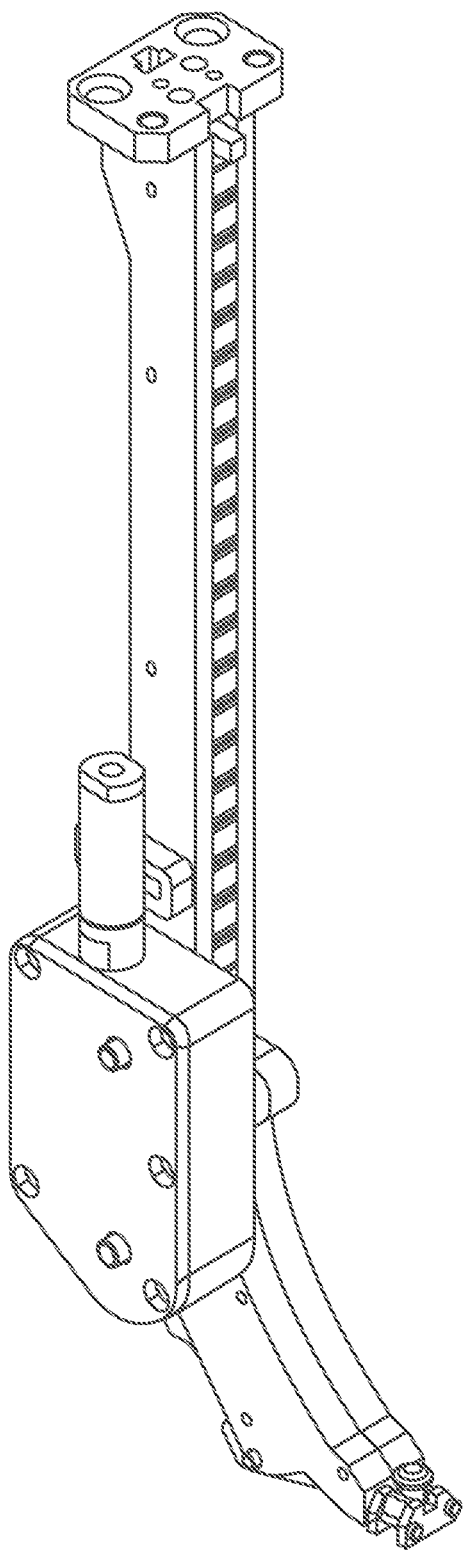
FIG. 13A is a right front perspective view of a non-limiting embodiment of a rivet dispensing system according to the present disclosure.
Figure 13B:
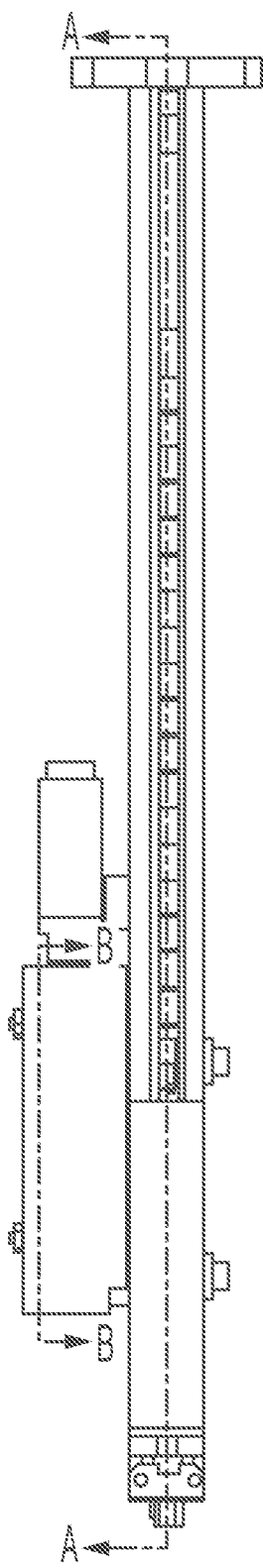
FIG. 13B is a front elevational view of the rivet dispensing system of FIG. 13A.
Figure 13C:
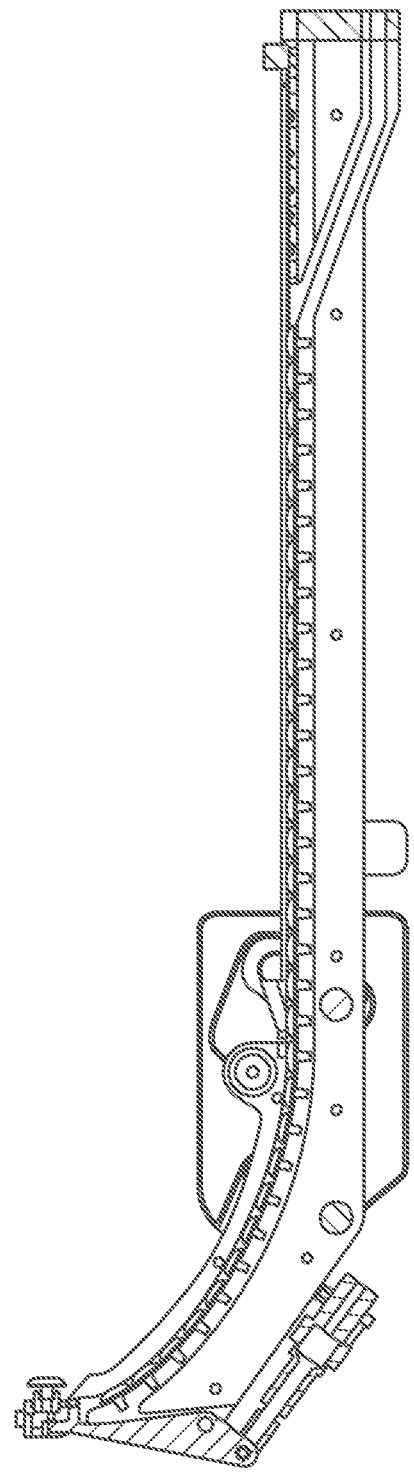
FIG. 13C is a left side cross-sectional elevational view of the rivet dispensing system of FIG. 13A taken along A-A in FIG. 13B.
Figure 13D:
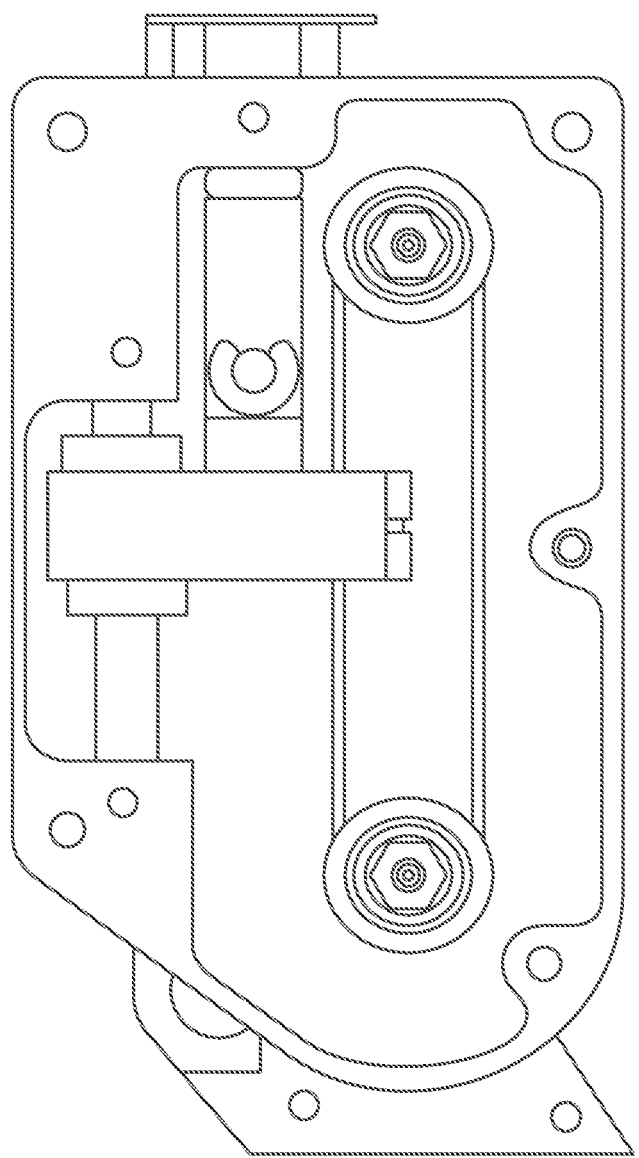
FIG. 13D is a cross-sectional view of the drive unit of the rivet dispensing system of FIG. 13A taken along B-B in FIG. 13B.
Figure 13E:
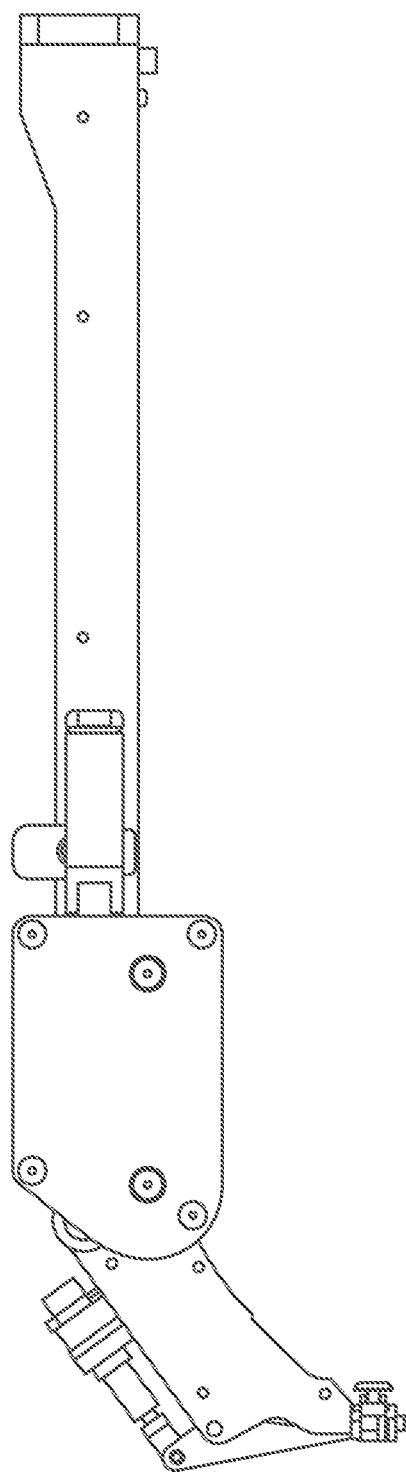
FIG. 13E is a right side elevational view of the rivet dispensing system of FIG. 13A.
Figure 13F:
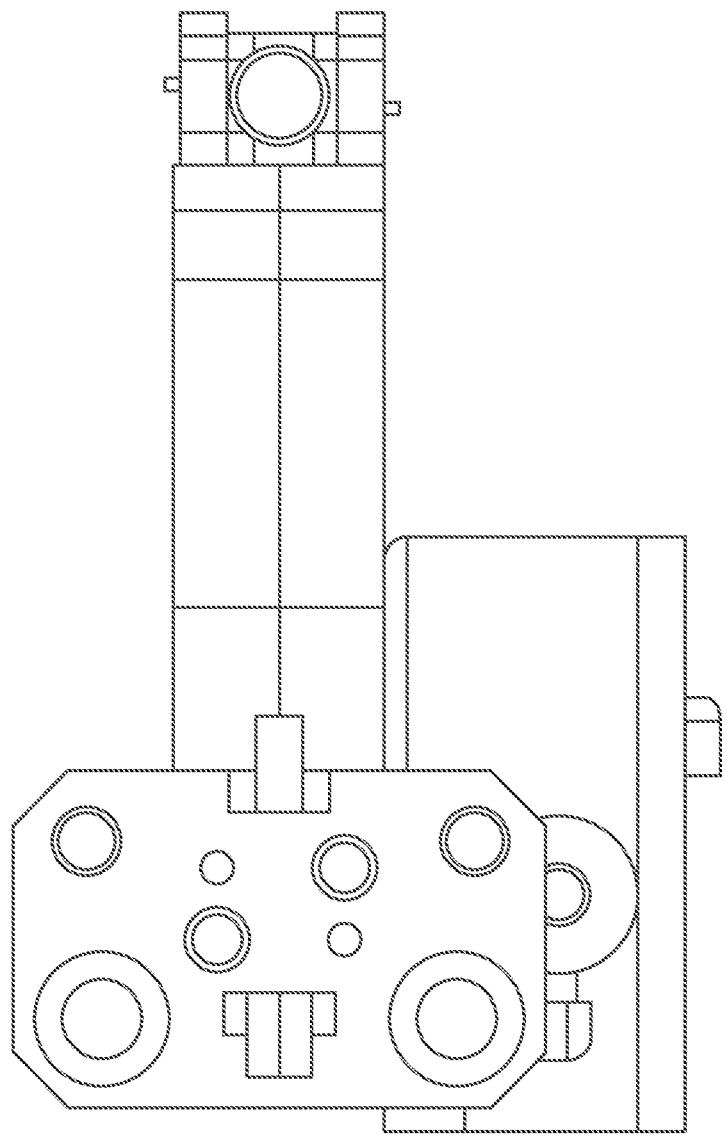
FIG. 13F is a top view of the rivet dispensing system of FIG. 13A.
Figure 14A:
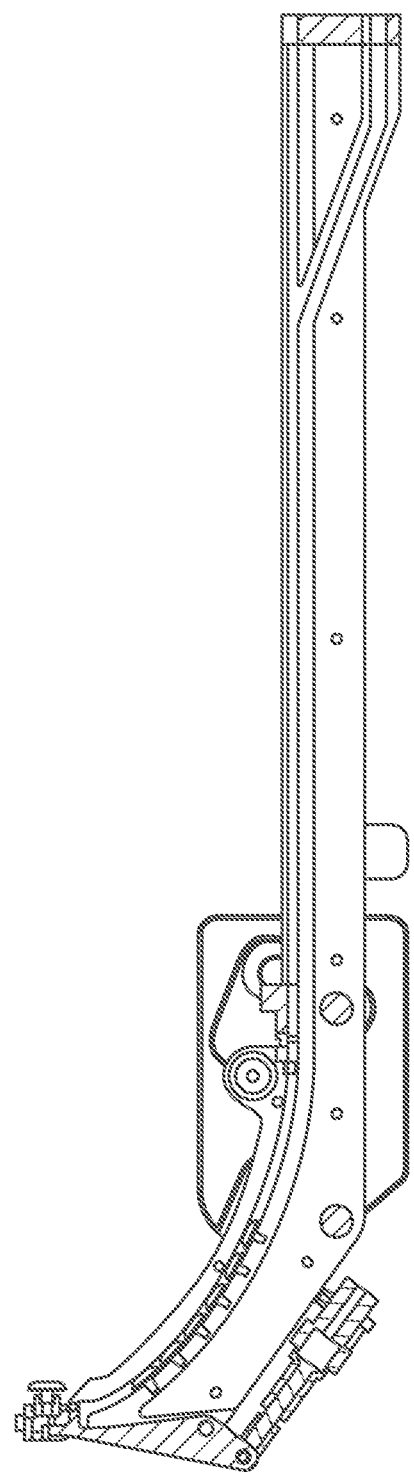
FIG. 14A is a left side cross-sectional elevational view of the rivet dispensing system of FIG. 13A taken A-A in FIG. 13B in a rivet tension configuration wherein the tensioner can urge the rivets within the channel towards the seat member.
Figure 14B:
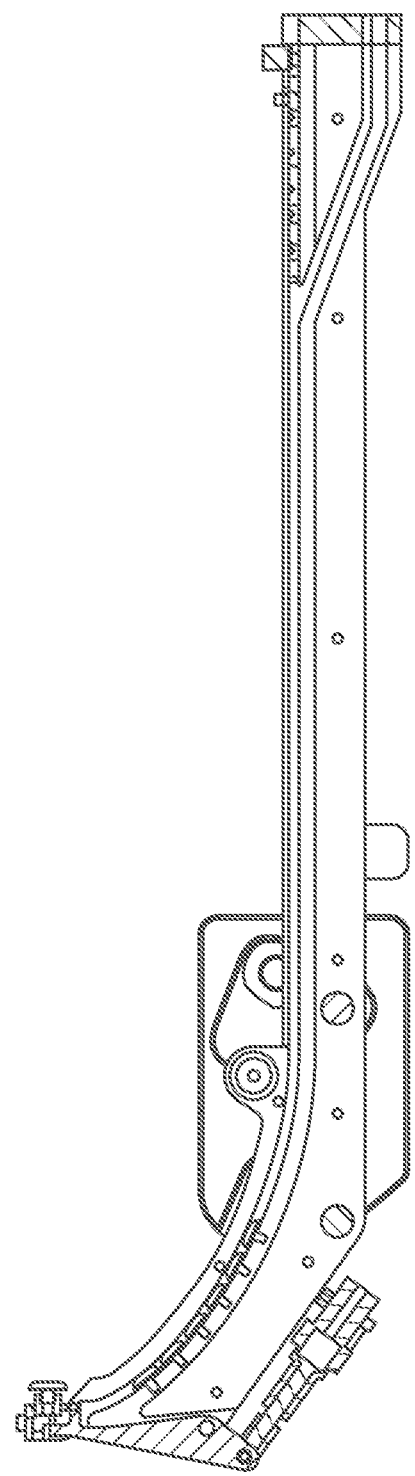
FIG. 14B is left side cross-sectional elevational view of the rivet dispensing system of FIG. 14A in a rivet reload ready configuration wherein the tensioner is in the secondary channel and the channel is configured to receive rivets.
Figure 14C:
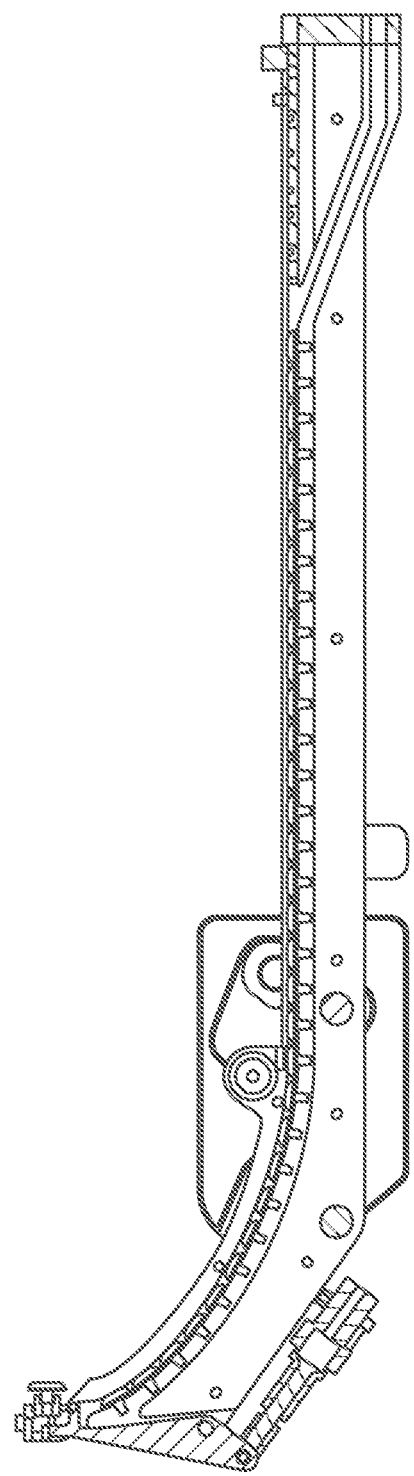
FIG. 14C is a left side cross-sectional elevational view of the rivet dispensing system of FIG. 14A in a reloaded configuration wherein the channel has been reloaded with rivets and the tensioner can urge the rivets within the channel towards the seat member.

As illustrated in FIGS. 11A-B, a resistance spot rivet welding apparatus 936 can comprise a rivet holder 938 and the rivet dispensing system 900. FIG. 11A illustrates the rivet dispensing system 900 in a first configuration. The drive unit 918 can move the rivet dispensing system 900 to a second configuration as illustrated in FIG. 11B. In the second configuration, the actuation member 908 can introduce a rivet to the rivet holder 938 from the seat member 904. In various embodiments, a pedestal resistance spot rivet welding apparatus can comprise the rivet holder 938 and the rivet dispensing system 900. In various embodiments, a robotic resistance spot rivet welding apparatus can comprise the rivet holder 938 and the rivet dispensing system 900.

The resistance spot rivet welding apparatus 936 can comprise at least two rivet dispensing systems 900. For example, as illustrated in FIGS. 16A-D, the resistance spot welding apparatus 936 can comprise two rivet dispensing systems 900. The rivet dispensing systems 900 can be the same or different. The rivet dispensing systems 900 can comprise the same rivets or different rivets.

A rivet holder can comprise a collet, such as collet 20. The rivet dispensing system can comprise a fastener delivery system 26.

Figure 18:
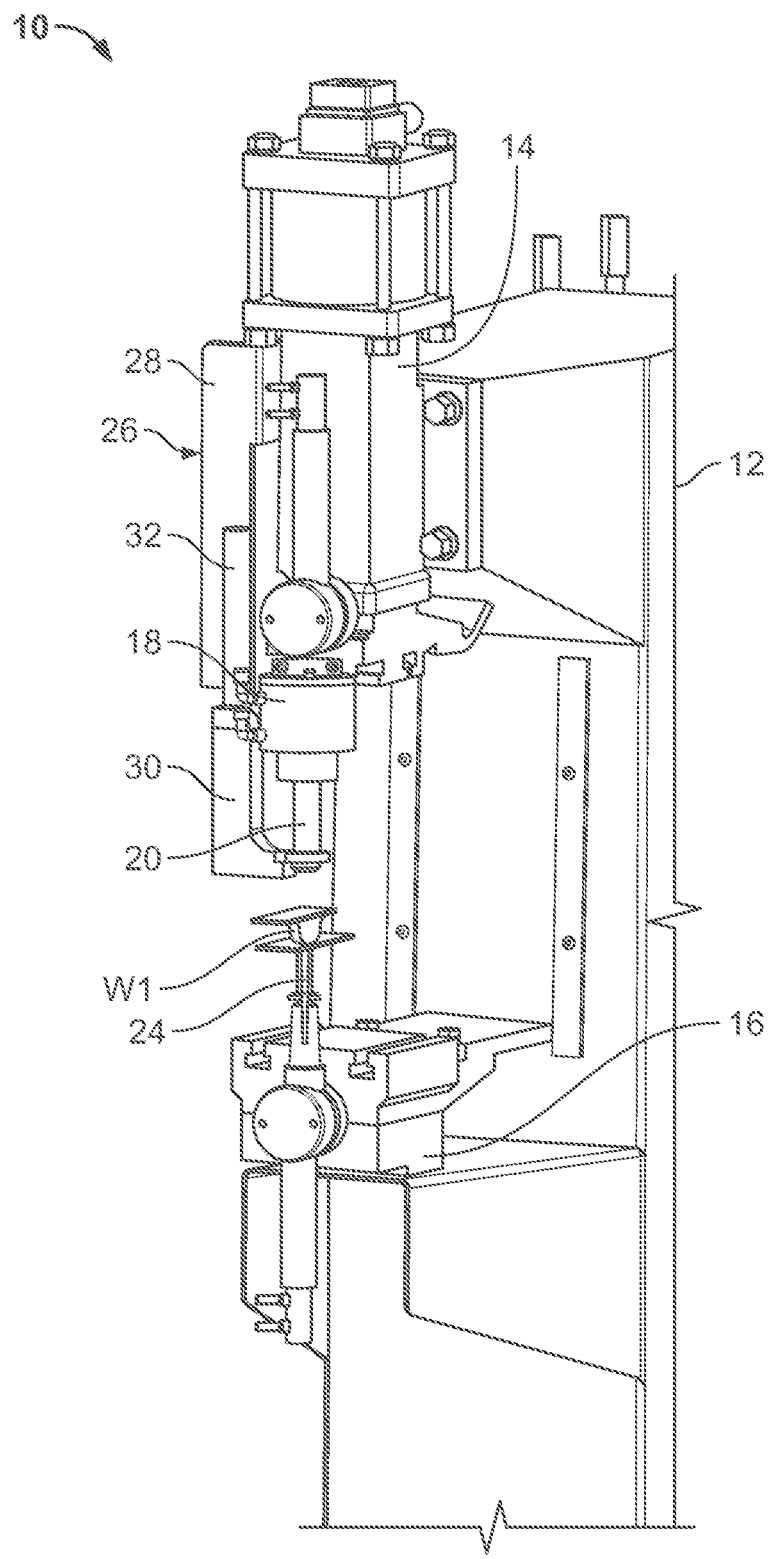
FIG. 18 is a front perspective view of a resistance welding fastener feeding apparatus in accordance with an embodiment.
Figure 19:
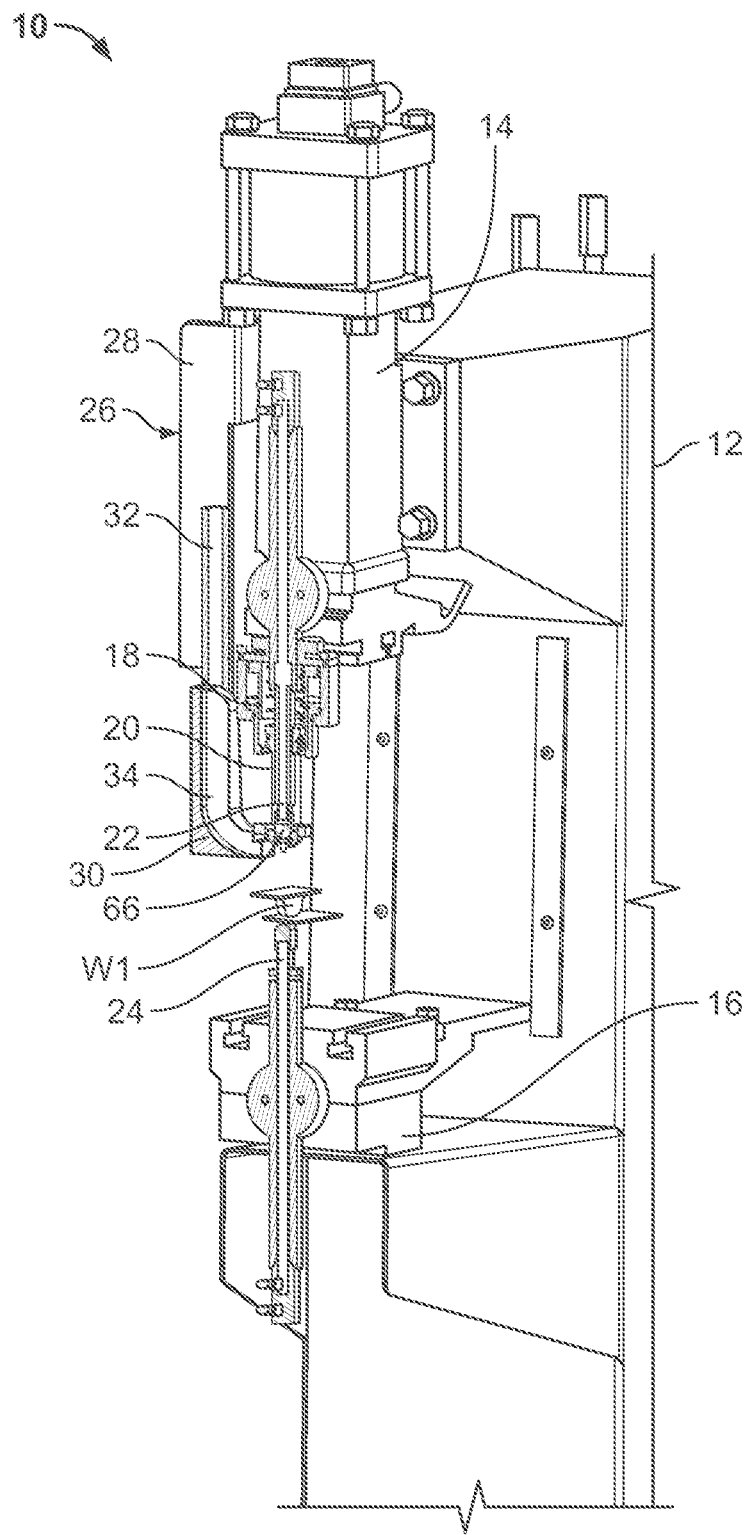
FIG. 19 is a front perspective review of the feeding apparatus shown in FIG. 18, but with certain components thereof shown in cross-section, the feeding apparatus shown in a first, home position.

FIGS. 18 and 19 show an embodiment of a resistance spot rivet welding fastener feeding apparatus 10 (hereinafter, the "feeding apparatus 10"). In an embodiment, the feeding apparatus 10 is adapted to weld a fastener to a work piece W1, such as a sheet, panel, or other suitable structure. In an embodiment, the work piece W1 is a flat sheet. In an embodiment, the work piece W1 includes a recess. In an embodiment, the feeding apparatus 10 includes a welder housing 12, an upper welder portion 14 mounted to the welder housing 12, and a lower welder portion 16 mounted to the welder housing 12 and is positioned opposite the upper welder portion 14. In an embodiment, the upper welder portion 14 includes an actuator 18, a collet 20 mounted to and extending from the actuator 18, and an upper electrode 22 that is sized, shaped, and adapted to receive movably and slidably the collet 20. In an embodiment, the collet 20 surrounds the upper electrode 22 and is movable axially relative to the upper electrode 22. In an embodiment, the collet 20 is a split collet. In an embodiment, the collet 20 is oriented and extends from the actuator 18 vertically or substantially vertically and downwardly, as shown in FIGS. 18 and 19. In an embodiment, the lower welder portion 16 includes a lower electrode 24. In an embodiment, the lower electrode 24 extends upwardly and vertically or substantially vertically. In an embodiment, the lower electrode 24 is aligned axially with the upper electrode 22. In other embodiments, the feeding apparatus 10 can be constructed such that the collet 20, the upper electrode 22, and the lower electrode 24 extend in other directions, orientations, and positions, it being understood that the upper electrode 22 and the lower electrode 24 be aligned with one another.

Still referring to FIGS. 18 and 19, in an embodiment, the feeding apparatus 10 includes a fastener delivery system 26 having an upper feeding portion 14 and a lower, fixed point delivery portion 30, one end of which is mounted to the upper feeding portion 28 and an opposite end of which is connected to the collet 20, as will be discussed in further detail hereinafter. In an embodiment, the upper feeding portion 28 is substantially elongated, while the lower, fixed point delivery portion 30 is generally L-shaped. In an embodiment, the upper feeding portion 28 includes an inner feed tube 32, while the lower, fixed point delivery portion 30 includes an inner track 34 that is in communication with the feed tube 32 of the upper feeding portion 28. In an embodiment, the fastener delivery system 26 is adapted to receive and feed a single or a plurality of fasteners from the upper feeding portion 28 to the lower, fixed point delivery portion 30 and into the collet 20. In an embodiment, the inner feed tube 32 and the inner track 34 are sized and shaped to receive and transport the fasteners to the collet 20. In an embodiment, the fasteners are rivets. In an embodiment, the rivets are resistance welding rivets. In an embodiment, the fastener delivery system 26 feeds a single fastener to the collet 20 during one cycle of the fastening/welding process. In other embodiments, the fastener delivery system 26 feeds a plurality of fasteners for staging at the system for faster cycle times. In another embodiment, the feeding apparatus 10 utilizes a vibratory bowl or other appropriate feeding device to send the fasteners through the lower, fixed point delivery portion 30. In another embodiment, the feeding apparatus 10 may utilize a cartridge of fasteners mounted on the fixed-point delivery portion 30 for feeding the fasteners through. In another embodiment, the fasteners can be fed manually or hand loaded into the collet 20. In other embodiments, the fastener delivery system 26 can be positioned on either a fixed or moving electrode of the welder.

Figure 20A:
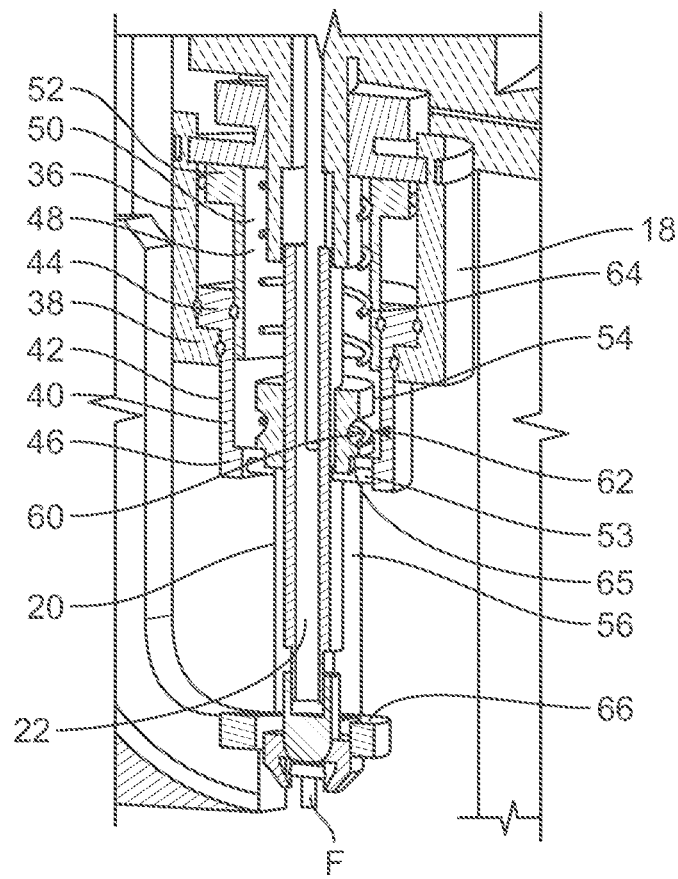

Referring to FIG. 20A, in an embodiment, the actuator 18 includes a tubular-shaped housing 36 having an upper end and a lower end, and an interior ledge 38 located proximate to the lower end. In an embodiment, a first tubular member 40 is located within the housing 36 and includes an elongated shank portion 42 and a flange 44 at an upper end thereof, the flange 44 juxtaposed with an engaging the ledge 38 of the housing 36 and is mounted to the housing 36 at the lower end thereof. In an embodiment, a portion of the elongated shank portion 42 of the first tubular member 40 extends from the lower end of the housing 36. In an embodiment, elongated shank portion 42 of the first tubular member 40 includes an interior, annular ledge 46 located at a lower end thereof. In an embodiment, a second tubular member 48 is positioned within the housing 36 and includes an elongated shank portion 50 and a flange 52 at one end thereof. In an embodiment, a portion of the elongated shank portion 50 of the second tubular member 48 is positioned within the elongated shank portion 42 of the first tubular member 40, and the flange 52 of the second tubular member 48 is mounted to the housing 36 proximate to the upper end thereof. In an embodiment, the actuator 18 includes a pin 53 that extends through the lower end of the elongated shank portion 42 of the first tubular member 40 transversely, as well as through the collet 20 which will be described hereinafter.

Figure 20B:
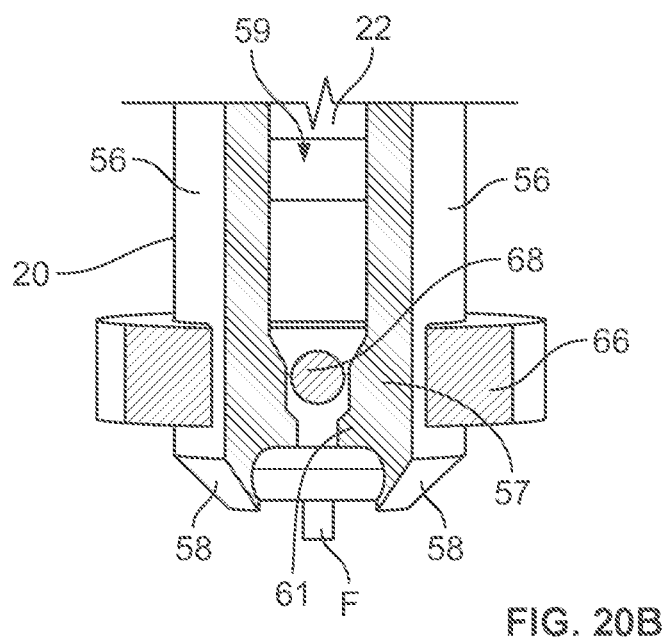
FIG. 20B is a front elevational, cross-sectional view of a portion of the collet shown in the first, home position.

Referring to FIGS. 20A and 20B, in an embodiment, the collet 20 includes a base 54 at one end thereof and a plurality of collet fingers 56 extending from the base 54, each of which includes a tapered, gripping portion 58 at a lower end thereof. In an embodiment, each of the gripping portions 58 of the collet fingers 56 of the collet 20 includes an internal bump 57 (see also, FIG. 28). In an embodiment, the internal bumps 57 are rounded. In an embodiment, an elongated slot 59 is formed axially between the plurality of collet fingers 56, and the slot 59 includes a tapered end 61 located proximate to the lower end of the collet fingers 56. In an embodiment, the base 54 includes an annular groove 60 that is sized and shaped to receive a first spring 62, and a transverse slot 65 that is sized and shaped to receive therethrough the pin 53 of the actuator 18. In an embodiment, the first spring 62 secures the plurality of collet fingers 56 together as the collet 20 opens and closes. In an embodiment, the ledge 46 of the base 54 of the collet 20 does not contact the first tubular member 40, the slot 59 stops on the pin 53, and the pin 53 of the actuator 18 limits the travel of the collet 20, as will be described hereinafter. In an embodiment, the upper electrode 22 extends through the actuator 18, and in particular, the first and second tubular members 40, 48, and through the collet 20. In an embodiment, a second spring 64 is positioned within the first and second tubular members 40, 48 of the actuator 18 and around the upper electrode 22. In an embodiment, one end of the second spring 64 engages a top portion of the base 54 of the collet 20. In an embodiment, the second spring 64 exerts a spring force against the collet 20 to facilitate the travel of the collet 20, which will be described in further detail hereinafter.

Referring to FIGS. 18 through 20B, the fixed-point delivery portion 30 of the fastener delivery system 26 includes a ring 66 attached to and extending from the lower end of the lower, fixed point delivery portion 30. In an embodiment, the ring 66 is sized and shaped to receive axially the plurality of collet fingers 56 of the collet 20 therethrough. In an embodiment, the ring 66 includes a pin 68 that extends transversely through the slot 59 of the collet 20. In an embodiment, the pin 68 of the ring 66 is moveable within the slot 59 of the collet, which shall be described hereinafter.

Referring to FIGS. 18 through 20A, in an embodiment, the feeding apparatus 10 begins the cycle in its home position. A fastener F is feed through the fastener delivery system 26 to the fixed-point delivery portion 30. When the feeding apparatus 10 is in its home position, the second spring 64 biases the collet 20 axially in a direction towards the work piece W1. A top end of the slot 59 of the collet 20 contacts the pin 53 of the actuator 18, and, as such, controls the position of the collet 20 relative to the upper electrode 22. When the tapered end 61 of the slot 59 of the collet 20 contacts the pin 68 of the ring 66, the collet fingers 56 the collet 20 are forced open and spread apart from one another, thereby enabling the fastener F to enter the collet 20 and, more particularly, in between the gripping portions 58 of the collet fingers 56. In an embodiment, the opening in the collet 20 can be controlled so that a detent is created as the fastener F passes into the collet 20, thereby providing positive positioning of the fastener F. The first spring 62 of the collet 20 maintains the collet fingers 56 of the collet 20 together and is expandable in order to enable the collet fingers 56 to separate and spread apart from one another and hinge in order to open when required, such as when receiving the fastener F. In this regard, the fastener F is sent via the feed tube 32 of the fastener delivery system 26 and passes through the fixed-point portion delivery portion 30 of the fastener delivery system 26 into the collet 20.

Figure 21:
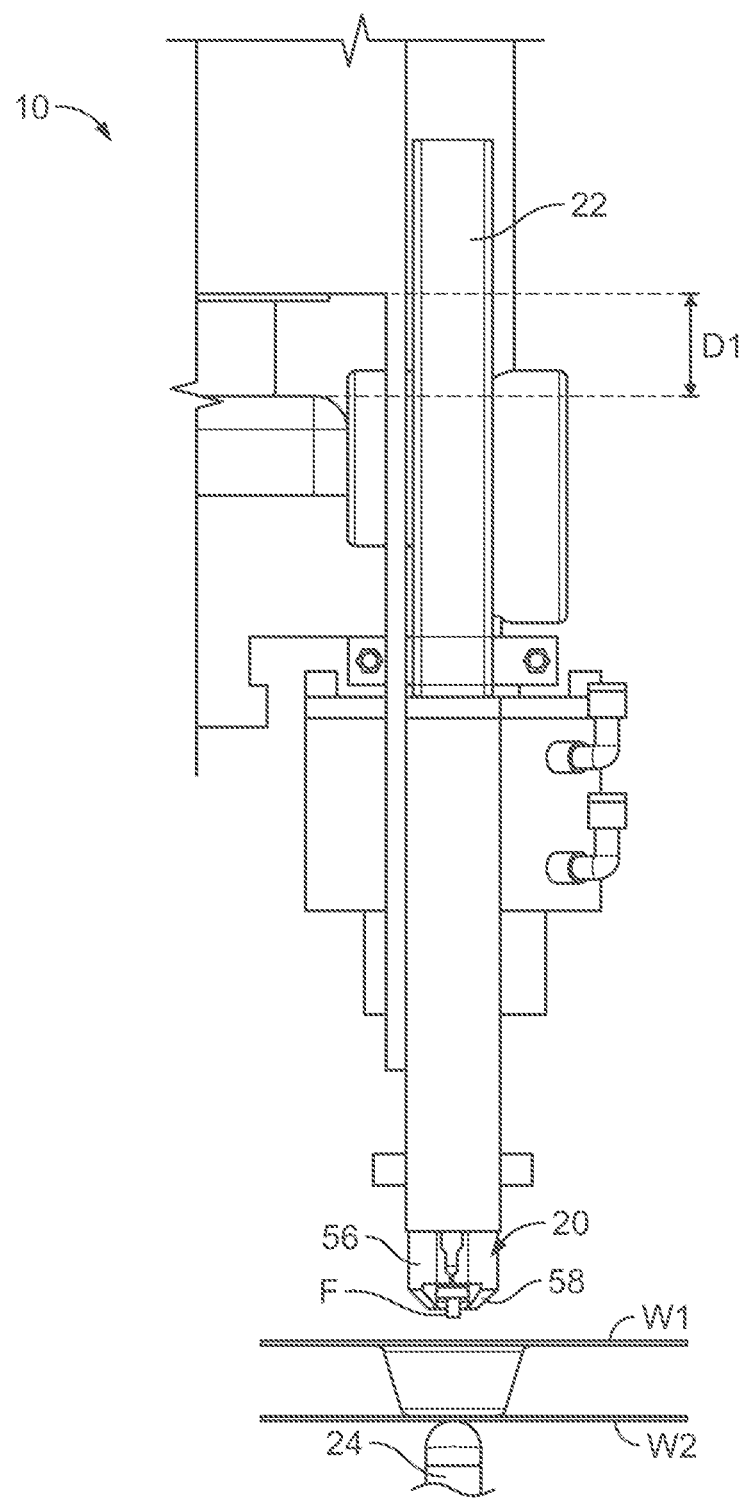
FIG. 21 is a front elevational, cross-sectional view of a portion of the feeding apparatus of FIGS. 18 and 19, the feeding apparatus shown in a second position such that an upper electrode employed by the feeding apparatus is moved towards a work piece.
Figure 22:
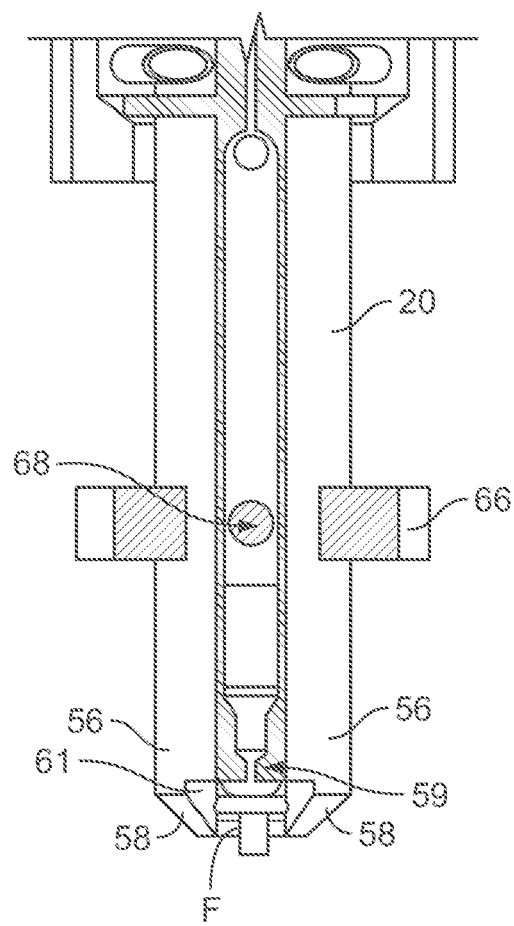
FIGS. 22 and 23 are front elevational, cross sectional views of the collet of the feeding apparatus shown in FIG. 21, the collet shown in the second position.
Figure 23:
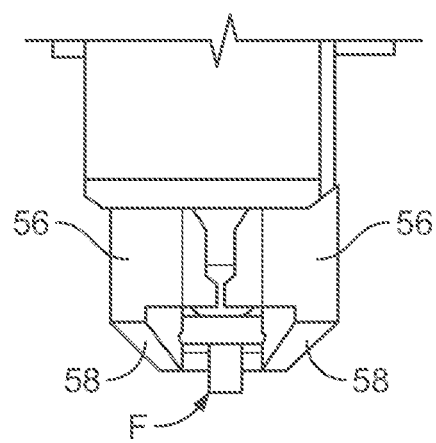

Referring to FIGS. 21 through 23, in an embodiment, the upper electrode 22 moves axially towards work pieces W1, W2 for a distance D1. As the upper electrode 22 moves toward the work pieces W1, W2, the tapered end 61 of the slot 59 of the collet 20 moves away from the pin 68 of the ring 68 of the fastener delivery system 26. In turn, the collet fingers 56 of the collet 20 close and the gripping portions 58 thereof firmly grip the fastener F, and keeps the fastener F aligned with the upper and lower electrodes 22, 24.

Figure 24:
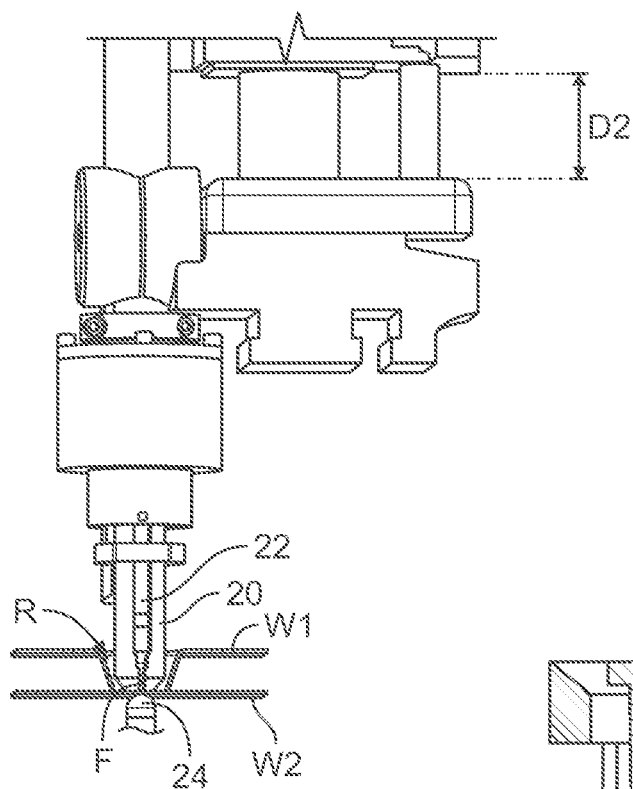
FIG. 24 is a front elevational, cross-sectional view of a portion of the feeding apparatus of FIGS. 18 and 19, the feeding apparatus shown in a third position such that a fastener is clamped between the upper electrode and the work piece.
Figure 25:
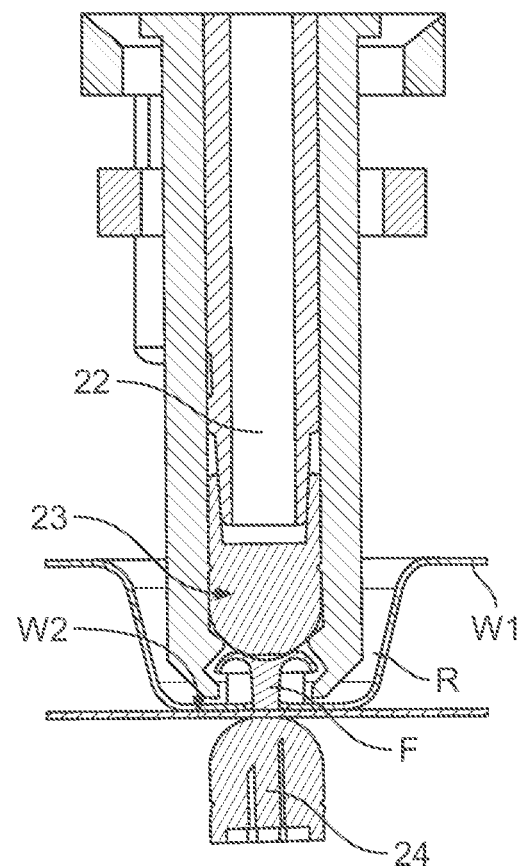
FIG. 25 is a front elevational, cross sectional view of the collet of the feeding apparatus shown in FIG. 24, the collet shown in the third position.

Referring to FIGS. 24 and 25, the upper electrode 22 further travels a distance D2 towards the sheet line of the work piece W1 until the fastener F is trapped between the work piece W1 and the upper electrode 22. If the collet 20 contacts the work piece W1 first, it is pushed back and moved out of the way of the upper electrode 22. This feature allows for the installation of relatively short fasteners. The general design of the feeding apparatus 10 allows for the installation of fasteners within the recess R of the work piece W1, especially when there is no side access to the fastener F due to the walls of the recess R creating an impediment.

Figure 26:
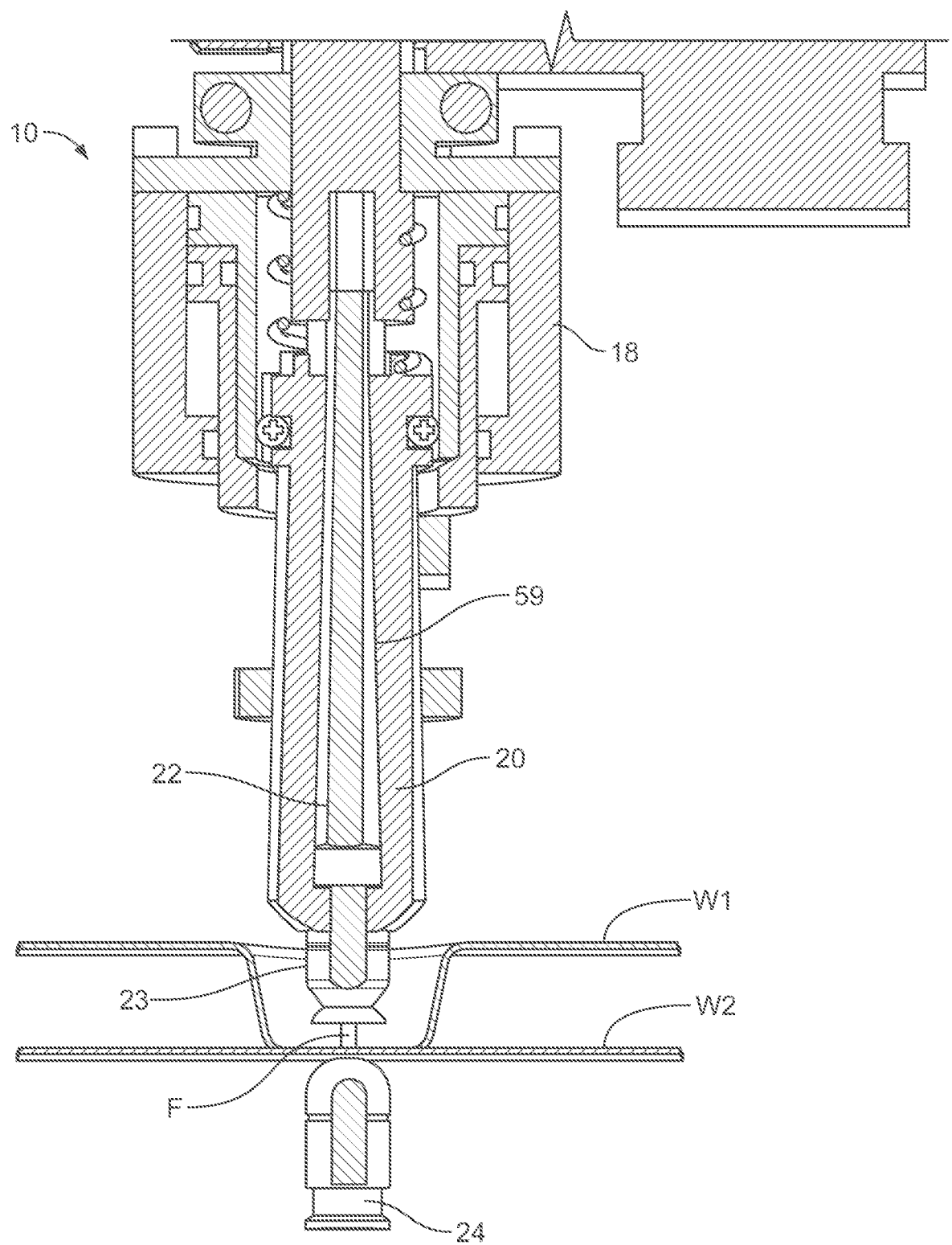
FIG. 26 is a front elevational, cross-sectional view of a portion of the feeding apparatus of FIGS. 18 and 19, the feeding apparatus shown in a fourth position such that the collet is retracted from the fastener.
Figure 27:
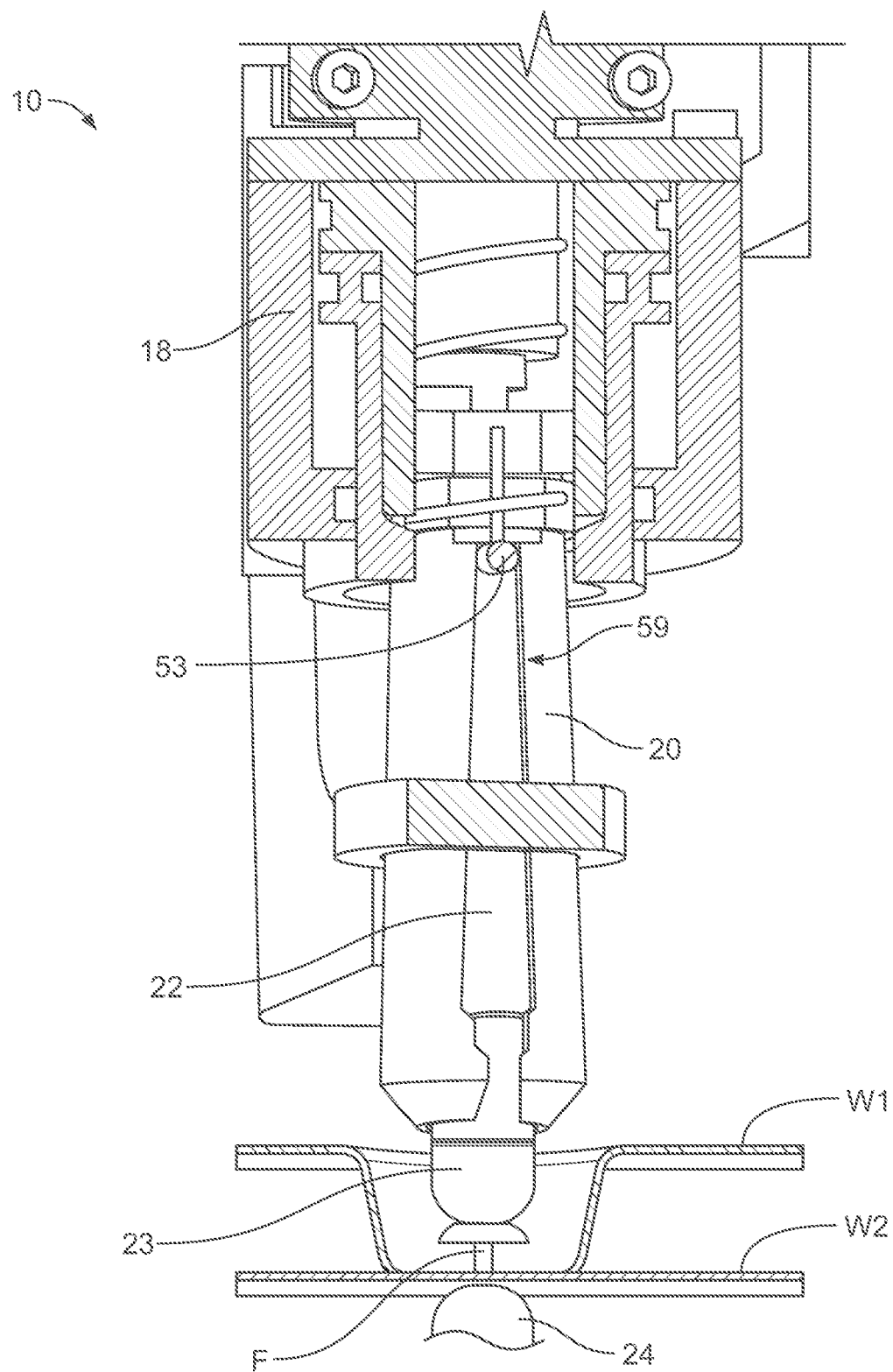
FIGS. 27 and 28 are front elevational, cross sectional close-up views of the collet of the feeding apparatus shown in FIG. 26, the collet shown in the fourth position.
Figure 28:
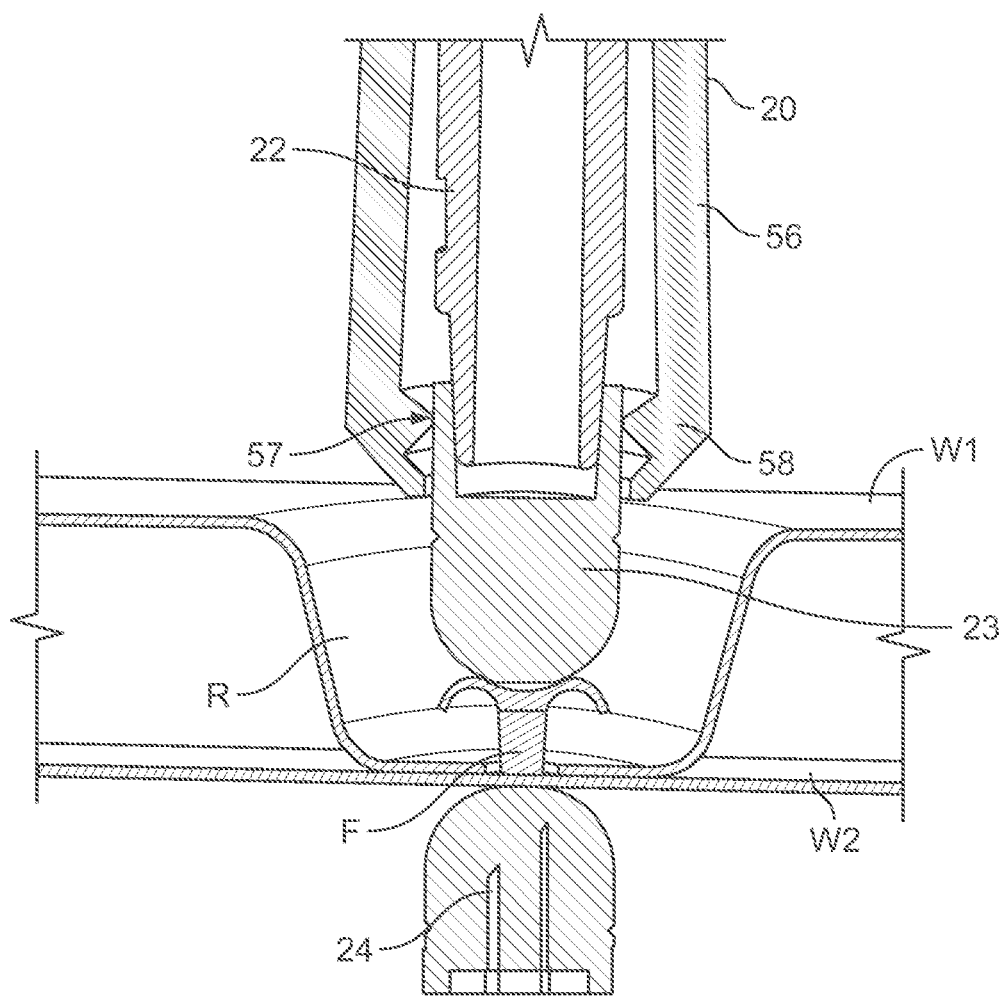

Referring to FIGS. 26 and 27, the actuator 18 is engaged and energized, and the collet 20 is retracted along the axis of the upper electrode 22 away from the work pieces W1, W2, thus exposing an electrode tip 23. In this regard, the pin 53 of the actuator 18 contacts the upper end of the slot 59 of the collet 20, pulling separating the collet fingers 56 and pulling the collet 20 back as the actuator 18 retracts. Retracting the collet 20 behind a "dress line" of the tip 23 of the upper electrode 22 enables the tip 23 to be dressed. The fastener F is then welded to the work pieces W1, W2 via the upper and lower electrodes 22, 24. Referring to FIG. 28, the rounded bumps 57 prevent excess wear on the upper electrode 22. In an embodiment, as the upper electrode 22 is worn and dressed, it is not necessary to adjust the gap to the fastener F. Capturing the fastener F is not dependent upon the position of the upper electrode 22 relative to the fastener F during the welding process.

After a cycle is complete, the upper electrode 22 retracts and the actuator 18 moves the collet 20 back over the tip 23 of the upper electrode 22 and the feeding apparatus 10 moves back to its first, home position. The collet 20 is again aligned with the fastener delivery system 26 and is opened again to allow the entry of the next fastener F.

FIGS. 29 through 45 show another embodiment of a resistance spot rivet welding fastener feeding apparatus 3010 (hereinafter, the "feeding apparatus 3010"). Unless otherwise stated, the embodiments of FIGS. 29 through 45 are constructed and assembled in the same basic manner as the embodiment of FIGS. 18 through 28.

Figure 29:
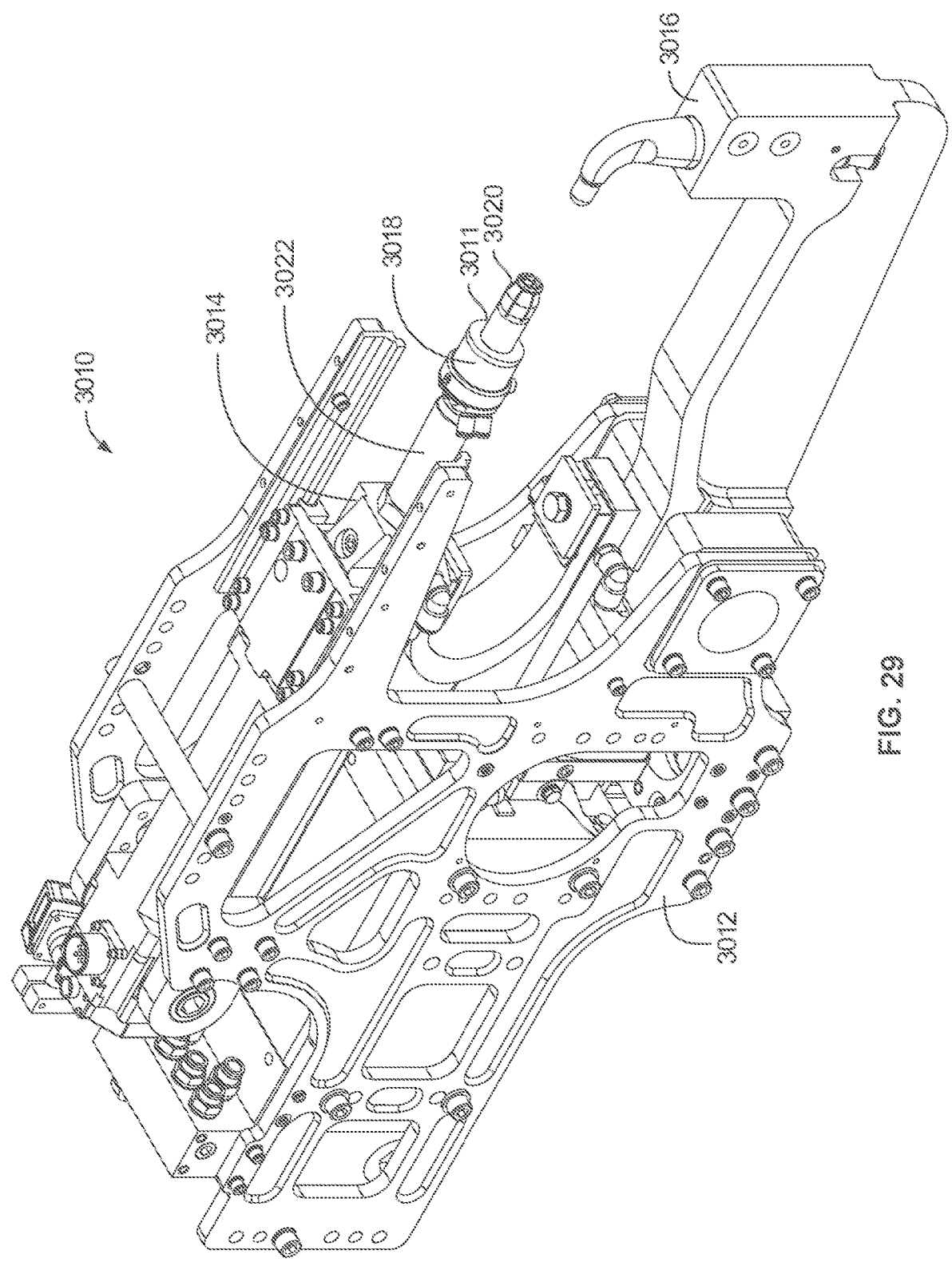
FIG. 29 is a perspective view of a resistance welding fastener feeding apparatus in accordance with another embodiment.
Figure 30:
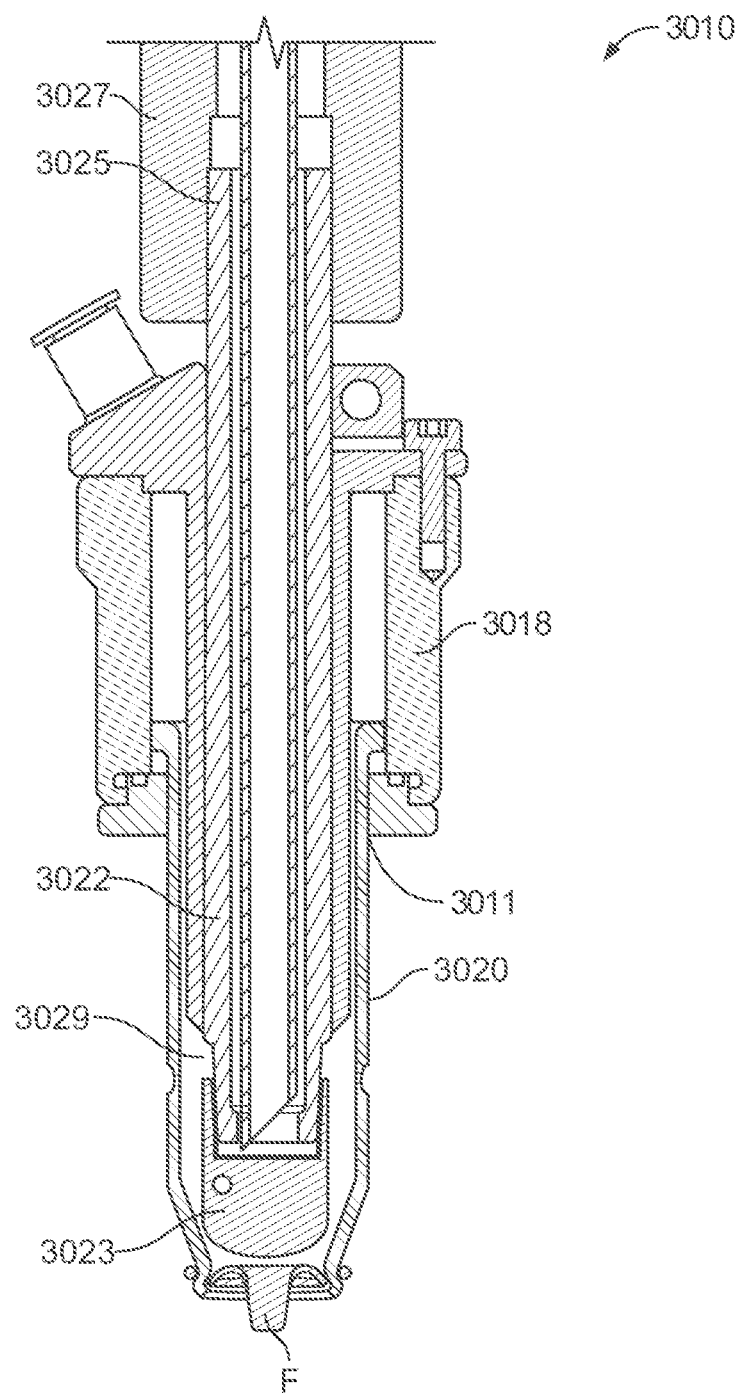
FIG. 30 is a side cross-sectional view of a collet assembly mounted to an electrode of the feeding apparatus shown in FIG. 29.

Referring to FIGS. 29 and 30, in an embodiment, the feeding apparatus 3010 includes a resistance welding weld gun 3012 having an upper welder portion 3014 and a lower welder portion 3016 opposite the upper welder portion 3014. In an embodiment, the upper welder portion 3014 includes an upper electrode holder 3022. Referring to FIG. 30, in an embodiment, the upper electrode holder 3022 includes a shank 3025, one end of which extends from and is mounted removably to an electrode adapter 3027, and an opposite end of which is sized and shaped to receive removably an electrode 3023. In an embodiment, the electrode 3023 has a smooth, radial exterior surface. In an embodiment, the electrode 3023 is a cap.

Still referring to FIGS. 29 and 30, in an embodiment, the upper welder portion 3014 includes a collet assembly 3011 having an actuator 3018 and a collet 3020 mounted to and extending from the actuator 3018. In an embodiment, the actuator 3018 is a pneumatic cylinder body. In another embodiment, the actuator 3018 is an electric solenoid actuator. In an embodiment, the upper electrode holder 3022 is sized, shaped, and adapted to receive movably and slidably the collet 3020 (see FIG. 30). In an embodiment, the collet 3020 surrounds the upper electrode holder 3022 and is movable axially relative to the upper electrode holder 3022. In an embodiment, the collet 3020 is a split collet. In an embodiment, the collet 3020 is adapted to engage a fastener F, such as a rivet, which will be described in further detail below.

Referring to FIGS. 31 through 45, in an embodiment, the actuator 3018 includes a tubular-shaped housing 3036 having an upper end 3038, a lower end 3040 opposite the upper end 3038, a central passage 3042 extending from the upper end 3038 to the lower end 3040, and a flanged portion 3044 located proximate to the upper end 3038. In an embodiment, the flanged portion 3044 includes a cylindrical-shaped chamber 3046 extending transversely therein and is sized and shaped to receive a collet return sensor 3130, to be described in further detail below. In an embodiment, the flanged portion 3044 of the housing 3036 includes a plurality of bores located proximate to the periphery thereof (not shown in the Figures), whose purpose shall be described hereinafter. In an embodiment, a return passage 3050 extends through a sidewall 3052 of the housing 3036 from the upper end 3038 proximate to the lower end 3040 thereof, and includes a bend 3054 that communicates with the central passage 3042 of the housing 3036 proximate to the lower end 3040 thereof (see FIG. 32).

In an embodiment, the actuator 3018 includes a sleeve member 3056 having a circular-shaped cap 3058 and a centrally located, tubular-shaped inner sleeve 3060 extending from a lower surface the cap 3058. In an embodiment, the inner sleeve 3060 includes an inner passage 3062 that is sized and shaped to receive the upper electrode holder 3022. In an embodiment, a free end 3063 of the inner sleeve 3060 includes an annular, beveled surface 3065. An upper surface 3064 of the cap 3058 includes a clamp member 3066 having gripping portions 3068a, 3068b that form a centrally located, circular-shaped aperture 3070, which aligns and is in communication with the inner passage 3062 and is sized and shaped to receive the upper electrode holder 3022 therethrough. The gripping portion 3068a includes a bore 3072a extending transversely therethrough, while the gripping portion 3068b includes a bore 3072b extending partially therein, the bores 3072a, 3072b being sized and shaped to receive a fastener 3074, such as a clamp screw, for clamping removably the collet assembly 3011 to the upper electrode holder 3022. The upper surface 3064 of the cap 3066 further includes a base 3076 that extends outwardly and obliquely therefrom. The base 3076 includes first and second bores 3078, 3080 formed therein. In an embodiment, the bores 3078, 3080 are positioned adjacent to one another. In an embodiment, each of the first and second bores 3078, 3080 include internal threads. In an embodiment, the first bore 3078 is adapted to receive removably an advance port 3082, and the second bore 3080 is adapted to receive removably a return port 3084 (see, for example, FIG. 31). In an embodiment, the cap 3066 includes a plurality of apertures 3086 and a slot 3088, whose purposes and functions shall be described hereinafter.

In an embodiment, the sleeve member 3056 is made of a polymer material. In another embodiment, the sleeve member 3056 is made of a composite material. In another embodiment, the sleeve member 3056 is made of metal. In another embodiment, the sleeve member 3056 is made of a non-magnetic material. In another embodiment, the sleeve member 3056 is coated with a material adapted to repel spatter during the welding process.

In an embodiment, the sleeve member 3056 and the housing 3036 are assembled with one another, such that the inner sleeve 3060 of the sleeve member 3056 is positioned within the central passage 3042 of the housing 3036 and the cap 3058 of the sleeve member 3056 is engaged with the upper end 3038 of the housing 3036. The cap 3058 of the sleeve member 3056 is fastened removably to the upper end 3038 of the housing 3036 by a plurality of fasteners 3090 extending with the corresponding aligned apertures 3086 of the cap 3058 and the bores of the flanged portion 3044 of the housing 3036. In an embodiment, the first bore 3078 and in turn the advance port 3082 is in communication with the central passage 3042 of the housing, while the second bore 3080 and in turn the return port 3084 is in communication with the return passage 3050 of the housing 3042.

Referring to FIGS. 31 through 33, 36 and 37, in an embodiment, the collet 3020 includes a first end 3101 and second end 3103 opposite the first end 3101, a base 3100 at the first end 3101, an elongated shank portion 3102 extending from the base 3100, and a plurality of collet fingers 3104 extending from the shank portion 3102, each of which includes a tapered, gripping portion 3106 proximate to the second end 3103. In an embodiment, the collet fingers 3104 form a conical shape. In another embodiment, the collet fingers 3104 form a flattened side or sides to enable the collet 3020 to be positioned proximate to a flange, wall, or other tight area on such flattened side or sides of the collet fingers 3104 and, in turn, the fasteners F to be installed in such area on a work piece. In an embodiment, the collet 3020 includes six (6) of the collet fingers 3104. In another embodiment, the collet 3020 includes two (2) of the collet fingers 3104. In another embodiment, the collet 3020 includes three (3) of the collet fingers 3104. In another embodiment, the collet 3020 includes four (4) of the collet fingers 3104. In another embodiment, the collet 3020 includes five (5) of the collet fingers 3104. In another embodiment, the collet 3020 includes more than six (6) of the collet fingers 3104. In an embodiment, the collet fingers 3104 are spaced equally from one another. In another embodiment, at least one gap is formed between two of the collet fingers 3104 to enable the collet 3020 to be positioned proximate to a flange, wall, or other tight area on such gapped side of the collet fingers 3104 and, in turn, the fasteners F to be installed in such area on a work piece. In an embodiment, the base 3100 includes an outside diameter that is greater than an outside diameter of the shank portion 3102.

In an embodiment, a sensor ring 3111 is installed on the shank portion 3102 and below and juxtaposed with the base 3100 of the collet 3020. In an embodiment, the sensor ring 3111 is made of metal. In an embodiment, the sensor ring 3111 is a ferrous ring. In an embodiment, an internal passage 3105 extends from the first end 3101 to the second end 3103 of the collet 3020.

In an embodiment, each of the gripping portions 3106 of the collet fingers 3104 of the collet 3020 includes an internal bump 3108. In an embodiment, each of the internal bumps 3108 is rounded in shape. In an embodiment, each of the gripping portions 3106 includes a first internal gripping segment 3110 that extends obliquely and outwardly relative to a longitudinal axis A-A of the collet 3020, and a second internal gripping segment 3112 that extends obliquely and inwardly relative to the longitudinal axis A-A of the collet 3020, forming the free, second end 3103 of the collet 3020. In an embodiment, the gripping segments 3112 are tapered at ends thereof to facilitate the entry of the fastener F into the collet 3020. In an embodiment, the segments 3110, 3112 of gripping portions 3106 of the collet 3020 matches and accommodates the geometry of the fastener F, such as the head of a rivet. In an embodiment, the tapered ends of the gripping segments 3112 coincide with a rounded head of the rivet so that the collet fingers 3104 expand outwardly as the rivet is driven into the opening thereof. In an embodiment, an elongated slot 3114 is formed axially between a corresponding adjacent pair of the collet fingers 3104. In an embodiment, the fingers 3104 form an external groove 3116 that is sized and shaped to receive a ring 3118. In an embodiment, the ring 3118 is an O-ring. In another embodiment, the ring 3118 is a metal spring. In an embodiment, the ring 3118 provides inward, radial force against the collet fingers 3104 to maintain them in a closed position when required during the welding cycle.

In an embodiment, the collet 3020 is made of a polymer material. In another embodiment, the collet 3020 is made of a composite material. In another embodiment, the collet 3020 is made of metal. In another embodiment, the collet 3020 is made of spring steel. In another embodiment, the collet 3020 is made of a non-magnetic material. In an embodiment, the collet 3020 is made of stainless steel. In another embodiment, the collet 3020 is made of made of aluminum bronze. In another embodiment, the collet 3020 is made of a ceramic material. In another embodiment, the collet 3020 is coated with a protective material. In an embodiment, the protective coating material prevents welding spatter, from a welding process by either the weld gun 3012 or a neighboring weld gun, from sticking to the collet 3020.

In an embodiment, the collet 3020 is assembled with the actuator 3018 such that the base 3100 and a portion of the shank portion 3102 of the collet 3020 is positioned within the central passage 3042 of the actuator 3018, and the inner sleeve 3060 is positioned within the internal passage 3105 of the collet 3020. An end cap 3120 is installed removably on the housing 3036 at the lower end 3040 thereof, thereby securing the collet 3020 to the actuator 3018. In an embodiment, the end cap 3120 is attached to the housing 3036 by a cam lock mechanism. In another embodiment, the end cap 3120 is attached threadedly to the housing 3036. In another embodiment, the end cap 3120 includes knurling, flats, notches, pins or other means to facilitate the installation and removal of the cap 3120, either manually, by a hand tool, or automatic actuation.

Figure 31:
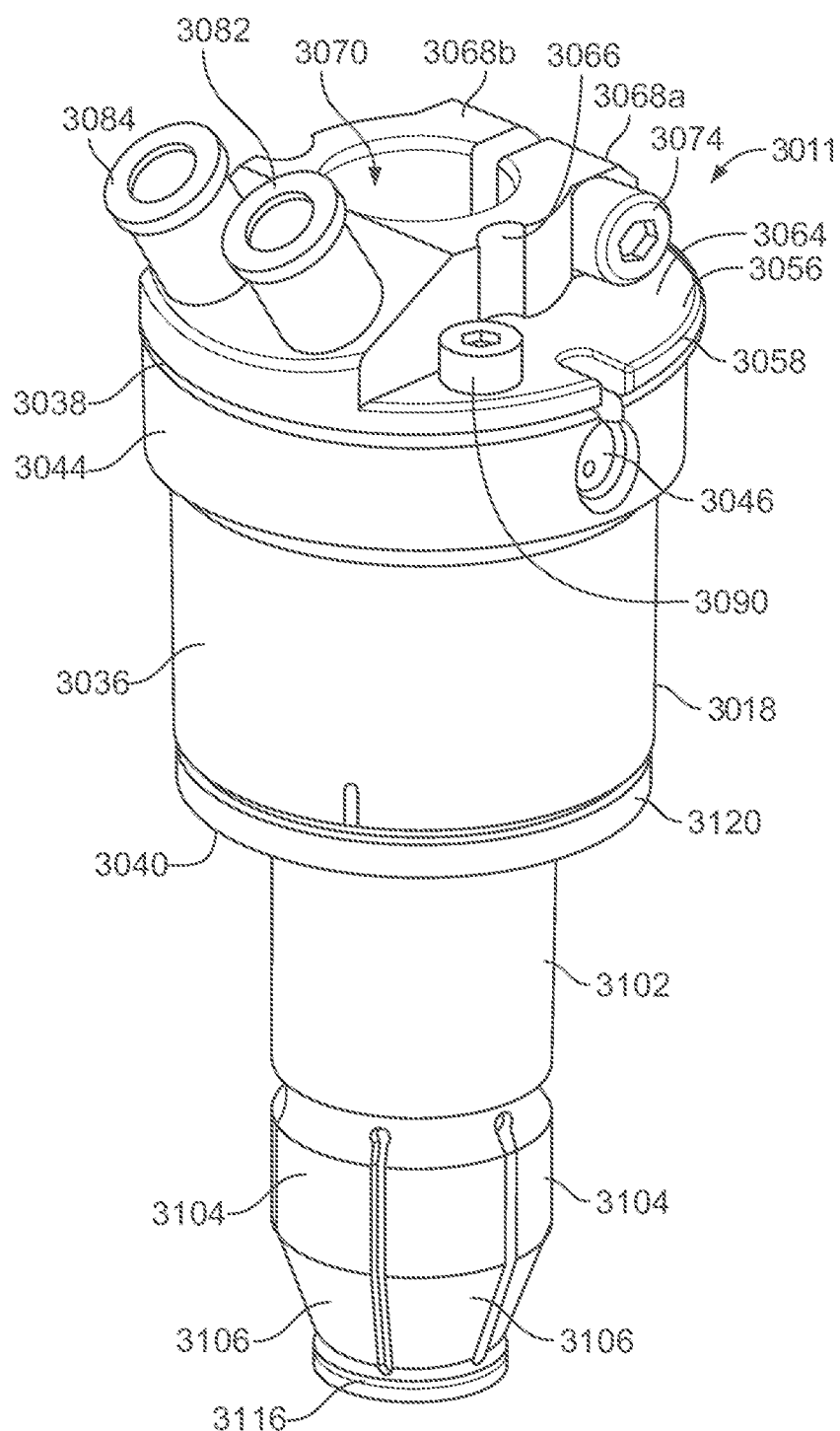
FIG. 31 is a top perspective view of the collet assembly shown in FIG. 31.
Figure 32:
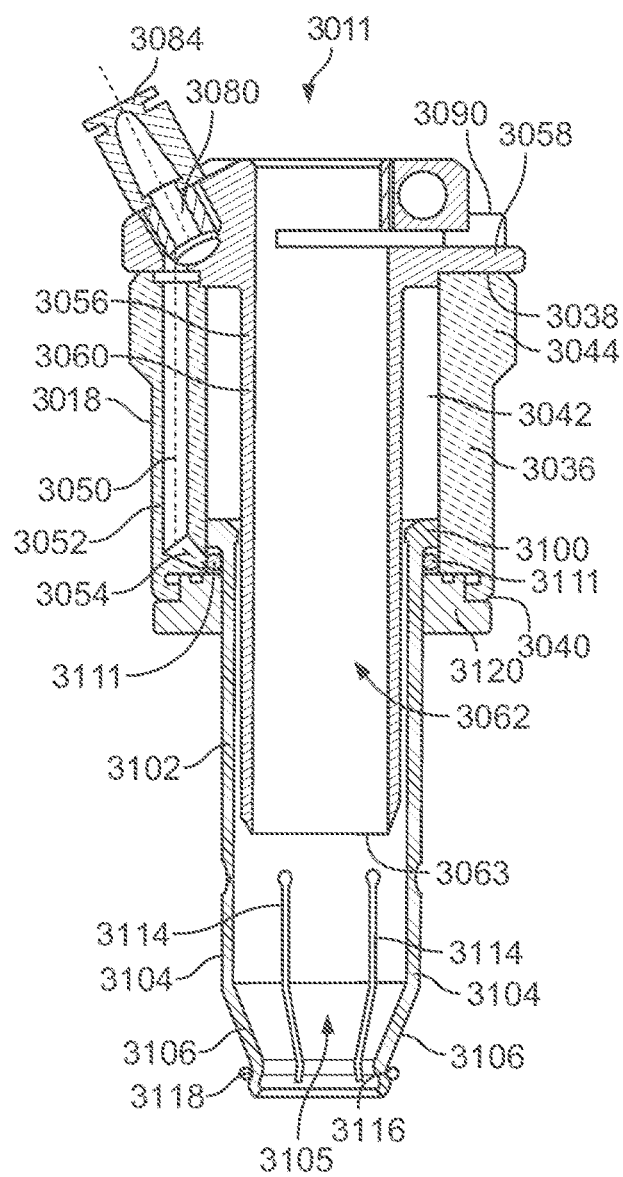
FIGS. 32 and 33 are side cross-sectional views of the collet assembly shown in FIG. 31.
Figure 33:
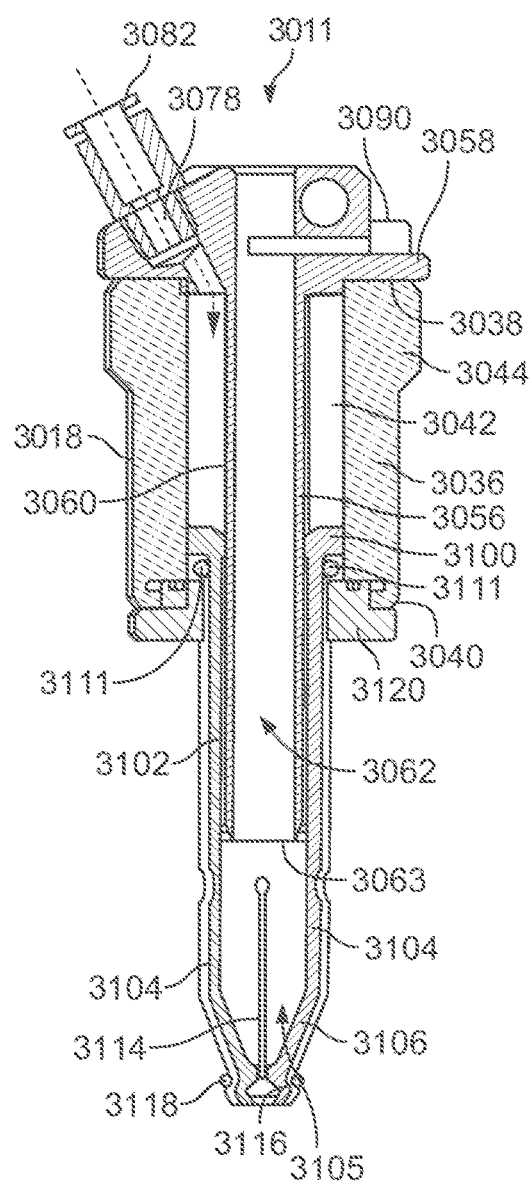
Figure 35:
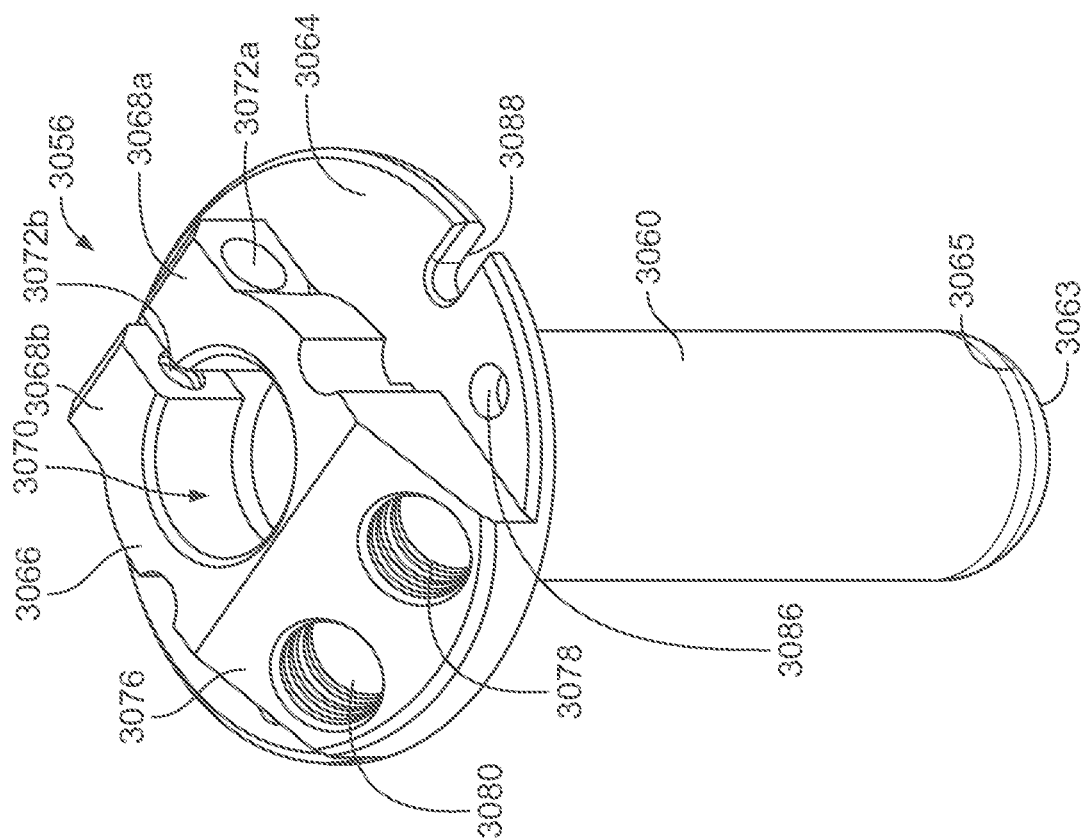
FIG. 35 is a close-up perspective view of a portion of the sleeve shown in FIG. 34.
Figure 34:
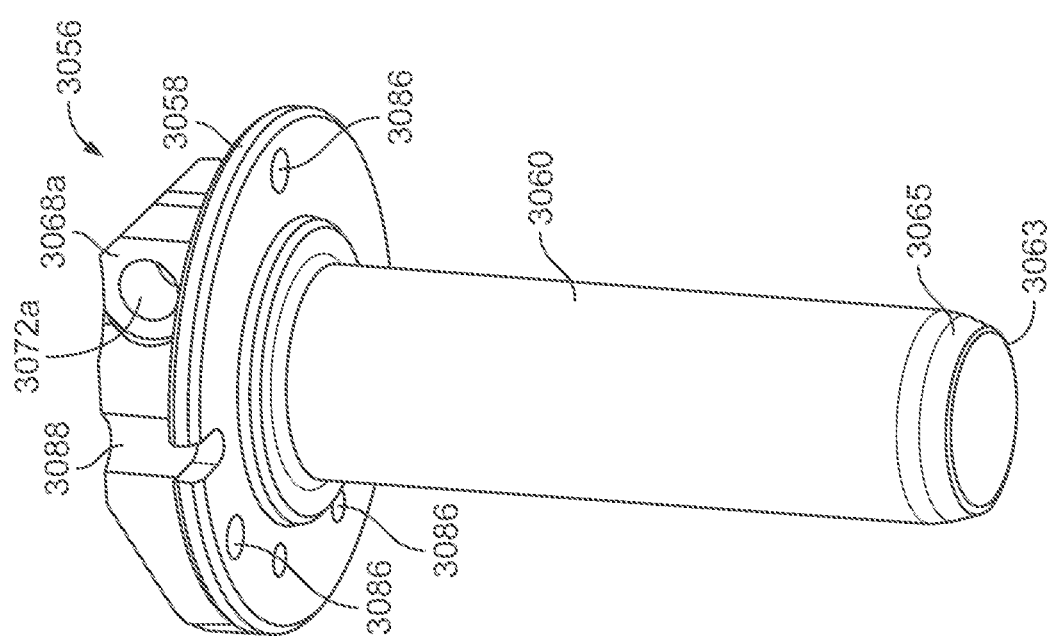
FIG. 34 is a bottom perspective view of a sleeve employed by the collet assembly shown in FIG. 31.
Figure 38:
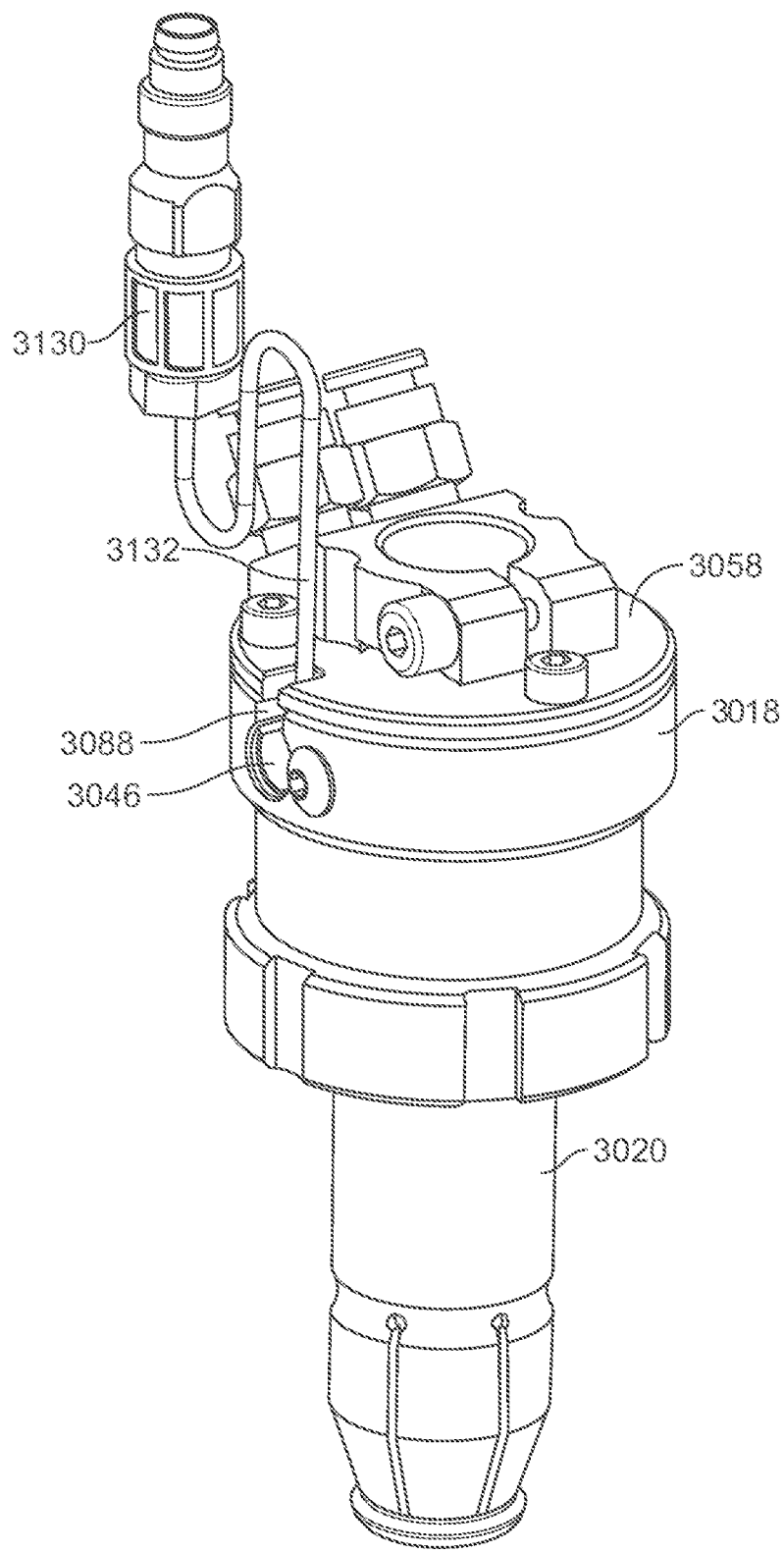
FIG. 38 is a top perspective view of the collet assembly shown in FIG. 31 but including a sensor.
Figure 39:
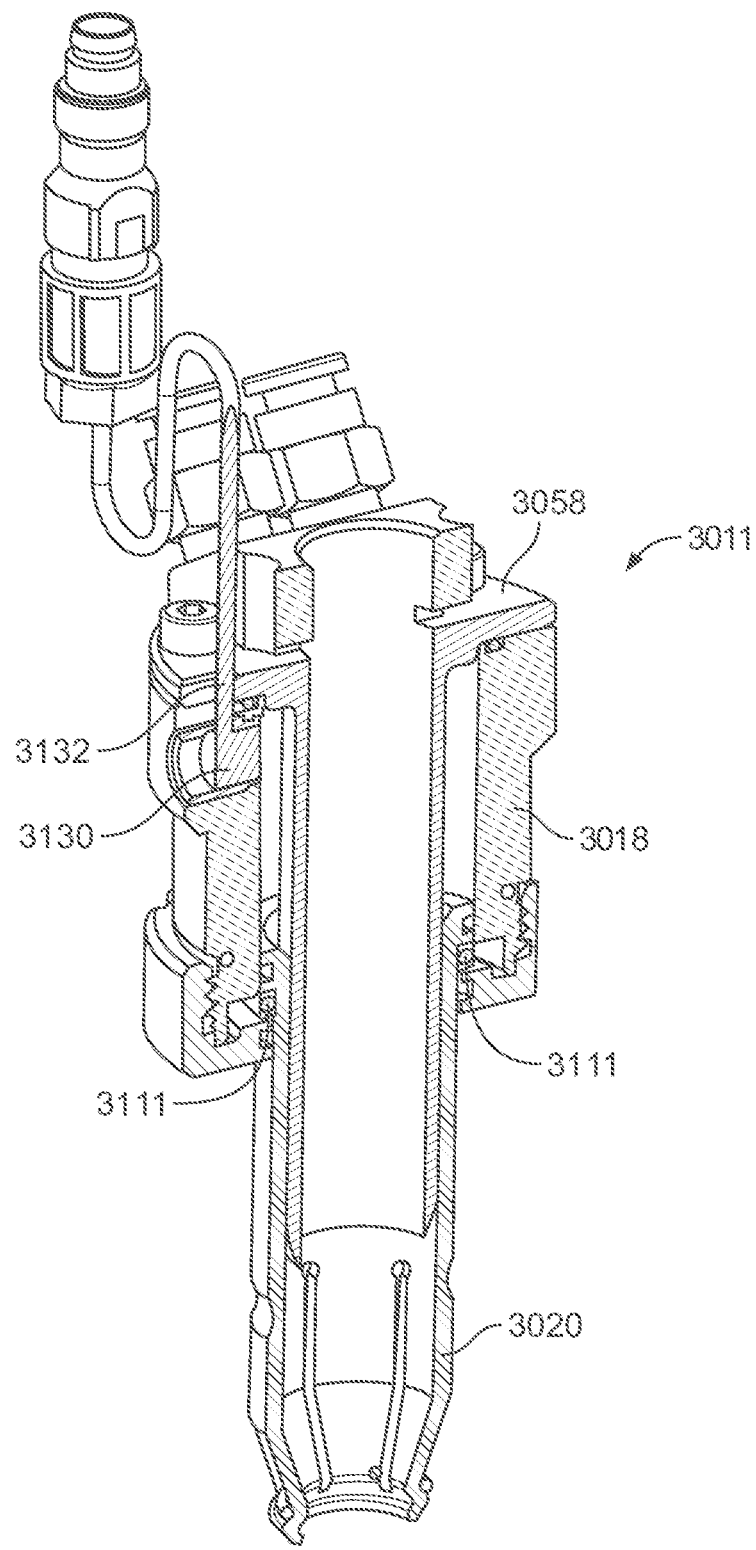
FIGS. 39 and 40 are sectional views of the collet assembly shown in FIG. 38, with the collet assembly in an advanced position.
Figure 40:
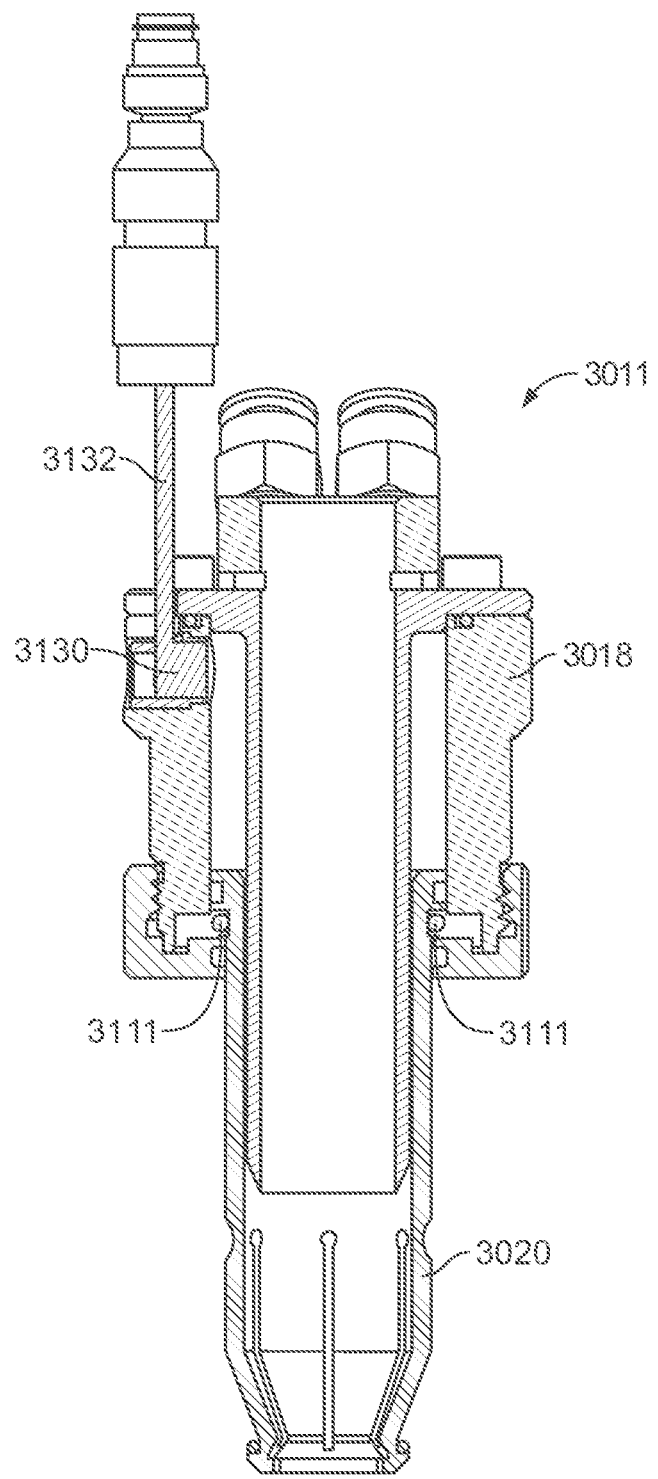
Figure 41:
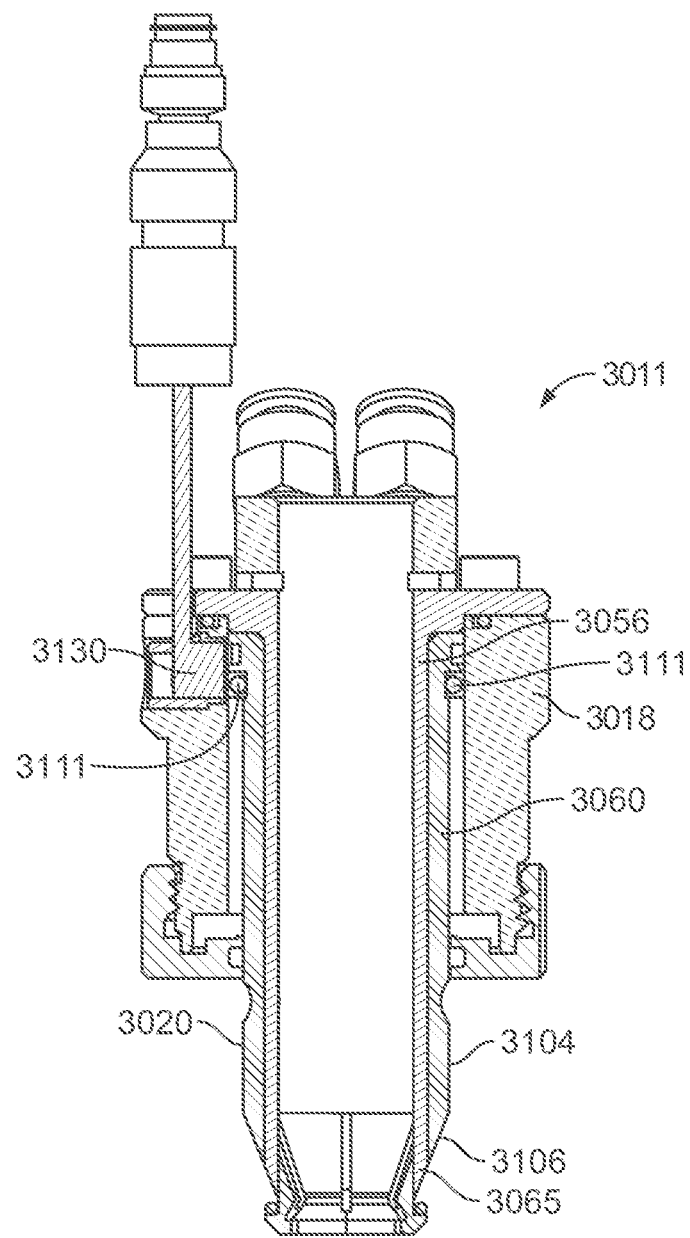
FIG. 41 is a close-up view of a portion of the collet assembly shown in FIG. 40, but with the collet assembly in retracted position.

Referring to FIGS. 38 through 41, in an embodiment, the chamber 3046 of the actuator 3018 (which is also shown in FIG. 31) is adapted to receive the sensor 3130. An electrical wire 3132 of the sensor 3130 is enabled to pass through the slot 3088 of the cap 3058. In an embodiment, the sensor 3130 senses when the sensor ring 3111 of the collet 3020 is not aligned with the sensor 3130 when the collet 3020 is in an advanced position, as shown in FIG. 40, and when the sensor ring 3111 is aligned with the sensor 3130 when the collet 3020 is in a fully retracted position, as shown in FIG. 41. In an embodiment, the sensor 3130 and the chamber 3046 are positioned such that it is not exposed to air pressure and, therefore, no corresponding leakage of air pressure occurs therein. In another embodiment, the sensor ring 3111 is positioned on the collet 3020 such that it is not wiped by any seals of the collet assembly 3111, thereby inhibiting wear thereon.

Referring to FIG. 42, the collet 3020 is in a fully advanced position using pneumatic air pressure in the advance port 3082 of the actuator 3018 and a rivet RV is presented to the feed apparatus 3010 from an upstream transfer system positioned below the collet 3020 (not shown in FIG. 42). In an embodiment, the rivet RV includes a rivet head H and a stem S. The rivet RV is aligned axially therein with the collet 3020 and pressed axially by the transfer system into the gripping portions 3106 of the collet fingers 3104 thereof. The collet fingers 3104 are deflected outwardly as the rivet head H is pressed into the collet 3020. As shown in FIG. 43, the rivet head H snaps into the collet 3020, is aligned coaxially, and is secured against the first and second internal gripping segments 3110, 3112 of the gripping portions 3106 of the collet fingers 3104. As indicated above, in an embodiment, the tapered ends of the gripping segments 3112 coincide with a rounded rivet head H of the rivet RV so that the collet fingers 3104 expand outwardly as the rivet RV is driven into the opening thereof. The ring 3118 provides additional radial force against the collet fingers 3104 to assist in maintaining the collet's 3020 grip on the rivet RV. In an embodiment, the collet 3020 is adapted to grip rivet heads having various diameters. In an embodiment, the collet 3020 is adapted to grip the rivets RV when the stem S is facing upwardly, such as, for example, a rivet having a threaded stem. In this regard, the electrode 123 is sized and shaped to conform to the geometry of a rivet RV having a threaded stem S (for instance, to provide a donut-shaped or multiple projection welds). In an embodiment, after the rivet RV is loaded into the collet 3020, the rivet transfer system indexes away from the collet 3020. In an embodiment, the rivet transfer system indexing may occur simultaneously as the robotic movements between weld joints, in order to keep the rivet loading process time buried within robot move time to have minimal or no impact on the joint-to-joint cycle time. In an embodiment, the rivets RV are not only held against gravity, but against all forces that are associated with robotic motions and inertia of the welder.

Figure 44:
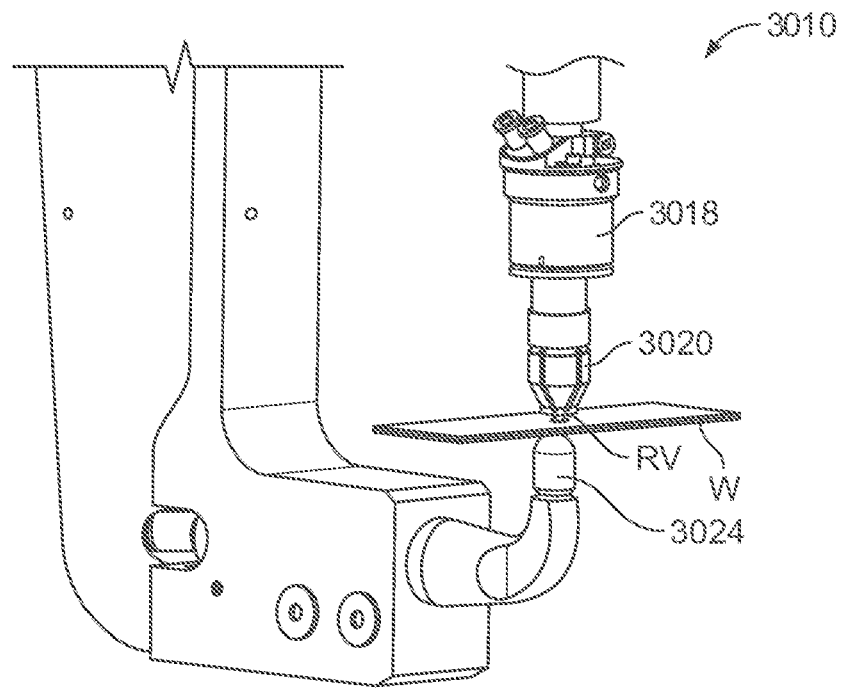
FIGS. 44 and 45 are perspective views of a portion of the feed apparatus shown in FIG. 29, and further showing steps of the feed apparatus welding a rivet to a workpiece, the collet being shown in an advanced position and a retracted position, respectively.

Referring to FIG. 44, the feed apparatus 3010 advances the rivet RV to a joint location on a work piece W, and the rivet H is ready for welding thereto by the upper electrode holder 3022 and a lower electrode 3024. Once again, in an embodiment, this motion can be in time parallel with movements of the robot weld gun. At this position, both the advance port 3082 and the return port 3084 of the actuator 3018 are placed into an exhaust state where the advance pneumatic air is released, thereby enabling the collet 3020 to "float" or move unrestricted within the actuator 3018 and relative to the inner sleeve 3060. This also enables the upper electrode holder 3022 to clamp against the rivet RV. In an embodiment, the collet 3020 does not include dynamic seals in order to minimize friction drag during actuation and preventing the rivet RV from popping out through the back of the collet fingers 3104. In another embodiment, the collet 3020 includes low breakaway friction seals.

Figure 45:
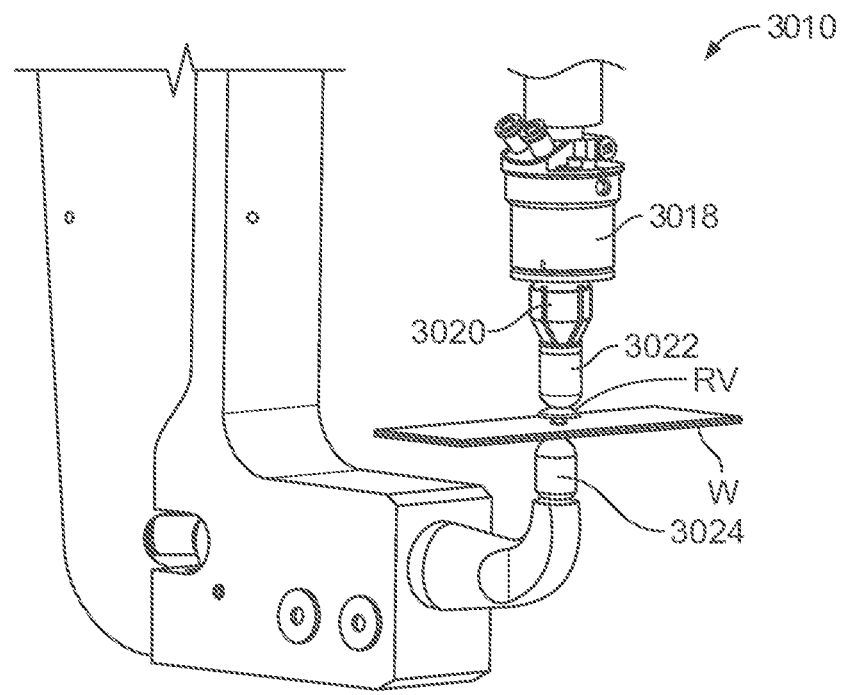

Referring to FIG. 45, when the rivet RV contacts the work piece W, the force on the rivet pushes to collet 3020 which slides axially into the housing 3036 until the rivet RV is pinched between the electrode 3023 and the work piece W. In an embodiment, the structure and features of the collet 120 as described herein enable it to automatically compensate for reduced height of the electrode 123 after electrode tip dressing. At this point, the rivet R is held by the against the work piece W, and the collet 3020 is retracted by pneumatic pressure on the return port 3084 in order to retract the collet 3020 from the rivet R and away from the work piece W and expose the electrode 3023. The retracting action of the collet 3020 strips the collet fingers 3104 from the outer edge of the head H of the rivet R. In this regard, the interior surfaces of the gripping portions 3106 of the collet fingers 3104 rides along the radial, exterior surface of the electrode 3023 and subsequently along the beveled surface 3065 of the inner sleeve 3060 of the sleeve member 3056 (see FIG. 41). It is noted that, in some embodiments, the upper electrode holder 3022 may include a lock taper portion for connecting the electrode 3023 (see FIGS. 42 and 43) thus creating an annular gap or notch 3029 between the electrode shank 3025 and the electrode 3023. When the collet fingers 3104 ride along the beveled surface 3065 of the inner sleeve 3060, the inner sleeve 3060 prevents the collet fingers 3104 from engaging and jamming within the notch 3029. Moreover, the inner sleeve 3060 fills a portion of the gap between the exterior surface of the electrode shank 3025 and the interior surface of the collet 3020, thereby enabling for smoother movement of the collet 3020 when it is retracted. When the collet 3020 is fully retracted, it is positioned within a safe region, such that the collet 3020 is positioned at a sufficient distance from the welding process of the rivet R to the work piece W, such that sparks, debris, expulsion, fumes and heat will not damage the collet 3020. In this regard, the sensor ring 3111 is aligned with the sensor 3130 when the collet 3020 is in its fully retracted position. Having an indication that the collet 3020 is in its fully retracted position is important during the welding process and during maintenance of the electrodes, such as electrode 3023 replacement and dressing, in order to prevent damage to the collet 3020 or electrode cap maintenance equipment.

Welding of the rivet RV is performed and when the weld schedule sequence is complete, the weld gun actuator retracts to return the upper electrode holder 3022 to the open position, and the collet 3020 is advanced forward by applying pneumatic air to the advance port 3082 of the actuator 3018 in preparation of the next rivet transfer cycle.

In an embodiment, the feeding apparatus 3010 may be used on existing resistance spot welding guns fitted onto robotic automation, along with a system of integrated auxiliary components for the handling, sorting and orientation, feeding, and presentation of the rivet RV to the resistance welding gun. In an embodiment, the feeding apparatus 3010 may also be applied to pedestal (i.e., stationary) resistance welding equipment in which the parts are robotically or manually fed into a station. In an embodiment, the collet 3020 is adapted to be fed rivets R automatically. In another embodiment, the collet 3020 is adapted to be fed rivets R manually. In an embodiment, the collet 3020 may be cleared and retracted manually or by automatic control in the event a misfeed of a rivet R occurs. In an embodiment, the collet 3020 may be sized and shaped to accommodate electrode diameters ranging from 12 mm to over 25 mm. In an embodiment, the collet 3020 may be sized and shaped to accommodate rivet diameters in a range from 10 mm to over 25 mm. In an embodiment, mechanically gripping of the rivet RV by the collet 3020 is agnostic of rivet material. In another embodiment, the feed apparatus 3010 may be used to retract the collet 3020 and expose the electrode holder 3022 to perform a conventional resistance spot weld without a rivet RV.

In an embodiment, the rivet RV is loaded into the collet 3020 via an upstream transfer system. In other embodiments, the rivet RV may be loaded into the collet 3020 while the feed apparatus 3010 is in any orientation. In other embodiments, the rivet RV may be loaded into the collet 3020 while the feed apparatus 3010 is moving at a rate of acceleration.

It is further noted that during electrode dressing operations, the upper and lower electrodes 3023, 3024 may lose a length of material, such as, for example, 2 mm to 6 mm worth of material such as copper. As a result, there will be an increasing gap distance from the electrode face to the rivet feed location of the collet 3020. The collet 3020 may be equalized to the electrode face during the welding gun close step to provide contact with the electrode, maintain axial alignment, and a low resistance interface for maximizing weld quality while minimizing electrode erosion. Accordingly, the collet 3020 position is independent of the electrode 3023 length and the fact that the electrode 3023 is not part of the rivet positioning or holding, the rivet RV is securely held in place regardless of the state of the electrode cap maintenance cycle. This is because the distance between the end of the dressed electrode 3023 and contact to the rivet RV increases through the dressing cycle, but the weld gun actuator takes up this additional travel distance.

In an embodiment, the collet 3020 may be retracted into the actuator 3018 during electrode 3023 maintenance intervals. This may be performed by applying pneumatic air into the return port 3084. This state is the same states as described above during the rivet welding operation. When the collet 3020 is retracted, the electrode 3023 is exposed and sufficient clearance is provided so that the electrode 3023 can be placed into a cap dressing machine. Also in this state, the electrode 3023 be presented to a welding cap extractor/replacement machine. The foregoing is possible by way of the collet fingers' 3104 compliance with a relatively larger diameter of the upper electrode holder 3022 to allow the fingers 3104 to stretch over it.

In another embodiment, the feeding apparatus 3010 is adapted to provide a burst of compressed air down and out through the collet 3020 for the purpose of blowing away any soot or deflect any flying spatter away from the slots 3114 of the collet 3020, in order to keep in interior of the collet 3020 clean and reduce any buildup of foreign particles and, in turn, reduce maintenance issues. In an embodiment, the collet 3020 may be removed and replaced by removing the end cap 3120 from the housing 3036. The collet 3020 may be removed and replaced with light axial force.

Figure 46:
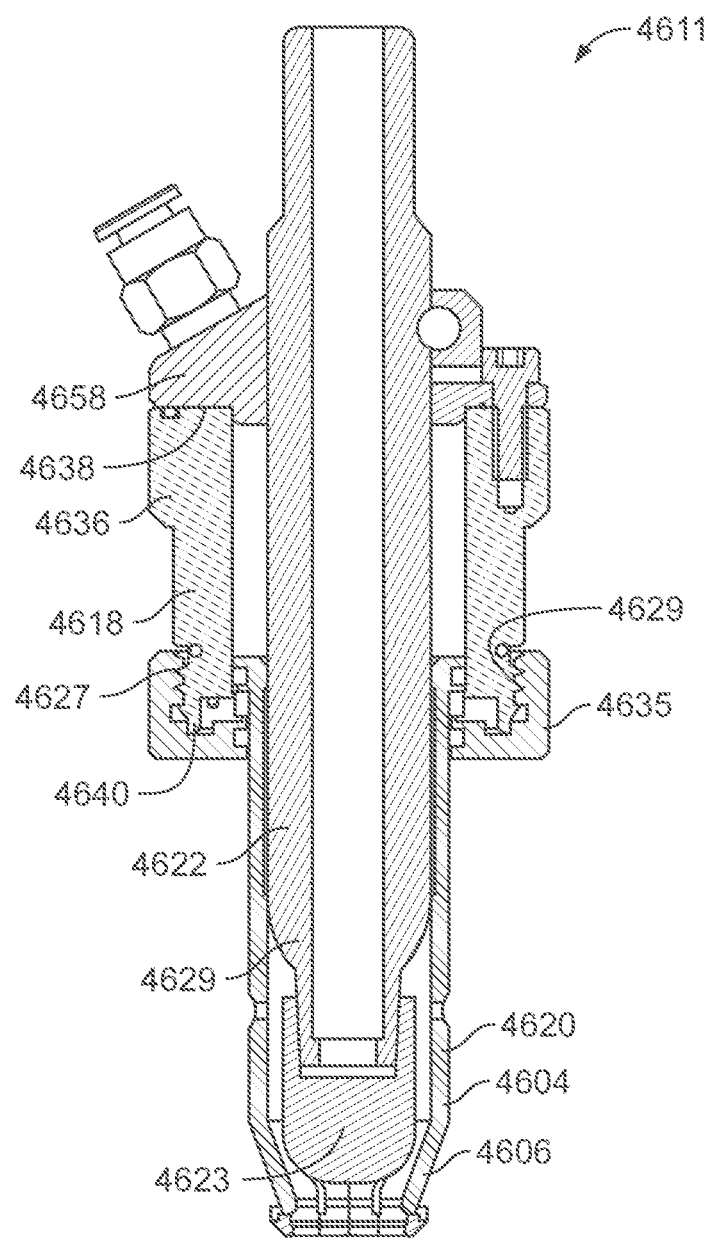
FIG. 46 is a side cross-sectional view of another embodiment of a collet assembly mounted to an electrode.

FIG. 46 shows another embodiment of a collet assembly 4611 including an actuator 4618 and a collet 4620. The collet assembly 4611 is structured and functions in a manner similar to those of the collet assembly 3011, except that there is no sleeve member having an elongated sleeve. In an embodiment, the actuator 4618 includes a housing 4636 having an upper end 4638, a lower end 4640, an upper cap 4658 secured removably to the upper end 4638, and an end cap 4635 secured removably to the lower end 4640. In an embodiment, the end cap 4635 has internal threads 4627 and the housing 4636 has external threads 4629 proximate to the lower end 4640 which mate threadedly the internal threads 4627 of the end cap 4635. In an embodiment, an upper electrode 4622 includes a shank 4625 having a rounded end portion 4629. In an embodiment, the interior surfaces of gripping portions 4606 of collet fingers 4604 rides along the radial, exterior surface of the electrode cap 4623 and subsequently along the rounded end portion 4629 of the upper electrode 4622 when the collet is retracted.

Figure 47A:
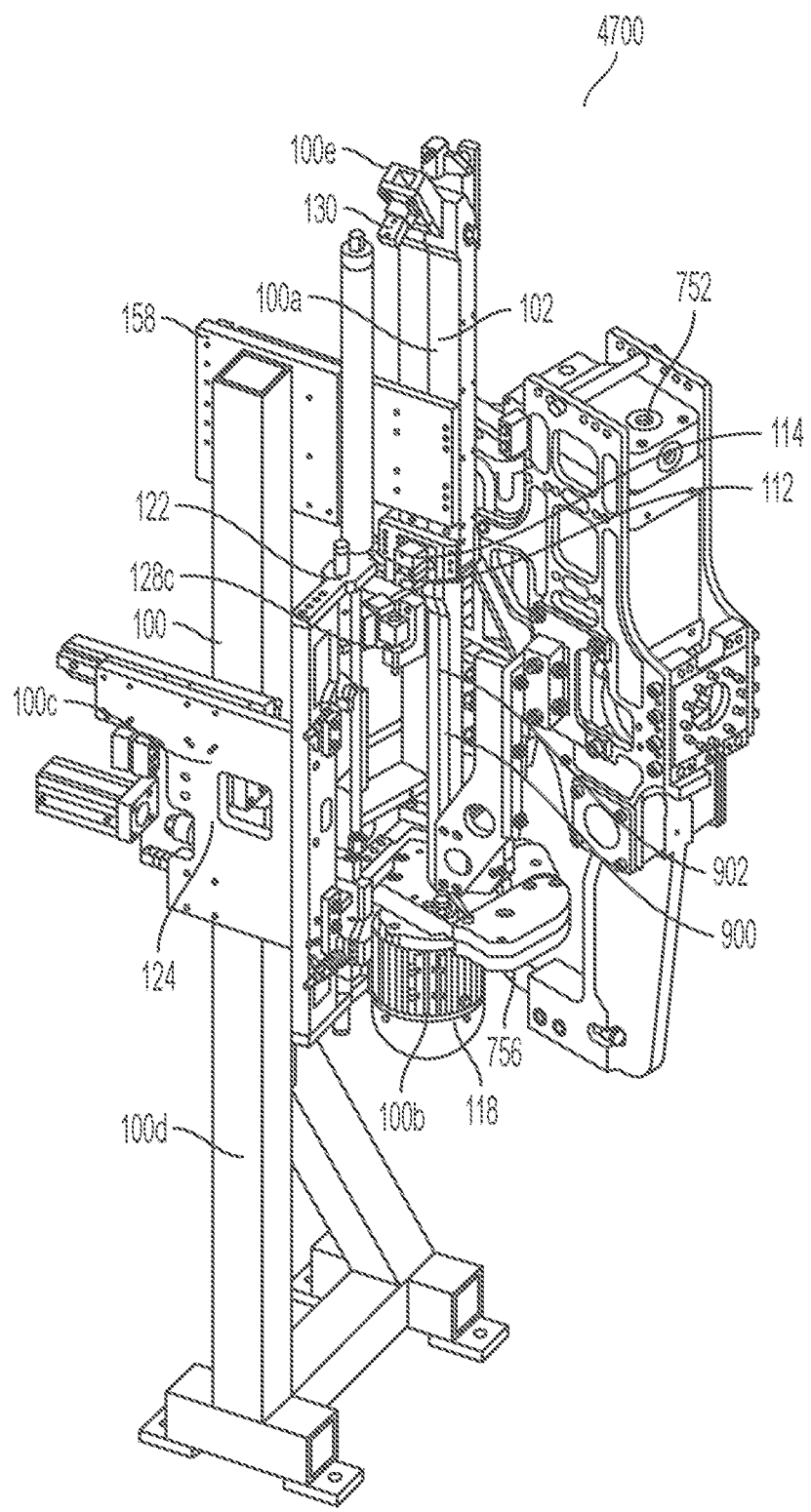
FIG. 47A is a perspective view of a non-limiting embodiment of a system comprising the rivet dispenser reloading system, a rivet dispensing system, and a rivet holder according to the present disclosure.
Figure 47B:
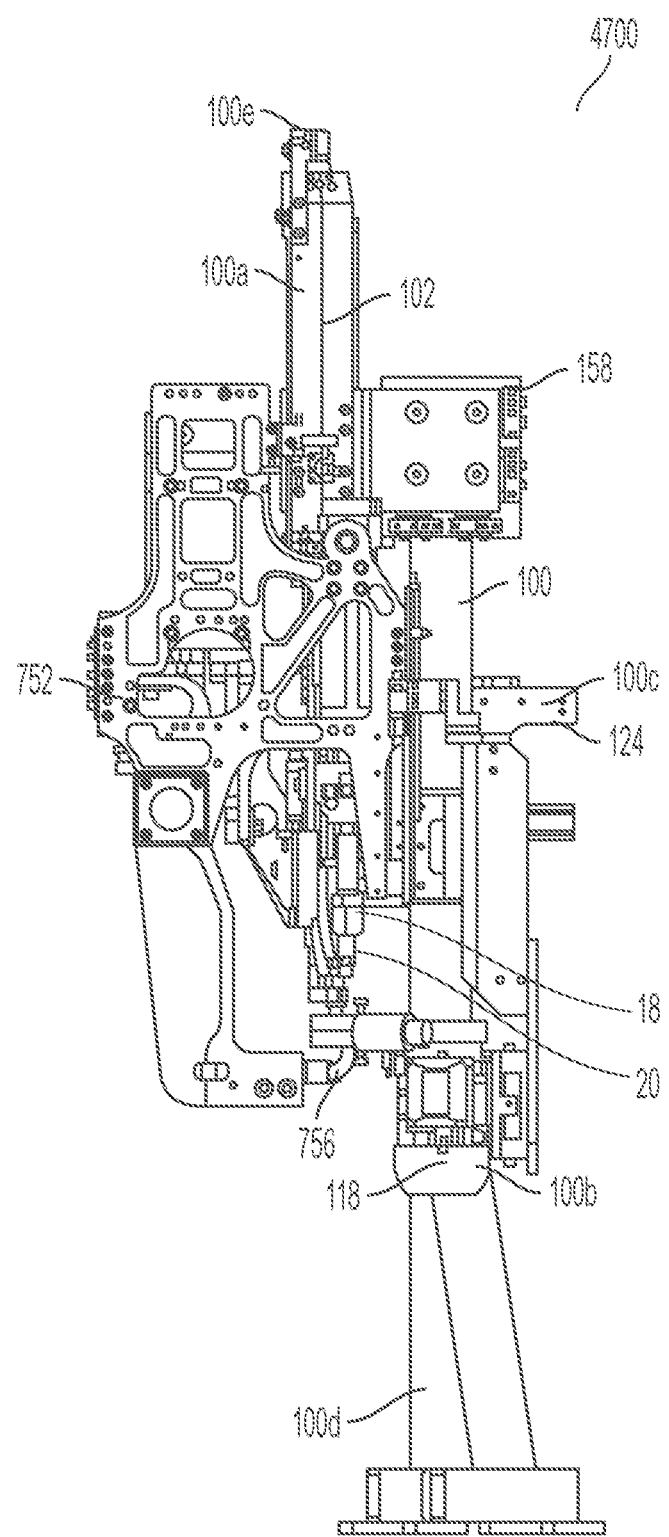
FIG. 47B is a right-side elevational view of the system as shown in FIG. 47A.

As shown in FIGS. 47A-B, a resistance spot rivet welding system 4700 is provided. The system can comprise a rivet dispenser reloading system according to the present disclosure, such as, for example, the rivet dispenser reloading system 100, a rivet dispensing system according to the present disclosure, such as, for example, the rivet dispensing system 900 or rivet dispensing system 1500 and a rivet holder according to the present disclosure, such as, for example, collet 20, collet assembly 3011 including collet 3020, or collet assembly 4611 including collet 4620. In various embodiments, the resistance spot rivet welding system 4700 can comprise the rivet dispensing system as shown in FIGS. 13A-F.

Figure 48:
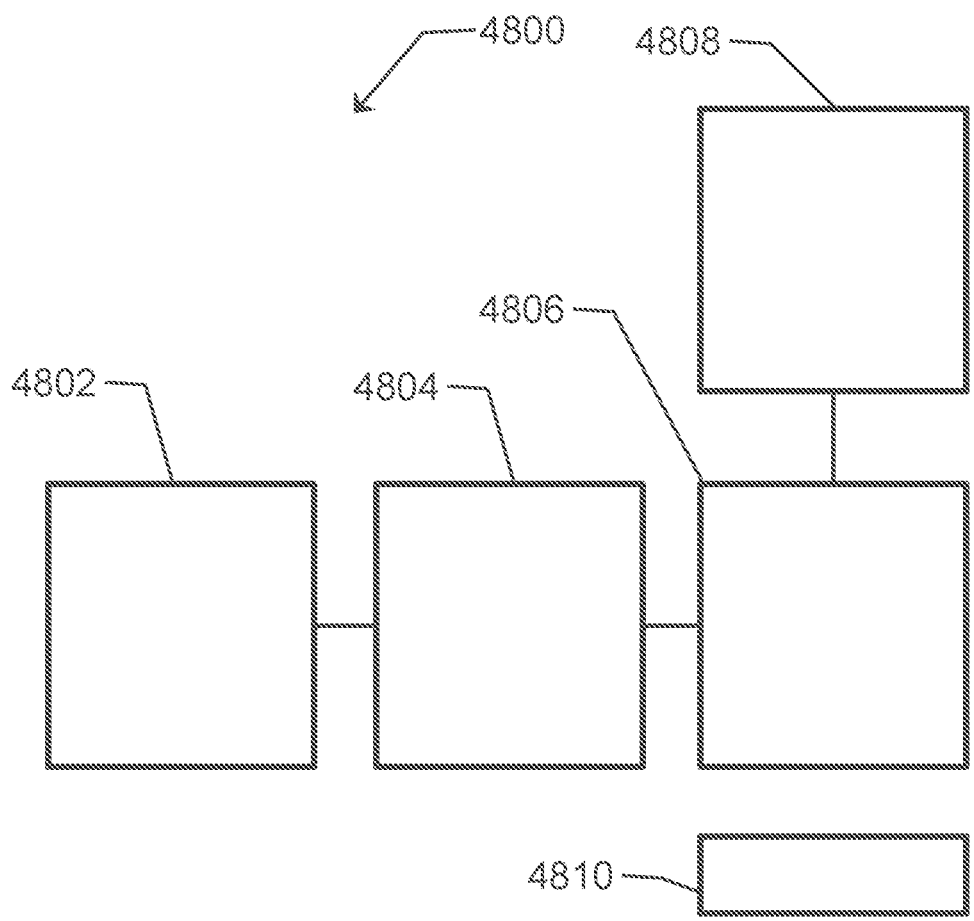
FIG. 48 is a schematic view of a non-limiting embodiment of a system comprising a rivet dispenser reloading system, a rivet dispensing system, and a rivet holder according to the present disclosure.

As shown in FIG. 48, a schematic diagram of an embodiment of a resistance spot rivet welding system 4800 according to the present disclosure is provided. The system 4800 can comprise: a rivet dispenser reloading system 4802 according to the present disclosure, such as, for example, the rivet dispenser reloading system 100; a rivet dispensing system 4804 according to the present disclosure, such as, for example, the rivet dispensing system 900 or the rivet dispensing system 1500 according to the present disclosure; and a rivet holder 4806 according to the present disclosure, such as, for example, collet 20, collet assembly 3011 including collet 3020, or collet assembly 4611 including collet 4620. In various embodiments, the resistance spot rivet welding system 4800 can comprise the rivet dispensing system as shown in FIGS. 13A-F.

The rivet dispenser reloading system 4802 can receive a plurality of rivets in a series arrangement and in a preselected orientation. The rivet dispenser reloading system 4802 can align with the rivet dispensing system 4804 and introduce the plurality of rivets into the rivet dispensing system 4804 in series and in the preselected orientation. The rivet dispensing system 4804 can dispense a rivet onto the rivet holder 4806. The rivet holder 4806 can receive the rivet from the rivet dispensing system 4804 and can provide the rivet to an electrode of a welding gun 4808. The welding gun 4808 can attach the rivet received in the rivet holder 4806 to a structure 4810.

The present disclosure also provides a method for reloading rivets into a rivet dispensing system of a resistance spot rivet welding apparatus. According to the method, a plurality of rivets can be received and stored within a channel of a rivet receiving member of a rivet dispenser reloading system utilizing a gate associated with the channel. The plurality of rivets is stored in the channel in a series arrangement and in the same preselected orientation. The rivet dispensing system of the resistance spot rivet welding riveting apparatus can be correctly aligned with the rivet receiving member utilizing an alignment member of the rivet dispenser reloading system in communication with the resistance spot rivet welding apparatus. The gate is selectively positionable between a first configuration inhibiting movement of rivets from the channel, and a second configuration enabling movement of rivets from the channel and into the rivet dispensing system of the resistance spot rivet welding apparatus. When the gate is in the second configuration, the plurality of rivets stored in the channel can be introduced into the rivet dispensing system in a series arrangement and in the preselected orientation utilizing the gate. In certain non-limiting embodiments, the rivets stored in the channel can be introduced into the rivet dispensing system by introducing a pressurized gas into the channel to urge the rivets from the channel. In certain embodiments, a rivet can be received and stored within the channel concurrently with the resistance spot rivet welding apparatus utilizing a rivet (e.g., dispensing a rivet from the rivet dispensing system).

The rivet dispenser reloading system, according to the present disclosure, can replenish rivets consumed by a resistance spot rivet welding apparatus. The reloading of rivets can be accomplished reliably within a predetermined time period to reduce riveting apparatus cycle time. The rivet capacity of the rivet dispenser reloading system according to the present disclosure can be configured based on the size of the rivet dispensing system of the resistance spot rivet welding apparatus.

As used herein, "machine cycle time" is a duration of time required for a production system to proceed from any given point and return back to that same point in the next cycle. For example, a production system with a machine cycle time of 60 seconds to produce a single part can produce parts at the rate of 60 per hour (i.e., 60 machine cycles per hour).

As used herein, "transfer time" is a duration of time during which riveting cannot occur due to the need to move parts from one station to another station in a manufacturing facility. For example, transfer time includes time during which riveted components are being unloaded from a riveting station after riveting and new (un-riveted) components are being loaded into the same riveting fixture to be riveted.

In one example, an automotive component being joined may require N rivets per machine cycle, and the rivet dispensing system of a resistance spot rivet welding apparatus can be configured with a capacity of X rivets, wherein X is greater than or equal to N. The resistance spot rivet welding apparatus would have consumed N rivets once a machine cycle is complete, at which point there would be (X-N) rivets remaining in the rivet dispensing system of the resistance spot rivet welding apparatus. To minimize changes (e.g., increases) in the machine cycle time, N rivets can be reloaded into the rivet dispensing system using a rivet dispenser reloading system as described herein during the transfer time, regardless of the capacity of the rivet dispensing system (i.e., X). Delaying the reloading of the rivet dispensing system until the remaining (X-N) rivets are consumed may increase machine cycle time if reloading takes place during time that riveting can occur.

In various embodiments, the capacity X of the rivet dispensing system of the resistance spot rivet welding apparatus can be at least 2N such that multiple machine cycles can occur before the rivet dispensing system of the resistance spot rivet welding apparatus must be reloaded. During the reloading, the rivet dispenser reloading system can fill the rivet dispensing system to its capacity X.

Dressing of a resistance welding electrode of a welding gun of a resistance spot rivet welding apparatus and reloading of the rivet dispensing system can occur at a rivet dispenser reloading system according to the present disclosure within the transfer time in order to avoid or minimize increases to machine cycle time.

The present disclosure provides a method for dispensing a rivet onto a rivet holder of a resistance spot rivet welding apparatus and/or a pedestal welder. The method comprises receiving the rivet and storing the rivet on a seat member of a rivet dispensing system. The rivet dispensing system is moved along a path utilizing two linkages to align the seat member with the rivet holder of the resistance spot rivet welding apparatus. The rivet stored on the seat member can be introduced to the rivet holder.

The present disclosure provides a joining utilizing a resistance spot rivet welding apparatus. The method comprises receiving and storing a plurality of rivets within a channel of a rivet receiving member of a rivet dispenser reloading system utilizing a gate associated with the channel. The plurality of rivets is stored in the channel in a series arrangement and in the same preselected orientation. The rivet dispensing system of the resistance spot rivet welding riveting apparatus can be correctly aligned with the rivet receiving member utilizing an alignment member of the rivet dispenser reloading system in communication with the resistance spot rivet welding apparatus. The gate is selectively positionable between a first configuration inhibiting movement of rivets from the channel, and a second configuration enabling movement of rivets from the channel and into the rivet dispensing system of the resistance spot rivet welding apparatus. When the gate is in the second configuration, the plurality of rivets stored in the channel can be introduced into the rivet dispensing system in a series arrangement and in the preselected orientation utilizing the gate. In certain non-limiting embodiments, the rivets stored in the channel can be introduced into the rivet dispensing system by introducing a pressurized gas into the channel to urge the rivets from the channel. In certain embodiments, a rivet can be received and stored within the channel concurrently with the resistance spot rivet welding apparatus utilizing a rivet (e.g., dispensing a rivet from the rivet dispensing system).

Various aspects of certain embodiments the inventions encompassed by the present disclosure include, but are not limited to, the aspects listed in the following numbered clauses.

1. A rivet dispenser reloading system comprising:
a rivet receiving member defining a channel therein, the rivet receiving member comprising
a first port communicating with the channel and configured to receive rivets, and
a second port communicating with the channel and configured to selectively engage with a rivet dispensing system and introduce rivets to the rivet dispensing system,
wherein the channel extends between the first port and the second port and is configured to transport rivets from the first port to the second port in a series arrangement and in a preselected orientation; and
a first gate in communication with the second port, wherein the first gate is selectively positionable between a first configuration inhibiting movement of rivets through the second port, and a second configuration enabling movement of rivets through the second port.

2. The rivet dispenser reloading system of clause 1, further comprising a second gate in communication with the channel, the second gate configured to enable movement of a single rivet in the channel through the second port at one time, while inhibiting movement of additional rivets in the channel through the second port.

3. The rivet dispenser reloading system of clause 2, wherein the second gate comprises a pin configured to engage at least one of a stem region and a head region of a rivet.

4. The rivet dispenser reloading system of any one of clauses 1-3, further comprising a third gate in communication with the first port, wherein the third gate is selectively positionable between a first configuration inhibiting movement of rivets through the first port, and a second configuration enabling movement of rivets through the first port.

5. The rivet dispenser reloading system of any one of clauses 1-4, wherein the first gate is pneumatic or is actuated by an electric servo motor.

6. The rivet dispenser reloading system of any one of clauses 1-5, wherein the first gate comprises a pin configured to engage at least one of a stem region and a head region of a rivet.

7. The rivet dispenser reloading system of any one of clauses 1-6, wherein the rivet receiving member is oriented in space so that gravity urges rivets to move through the channel from the first port to the second port.

8. The rivet dispenser reloading system of any one of clauses 1-7, further comprising a gas port communicating with the channel, the gas port configured to introduce a pressurized gas to the channel and thereby urge rivets to move through the channel from the first port to the second port.

9. The rivet dispenser reloading system of any one of clauses 1-8, further comprising a fastener feeder configured to introduce fasteners in a preselected orientation to the first port.

10. The rivet dispenser reloading system of clause 9, wherein the fastener feeder comprises at least one of a vibratory bowl and a magnetic collator.

11. The rivet dispenser reloading system of any one of clauses 1-10, further comprising an electrode dressing component associated with the second port of the rivet receiving member, the electrode dressing component configured to dress a resistance welding electrode of a welding gun of a resistance spot rivet welding apparatus as the rivet dispensing system receives rivets from the second port.

12. The rivet dispenser reloading system of clause 11, further comprising a frame configured to retain the rivet receiving member in a plurality of preselected orientations.

13. The rivet dispenser reloading system of clause 12, further comprising a first slide configured to enable movement in a first direction.

14. The rivet dispenser reloading system of clause 13, further comprising a second slide configured to enable access for actuation of the first slide in a second direction relative to the frame, wherein the second direction is substantially perpendicular to the first direction.

15. The rivet dispenser reloading system of any one of clauses 1-14, further comprising an alignment member in communication with the rivet receiving member and configured to facilitate alignment between the rivet receiving member and a resistance spot rivet welding apparatus.

16. The rivet dispenser reloading system of clause 15, wherein the alignment member comprises a conical pin.

17. The rivet dispenser reloading system of any one of clauses 15-16, further comprising a spring or piston in communication with the alignment member.

18. The rivet dispenser reloading system of any one of clauses 15-17, further comprising a proximity switch or sensor configured to detect a position of the first slide.

19. The rivet dispenser reloading system of any one of clauses 1-18, wherein a cross-section of the channel is substantially T-shaped.

20. The rivet dispenser reloading system of any one of clauses 1-19, wherein the rivet receiving member comprises at least one of aluminum, an aluminum alloy, magnesium, a magnesium alloy, steel, a steel alloy, a plastic, and a composite.

21. The rivet dispenser reloading system of any one of clauses 1-20, further comprising a contact block in communication with the second port and configured to engage the rivet dispensing system.

22. The rivet dispenser reloading system of any one of clauses 1-21, further comprising a sensor configured to detect an orientation of rivets within the channel.

23. The rivet dispenser reloading system of any one of clauses 1-22, further comprising a sensor configured to detect the quantity of rivets within the channel.

24. The rivet dispenser reloading system of any one of clauses 1-23, further comprising a locking pin configured to engage and secure a resistance spot rivet welding apparatus comprising the rivet dispensing system to the rivet dispenser reloading system.

25. The rivet dispenser reloading system of clause 24, wherein the locking pin is pneumatically driven or is actuated by an electric servo motor.

26. A method for reloading rivets into a rivet dispenser used with a resistance spot rivet welding system, the method comprising
  receiving and storing a plurality of rivets in a series arrangement and in a preselected orientation within a channel of a rivet receiving member of a rivet dispenser reloading system, wherein the rivet dispenser reloading system comprises a gate associated with the channel, wherein the gate is selectively positionable between a first configuration inhibiting movement of rivets from the channel, and a second configuration enabling movement of rivets from the channel;
  aligning a rivet dispensing system of a resistance spot rivet welding system with the rivet receiving member utilizing an alignment member in communication with the resistance spot rivet welding apparatus; and
    introducing the plurality of rivets stored in the channel into the rivet dispensing system in series and in the preselected orientation via the gate.

27. The method of clause 26, wherein introducing the plurality of rivets stored in the channel into the rivet dispensing system comprises introducing a pressurized gas into the channel to urge the plurality of rivet from the channel and through the gate.

28. The method of any one of clauses 26-27, wherein a rivet of the plurality of rivets is received in the channel concurrently with the resistance spot rivet welding apparatus system utilizing a rivet.

29. A rivet dispensing system comprising:
  a rivet receiving member defining a channel therein, the rivet receiving member comprising
    a first port communicating with the channel and configured to receive rivets,
    a second port communicating with the channel and configured to dispense rivets,
    wherein the channel extends between the first port and the second port and is configured to transport rivets from the first port to the second port in a series arrangement and in a preselected orientation, and
  a seat member communicating with the second port and configured to selectively engage with a rivet holder of a resistance spot rivet welding apparatus and introduce a single rivet to the rivet holder at one time.

30. The rivet dispensing system of clause 29, further comprising an actuation member configured to move the seat member independently of the rivet receiving member.

31. The rivet dispensing system of any one of clauses 29-30, further comprising a tensioner configured to urge the rivets towards the seat member.

32. The rivet dispensing system of any one of clauses 29-31, further comprising a drive unit comprising a first linkage and a second linkage, the drive unit configured to move the rivet receiving member along a path to traverse between a first position and a second position.

33. A method for dispensing a rivet onto a rivet holder of a resistance spot rivet welding apparatus, the method comprising
  receiving the rivet and storing the rivet on a seat member of a rivet dispensing system,
  moving the rivet dispensing system along a path to align the seat member with the rivet holder, and
  introducing the rivet stored on the seat member to the rivet holder.

34. A collet assembly, comprising an actuator; and a collet connected to the actuator, the collet assembly being adapted to be installed on an external electrode holder, the collet being moveable by the actuator from an advanced position, in which the collet is adapted to grip a fastener, and a retracted position, in which at least a portion of the collet is retracted into the actuator to enable an electrode attached to the electrode holder to engage the fastener, and in which the collet is adapted to release the fastener.

35. The collet assembly of clause 34, wherein the collet includes an elongated shank portion and a plurality of collet fingers extending from the shank portion, the plurality of collet fingers being sized and shaped to grip the fastener when the collet is in its advanced position.

36. The collet assembly of clause 35, wherein each of the plurality of collet fingers includes a gripping portion.

37. The collet assembly of clause 36, wherein each of the gripping portions includes a tapered member that is tapered inwardly relative to a longitudinal axis of the collet.

38. The collet assembly of clause 37, wherein each of the gripping portions includes a first gripping segment that extends from the tapered member outwardly relative to the longitudinal axis of the collet, and a second gripping segment that extends from the first gripping segment inwardly relative to the longitudinal axis of the collet.

39. The collet assembly of any one of clauses 35-38, wherein the collet includes a ring positioned around the plurality of collet fingers.

40. The collet assembly of clause 39, wherein the actuator includes a housing having an upper end, a lower end opposite the upper end, and a central passage extending from the upper end to the lower end, and wherein the collet is positioned slidably within the central passage of the housing of the actuator.

41. The collet assembly of clause 40, wherein the actuator includes a sleeve member having an inner sleeve positioned within the central passage of the housing of the actuator, and wherein the collet includes an internal passage, and wherein the inner sleeve of the sleeve member of the actuator is positioned within the internal passage of the collet.

42. The collet assembly of clause 41, wherein the sleeve member includes a cap attached to the upper end of the housing.

43. The collet assembly of clause 42, wherein the cap is attached removably to the upper end of the housing.

44. The collet assembly of any one of clauses 42-43, wherein the sleeve member is integral with the housing.

45. The collet assembly of any one of clauses 42-44, wherein the cap includes an advance port in communication with the central passage of the housing for providing pneumatic air pressure for advancing the collet to its advanced position.

46. The collet assembly of clause 45, wherein the cap includes a return port in communication with the central passage of the housing for providing pneumatic air pressure for retracting the collet to its retracted position.

47. The collet assembly of clause 46, wherein the collet includes a sensor member, and wherein the actuator includes a sensor located proximate to the upper end of the housing for sensing an alignment of the sensor member of the collet with the sensor when the collet is in its retracted position.

48. The collet assembly of any one of clauses 46-47, wherein the advance port and the return port are further adapted to release the pneumatic air pressure to enable the collet to move freely within the actuator relative to the inner sleeve between the advanced position of the collet and its retracted position of the collet.

49. The collet assembly of any one of clauses 41-48, wherein the electrode holder is positioned within the inner sleeve of the sleeve member.

50. The collet assembly of clause 49, wherein the electrode holder includes an adapter shaft, the electrode being attached removably to the adapter shaft, wherein the electrode is shrouded by the collet when the collet is in its advanced position, and the electrode is exposed from the collet when the collet is in its retracted position.

51. The collet assembly of clause 50, wherein the electrode is a welding electrode.

52. The collet assembly of clause 51, wherein the fastener is a rivet or a stud.

53. The collet assembly of any one of clauses 41-52, wherein the inner sleeve includes a free end having a beveled surface and positioned within the central passage of the housing proximate to the lower end of the housing, and wherein when the collet is moved from its advanced position to its retracted position, the tapered members of the collet engage the beveled surface of the inner sleeve.

54. In combination, a welding gun having an electrode holder and an electrode cap attached to the electrode holder, and a collet assembly, comprising an actuator, and a collet connected to the actuator, the collet assembly being installed on the electrode holder, the collet being moveable by the actuator from an advanced position, in which the collet is adapted to grip a fastener, and a retracted position, in which at least a portion of the collet is retracted into the actuator to enable the electrode to weld the fastener to an external work piece, and in which the collet is adapted to release the fastener.

55. A method comprising receiving a rivet by a rivet holder of a resistance spot rivet welding apparatus, from a rivet dispensing system.

56. The method of clause 55, further comprising utilizing the resistance spot rivet welding apparatus to attach the rivet received in the rivet holder to a structure.

57. A system comprising at least two of:
the rivet dispenser reloading system of any one of clauses 1-25;
the rivet dispensing system of any one of clauses 29-32; and
the rivet holder comprising the collet assembly of any one of clauses 34-53.

58. A method comprising at least two of:
the method of any one of clauses 26-28;
the method of clause 33; and
the method of any one of clause 55-56.

One skilled in the art will recognize that the herein described articles and methods, and the discussion accompanying them, are used as examples for the sake of conceptual clarity and that various configuration modifications are contemplated. Consequently, as used herein, the specific examples/embodiments set forth and the accompanying discussion is intended to be representative of their more general classes. In general, use of any specific exemplar is intended to be representative of its class, and the non-inclusion of specific components, devices, operations/actions, and objects should not be taken to be limiting. While the present disclosure provides descriptions of various specific aspects for the purpose of illustrating various aspects of the present disclosure and/or its potential applications, it is understood that variations and modifications will occur to those skilled in the art. Accordingly, the invention or inventions described herein should be understood to be at least as broad as they are claimed and not as more narrowly defined by particular illustrative aspects provided herein.

What is claimed is:
1. A resistance spot rivet welding system comprising:
(i) a rivet dispensing system comprising:
a first rivet receiving member defining a first channel therein, the first rivet receiving member comprising
an inlet communicating with the first channel and configured to receive rivets,
an outlet communicating with the first channel and configured to dispense rivets,
wherein the first channel extends between the inlet and the outlet and is configured to transport rivets from the inlet to the outlet;
a seat member communicating with the outlet and configured to selectively engage with a rivet holder of a resistance spot rivet welding apparatus and introduce a single rivet to the rivet holder at one time, wherein the seat member comprises a first jaw, a second jaw, and a block structure to receive a rivet from the second port and maintain the rivet in a preselected position and orientation; and
an actuation member configured to move a rivet located within the seat member to a secondary position located above the seat member; and
(ii) the rivet holder comprising a collet assembly, the collet assembly comprising an actuator and a collet connected to the actuator, the collet assembly being adapted to be installed on an external electrode holder, the collet being moveable by the actuator from an advanced position, in which the collet is adapted to grip a rivet, and a retracted position, in which at least a portion of the collet is retracted into the actuator to enable an electrode attached to the electrode holder to engage the rivet.

2. A resistance spot rivet welding method comprising:
(i) reloading rivets into a rivet dispensing system used with a resistance spot rivet welding system, the reloading comprising:
receiving and storing a plurality of rivets in a channel of a rivet receiving member of a rivet dispenser reloading system, wherein the rivet dispenser reloading system comprises a gate associated with the channel, wherein the gate is selectively positionable between a first configuration inhibiting movement of rivets from the channel, and a second configuration enabling movement of rivets from the channel;
aligning a rivet dispensing system of a resistance spot rivet welding system with the rivet receiving member utilizing an alignment member in communication with the resistance spot rivet welding apparatus; and
introducing the plurality of rivets stored in the channel into the rivet dispensing system via the gate;
(ii) dispensing a rivet from the rivet dispensing system onto a rivet holder of a resistance spot rivet welding apparatus, the dispensing comprising:
receiving the rivet and storing the rivet on a seat member of the rivet dispensing system, wherein the seat member comprises a first jaw, a second jaw, and a block structure to receive a rivet from the second port and maintain the rivet in a preselected position and orientation;
moving the rivet dispensing system utilizing an actuation member along a path to align the seat member with the rivet holder;
introducing the rivet stored on the seat member to the rivet holder; and
receiving the rivet, by the rivet holder, from the rivet dispensing system.

3. A resistance spot rivet welding system comprising:
(i) a rivet dispensing system comprising:
a first rivet receiving member defining a first channel therein, the first rivet receiving member comprising
an inlet communicating with the first channel and configured to receive rivets,
an outlet communicating with the first channel and configured to dispense rivets,
wherein the first channel extends between the inlet and the outlet and is configured to transport rivets from the inlet to the outlet; and
a seat member communicating with the outlet and configured to selectively engage with a rivet holder of a resistance spot rivet welding apparatus and introduce a single rivet to the rivet holder at one time;
(ii) the rivet holder comprising a collet assembly, the collet assembly comprising an actuator and a collet connected to the actuator, the collet assembly being adapted to be installed on an external electrode holder, the collet being moveable by the actuator from an advanced position, in which the collet is adapted to grip a rivet, and a retracted position, in which at least a portion of the collet is retracted into the actuator to enable an electrode attached to the electrode holder to engage the rivet; and
(iii) a rivet dispenser reloading system comprising:
a second rivet receiving member defining a second channel therein, the second rivet receiving member comprising
a first port communicating with the second channel and configured to receive rivets, and
a second port communicating with the second channel and configured to selectively engage with the rivet dispensing system and introduce rivets to the rivet dispensing system,
wherein the second channel extends between the first port and the second port and is configured to transport rivets from the first port to the second port; and
a first gate in communication with the second port, wherein the first gate is selectively positionable between a first configuration inhibiting movement of rivets through the second port, and a second configuration enabling movement of rivets through the second port.

4. The resistance spot rivet welding system of claim 3, further comprising a second gate in communication with the second channel of the rivet dispenser reloading system, the second gate configured to enable movement of a single rivet at one time through the second port of the second rivet receiving member of the rivet dispenser reloading system, while inhibiting movement of additional rivets through the second port of the second rivet receiving member of the rivet dispenser reloading system.

5. The resistance spot rivet welding system of claim 4, further comprising a third gate in communication with the first port of the second rivet receiving member of the rivet dispenser reloading system, wherein the third gate is selectively positionable between a first configuration inhibiting movement of rivets through the first port of the second rivet receiving member of the rivet dispenser reloading system, and a second configuration enabling movement of rivets through the first port of the second rivet receiving member of the rivet dispenser reloading system.

6. The resistance spot rivet welding system of claim 3, further comprising
a fastener feeder configured to introduce fasteners in a preselected orientation to the first port of the second rivet receiving member of the rivet dispenser reloading system, wherein the fastener feeder comprises at least one of a vibratory bowl and a magnetic collator.

7. The resistance spot rivet welding system of claim 3, further comprising an electrode dressing component associated with the second port of the second rivet receiving member of the rivet dispenser reloading system, the electrode dressing component configured to dress the electrode attached to the electrode holder as the rivet dispensing system receives rivets from the second port of the second rivet receiving member of the rivet dispenser reloading system.

8. The resistance spot rivet welding system of claim 3, further comprising a frame configured to retain the rivet dispenser reloading system, the rivet dispensing system, the rivet holder, or a combination thereof, in a plurality of preselected orientations.

9. The resistance spot rivet welding system of claim 3, wherein the rivet dispenser reloading system further comprises an alignment member in communication with the second rivet receiving member of the rivet dispenser reloading system, the alignment member configured to facilitate alignment between the second rivet receiving member of the rivet dispenser reloading system and the first rivet receiving member of the rivet dispensing system.

10. The resistance spot rivet welding system of claim 3, wherein the rivet dispenser reloading system further comprises a contact block in communication with the second port of the second rivet receiving member of the rivet dispenser reloading system and configured to engage the rivet dispensing system.

11. The resistance spot rivet welding system of claim 3, wherein the rivet dispenser reloading system further comprises a sensor configured to detect an orientation of rivets within the second channel defined by the second rivet receiving member of the rivet dispenser reloading system.

12. The resistance spot rivet welding system of claim 3, wherein the rivet dispenser reloading system further comprises a sensor configured to detect the quantity of rivets within the second channel defined by the second rivet receiving member of the rivet dispenser reloading system.

13. The resistance spot rivet welding system of claim 1, wherein the rivet dispensing member further comprises a tensioner configured to urge the rivets towards the seat member of the rivet dispensing system.

14. The resistance spot rivet welding system of claim 1, wherein the rivet dispensing member further comprises a drive unit comprising a first linkage and a second linkage, the drive unit configured to move the first rivet receiving member along a path between a first position and a second position.

15. The resistance spot rivet welding system of claim 1, wherein the collet of the rivet holder comprises an elongated shank portion and a plurality of collet fingers extending from the shank portion, the plurality of collet fingers being sized and shaped to grip a rivet when the collet is in its advanced position, each of the plurality of collet fingers comprising a gripping portion, wherein each gripping portion comprises a tapered member that is tapered inwardly relative to a longitudinal axis of the collet.

16. A resistance spot rivet welding system comprising:
  (i) a rivet dispensing system comprising:
    a first rivet receiving member defining a first channel therein, the first rivet receiving member comprising
      an inlet communicating with the first channel and configured to receive rivets,
      an outlet communicating with the first channel and configured to dispense rivets,
      wherein the first channel extends between the inlet and the outlet and is configured to transport rivets from the inlet to the outlet; and
    a seat member communicating with the outlet and configured to selectively engage with a rivet holder of a resistance spot rivet welding apparatus and introduce a single rivet to the rivet holder at one time; and
  (ii) the rivet holder comprising a collet assembly, the collet assembly comprising an actuator and a collet connected to the actuator, the collet assembly being adapted to be installed on an external electrode holder, the collet being moveable by the actuator from an advanced position, in which the collet is adapted to grip a rivet, and a retracted position, in which at least a portion of the collet is retracted into the actuator to enable an electrode attached to the electrode holder to engage the rivet;
  wherein the actuator of the rivet holder comprises a housing comprising an upper end, a lower end opposite the upper end, and a central passage extending from the upper end to the lower end;
  wherein the collet is positioned and can slide within the central passage of the housing of the actuator;
  wherein the actuator of the rivet holder comprises a sleeve member comprising an inner sleeve positioned within the central passage of the housing of the actuator;
  wherein the collet comprises an internal passage; and
  wherein the inner sleeve of the sleeve member of the actuator is positioned within the internal passage of the collet.

17. The resistance spot rivet welding system of claim 16, wherein the inner sleeve includes a free end comprising a beveled surface and is positioned within the central passage of the housing proximate to the lower end of the housing, and wherein when the collet moves from the advanced position to the retracted position, the tapered members of the collet engage the beveled surface of the inner sleeve.

18. The method of claim 2, wherein a rivet of the plurality of rivets is received in the channel of the rivet receiving member of the rivet dispenser reloading system concurrently with the resistance spot rivet welding apparatus system utilizing a rivet to fasten a structure.

19. The method of claim 2, further comprising utilizing the resistance spot rivet welding apparatus to attach the rivet received in the rivet holder to a structure.

\* \* \* \* \*